United States Patent
Kondo

(10) Patent No.: US 8,169,510 B2
(45) Date of Patent: May 1, 2012

(54) DATA PROCESSING DEVICE, DATA PROCESSING METHOD, AND STORAGE MEDIUM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 12/524,969

(22) PCT Filed: Dec. 18, 2008

(86) PCT No.: PCT/JP2008/073030
§ 371 (c)(1),
(2), (4) Date: Jul. 29, 2009

(87) PCT Pub. No.: WO2009/078454
PCT Pub. Date: Jun. 25, 2009

(65) Prior Publication Data
US 2010/0157080 A1    Jun. 24, 2010

(30) Foreign Application Priority Data

Dec. 18, 2007   (JP) .................................. 2007-325512

(51) Int. Cl.
*H04N 5/217* (2011.01)
(52) U.S. Cl. ......... 348/241; 348/243; 348/155; 348/156
(58) Field of Classification Search .................. 348/241, 348/243, 246, 247, 294, 298, 308, 312, 155, 348/156
See application file for complete search history.

(56) References Cited

U.S. PATENT DOCUMENTS 5,870,135 A    2/1999   Glatt et al.
6,654,031 B1   11/2003  Ito et al.
2004/0130501 A1  7/2004   Kondo et al.
2004/0201753 A1  10/2004  Kondo et al.
2005/0104958 A1  5/2005   Egnal et al.

(Continued)

FOREIGN PATENT DOCUMENTS

JP    5 328201    12/1993

(Continued)

OTHER PUBLICATIONS

Sung Cheol Park, et al., "Super-Resolution Image Reconstruction: A Technical Overview", IEEE Signal Processing Magazine, vol. 20, No. 3, May 1, 2003, XP011097476, pp. 21-36.

*Primary Examiner* — Yogesh Aggarwal
(74) *Attorney, Agent, or Firm* — Oblon, Spivak, McClelland, Maier & Neustadt, L.L.P.

(57) ABSTRACT

The present invention relates to a data processing device, a data processing method, and a recording medium that enable a user to have a bodily sensation of collection of a material such as image data or the like, and editing.

A processing section 31 generates first object image data as image data having a wider angle than image data obtained by image pickup by an image pickup device, and a manipulating section 35 extracts image data for one frame (extraction image data) from the first object image data according to an image pickup parameter set according to an operation of a user. Further, the manipulating section 35 superimposes the image data of a telop as second object image data on the extraction image data according to an editing parameter set according to an operation of the user. The present invention is applicable to television receivers receiving programs, for example.

13 Claims, 36 Drawing Sheets

U.S. PATENT DOCUMENTS

| | | |
|---|---|---|
| 2006/0221211 A1 | 10/2006 | Kondo et al. |
| 2006/0227218 A1 | 10/2006 | Kondo et al. |
| 2006/0227219 A1 | 10/2006 | Kondo et al. |
| 2006/0227220 A1 | 10/2006 | Kondo et al. |
| 2007/0140593 A1 | 6/2007 | Wang |
| 2007/0188493 A1 | 8/2007 | Kondo et al. |
| 2008/0055568 A1 | 3/2008 | Kondo et al. |
| 2008/0111901 A1* | 5/2008 | Kawashima ............... 348/241 |

FOREIGN PATENT DOCUMENTS

| | | |
|---|---|---|
| JP | 6 165014 | 6/1994 |
| JP | 7 38858 | 2/1995 |
| JP | 7 46533 | 2/1995 |
| JP | 10 11583 | 1/1998 |
| JP | 10 313251 | 11/1998 |
| JP | 11 164264 | 6/1999 |
| JP | 2001 250119 | 9/2001 |
| JP | 2001 320587 | 11/2001 |
| JP | 2002 84458 | 3/2002 |
| JP | 2002 271691 | 9/2002 |
| JP | 2004 129003 | 4/2004 |
| JP | 2005 63097 | 3/2005 |
| JP | 2005 233984 | 9/2005 |
| JP | 2005 260928 | 9/2005 |
| JP | 2005 266797 | 9/2005 |
| JP | 2006 304047 | 11/2006 |
| WO | 00 56075 | 9/2000 |

* cited by examiner

DATA PROCESSING DEVICE, DATA PROCESSING METHOD, AND STORAGE MEDIUM

TECHNICAL FIELD

The present invention relates to a data processing device, a data processing method, and a storage medium, and particularly to a data processing device, a data processing method, and a storage medium that enable a user to have a bodily sensation of collection of a material, editing, and the like.

BACKGROUND ART

For example, in a broadcasting station, a video camera having an image pickup device that picks up an image of a real world via an optical system picks up an image of light from an object such as scenery or the like in the real world via the optical system and samples the light in a spatiotemporal direction, whereby image data is obtained.

Specifically, in the video camera, pixels of minute size of the image pickup device receive light of the real world, whereby the light is sampled in a spatial direction. Further, in the pixels of the image pickup device, the light of the real world is sampled in a temporal direction by being received for a predetermined time and being subjected to photoelectric conversion. The image pickup device outputs image data composed of pixel values according to amounts of charge corresponding to the light sampled in the spatial direction and the temporal direction as described above.

Further, in the broadcasting station, using the image data obtained by the video camera as a material, the image data as material is edited, subjected to signal processing such as MPEG (Moving Picture Experts Group) coding and the like, and transmitted.

When the image data is MPEG-coded as described above, a receiving side performs MPEG decoding. Because the MPEG coding subjects the image data to a DCT (Discrete Cosine Transform) in block units of a predetermined size, and further quantizes the image data, distortion such as block distortion or the like occurs in a decoded image obtained as a result of the MPEG decoding.

Accordingly, the present applicant has previously proposed a method of remedying distortion such as block distortion or the like occurring in a decoded image obtained as a result of the MPEG decoding by a technique referred to as class classification adaptive processing (see Patent Document 1, for example).

Incidentally, for example, even when a monitor on the receiving side is a high-performance monitor capable of displaying an image that faithfully reproduces the real world, image quality of an image displayable on the monitor is limited by the performance of the video camera of the broadcasting station.

In addition, in the real world, a user can have a bodily sensation of all of scenery seen by the sense of sight. However, as for image data obtained by video camera, the user can view only scenery appearing in an image corresponding to the image data.

Patent Document 1: Japanese Patent Laid-Open No. 2001-320587

DISCLOSURE OF INVENTION

Technical Problem

As described above, in a broadcasting station, image data generated by image pickup by video camera is obtained, and further the image data is edited.

A range in which an image of the real world is picked up by a video camera and details of editing performed on image data obtained by the video camera are performed in line with the intention of a director of the broadcasting station or the like. However, the intention of the director or the like does not necessarily coincide with the intention of a user as a viewer.

The present invention has been made in view of such a situation, and is for example to enable a user to have a bodily sensation of collection of a material such as image data or the like and editing.

Technical Solution

According to an aspect of the present invention, there is provided a data processing device or a storage medium on which a program for making a computer function as the data processing device is stored, the data processing device being a data processing device configured to process input data obtained by performing signal processing on sensing data obtained by a sensor device sensing and sampling a first object in a real world, the data processing device including: a sensor device distortion removing block configured to remove distortion occurring when the sensor device senses the first object and distortion caused by the signal processing, the distortion being included in the input data; a sensor device position eliminating block configured to generate first object data representing the first object, the first object data not being dependent on at least a position of the sensor device, from the input data; a parameter setting section configured to set a sensing parameter as a parameter used to sense the first object; and a manipulating section configured to manipulate the first object data according to the sensing parameter set by the parameter setting section.

According to an aspect of the present invention, there is provided a data processing method of a data processing device configured to process input data obtained by performing signal processing on sensing data obtained by a sensor device sensing and sampling a first object in a real world, the data processing method including the steps of: the data processing device removing distortion occurring when the sensor device senses the first object and distortion caused by the signal processing, the distortion being included in the input data; generating first object data representing the first object, the first object data not being dependent on at least a position of the sensor device, from the input data; and manipulating the first object data according to a sensing parameter set by a parameter setting section configured to set the sensing parameter as a parameter used to sense the first object.

In an aspect of the present invention, distortion occurring when the sensor device senses the first object and distortion caused by the signal processing, the distortion being included in the input data, are removed, and first object data representing the first object, the first object data not being dependent on at least a position of the sensor device, is generated from the input data. Then, the first object data is manipulated according to a sensing parameter set by a parameter setting section configured to set the sensing parameter as a parameter used to sense the first object.

Incidentally, the program can be provided by being transmitted via a transmission medium or in a state of being recorded on a recording medium.

In addition, the data processing device may be an independent device, or may be a part of blocks forming an independent device.

Advantageous Effects

In an aspect of the present invention, a user can have a bodily sensation of the real world. In particular, a user can for example have a bodily sensation of collection of a material such as image data or the like.

DESCRIPTION OF REFERENCE NUMERALS

11 Processing section, 12 Sensor device distortion removing block, 13 Sensor device position eliminating block, 14 Parameter setting section, 15 Manipulating section, 16 Second object data detecting section, 20 Transmitting device, 21 Image pickup device, 22 Optical system, 23 Light receiving section, 24 Spatiotemporal sampling section, 25 Memory, 26 Editing section, 27 Signal processing section, 30 Receiving device, 31 Processing section, 32 Image pickup device distortion removing block, 33 Image pickup device operation eliminating block, 34 Parameter setting section, 35 Manipulating section, 36 Second object image data detecting section, 41 Signal processing distortion removing portion, 42 Spatiotemporal resolution creating portion, 43 Optical distortion removing portion, 51 Image pickup device operation detecting portion, 52 Image pickup device operation compensating portion, 53 Storage portion, 54 Foreground separating portion, 55 Foreground blur removal processing portion, 120 Transmitting device, 121 Sound collecting device, 123 Sound collecting section, 124 Temporal sampling section, 125 Memory, 126 Editing section, 127 Signal processing section, 130 Receiving device, 131 Processing section, 132 Sound collecting device distortion removing block, 133 Sound collecting device operation eliminating block, 134 Parameter setting section, 135 Manipulating section, 136 Second audio data detecting section, 141 Signal processing distortion removing portion, 142 Temporal resolution creating portion, 143 Sound collection distortion removing portion, 151 Sound source detecting portion, 152 Separating portion, 211 Delay circuit, 212 Synthesizing circuit, 213 Storage memory, 214 Extracting circuit, 215 Motion vector detecting circuit, 216

Phase shift circuit, 221 Edge detecting circuit, 222 Level detecting circuit, 223 Telop determining circuit, 301 Sample of interest selecting section, 302, 303 Tap selecting section, 304 Class classifying section, 305 Coefficient outputting section, 306 Predicting operation section, 401, 402 Frame memory, 403 Linear interpolation functional section, 404 Correlation coefficient calculating section, 405 Zoom ratio setting functional section, 421 Motion vector estimating section, 422 Vector memory, 423 Determining section, 511 Frame memory section, 511A, 511B Frame memory, 512 Motion detecting section, 513 Scene change detecting section, 514 Controller, 515 Memory section, 601 Filter, 701 Delay correction adding section, 702 Pitch detecting section, 703 Separating coefficient creating section, 704 Filter operation circuit, 711, 712 Delaying block, 713, 714 Operation section, 801 Bus, 802 CPU, 803 ROM, 804 RAM, 805 Hard disk, 806 Output section, 807 Input section, 808 Communicating section, 809 Drive, 810 Input-output interface, 811 Removable recording medium

BEST MODE FOR CARRYING OUT THE INVENTION

Figure 1:
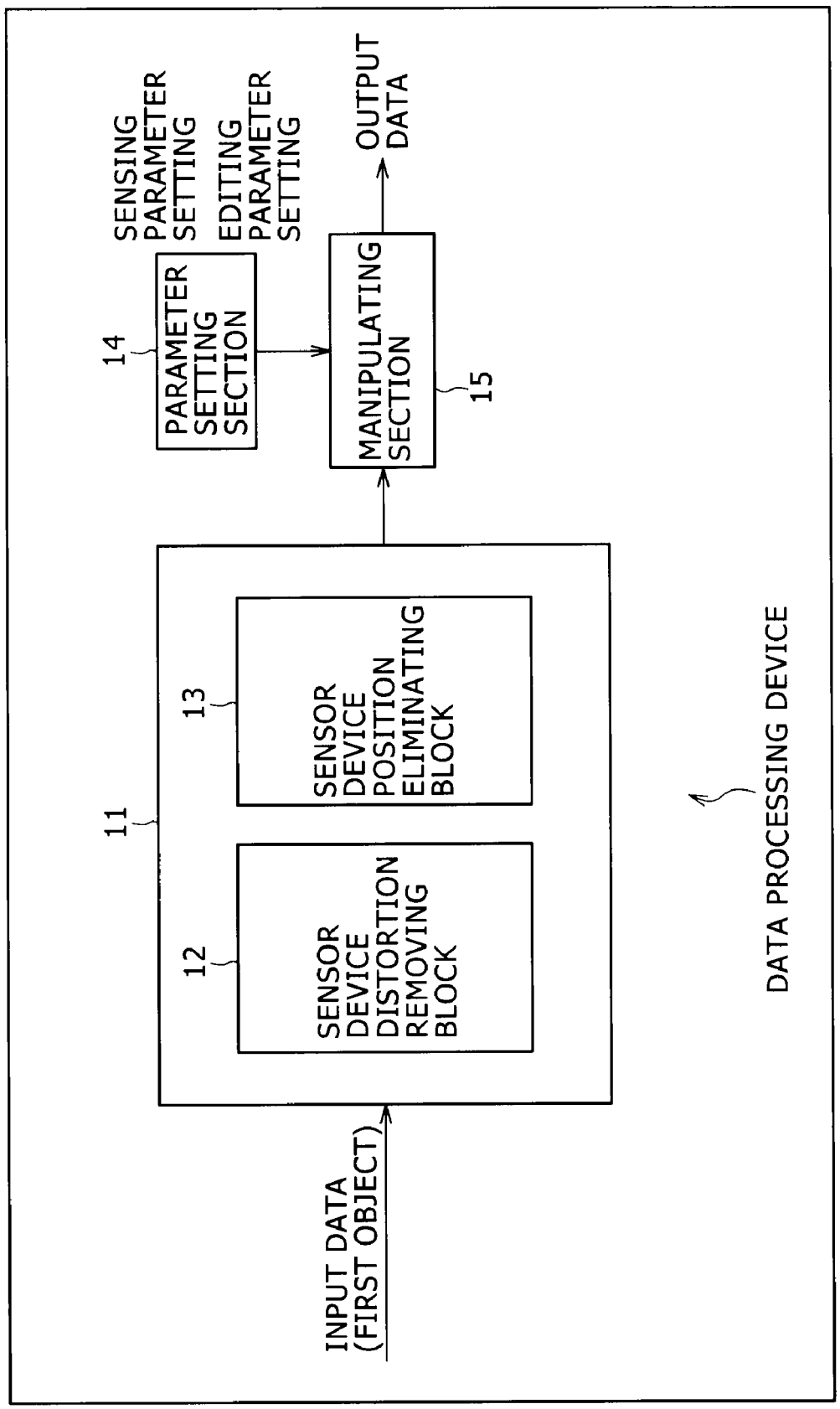
FIG. 1 is a block diagram showing an example of configuration of a first embodiment of a data processing device to which the present invention is applied.

FIG. 1 is a block diagram showing an example of configuration of a first embodiment of a data processing device to which the present invention is applied.

In FIG. 1, the data processing device includes a processing section 11, a parameter setting section 14, and a manipulating section 15. The data processing device processes input data obtained by performing signal processing on sensing data obtained by a sensor device not shown in the figure sensing and sampling a first object in a real world.

That is, the processing section 11 is supplied with the input data obtained by performing signal processing on the sensing data obtained by the sensor device sensing and sampling the first object in the real world.

The processing section 11 includes a sensor device distortion removing block 12 and a sensor device position eliminating block 13. The processing section 11 processes the input data supplied to the processing section 11.

Specifically, the sensor device distortion removing block 12 removes distortion occurring when the sensor device senses the first object and distortion caused by the signal processing which distortion is included in the input data supplied to the processing section 11.

The sensor device position eliminating block 13 generates first object data representing the first object, which data is not dependent on at least a position (including movement operation in a time series direction of the position) of the sensor device, from the input data supplied to the processing section 11.

The first object data obtained in the processing section 11 is supplied to the manipulating section 15.

The parameter setting section 14 for example sets a sensing parameter as a parameter used to sense the first object according to an operation of a user. The parameter setting section 14 supplies the sensing parameter to the manipulating section 15.

The manipulating section 15 manipulates the first object data from the processing section 11 according to the sensing parameter from the parameter setting section 14. The manipulating section 15 outputs the first object data after the manipulation as output data.

In the data processing device formed as described above, when the sensor device is for example a device that senses light, that is, an image pickup device that picks up an image of the real world via an optical system, and the input data is image data of a moving image obtained by picking up an image of scenery or the like as the first object in the real world by the image pickup device, the input data is processed in the processing section 11, and thereby image data of an image in which a wider range than a range seen in one frame (field) picked up by the image pickup device is seen is generated as the first object data.

That is, when a zoom is not taken into consideration to simplify description, a first object range of the scenery or the like seen in one frame picked up by the image pickup device differs depending on the position of the image pickup device (a position at which image pickup is performed by the image pickup device). The processing section 11 generates image data of an image in which a wider range than the first object range seen in one frame picked up by the image pickup device is seen as the first object data not depending on the position of the image pickup device.

Meanwhile, the parameter setting section 14 sets a range and a position to be extracted as image data of one frame from the first object data as a sensing parameter according to an operation of a user. The parameter setting section 14 supplies the sensing parameter to the manipulating section 15.

The manipulating section 15 extracts image data identified by the range and the position as the sensing parameter from the parameter setting section 14 from the first object data from the processing section 11. The manipulating section 15 outputs the image data as output data.

The image data as the output data is supplied to a monitor not shown in the figure, and displayed.

Thus, the user can view an image in a desired range and a desired position by operating the parameter setting section 14, and have a bodily sensation as if the user were picking up (sensing) the scenery of the real world by a video camera and collecting image data as a material.

Figure 2:
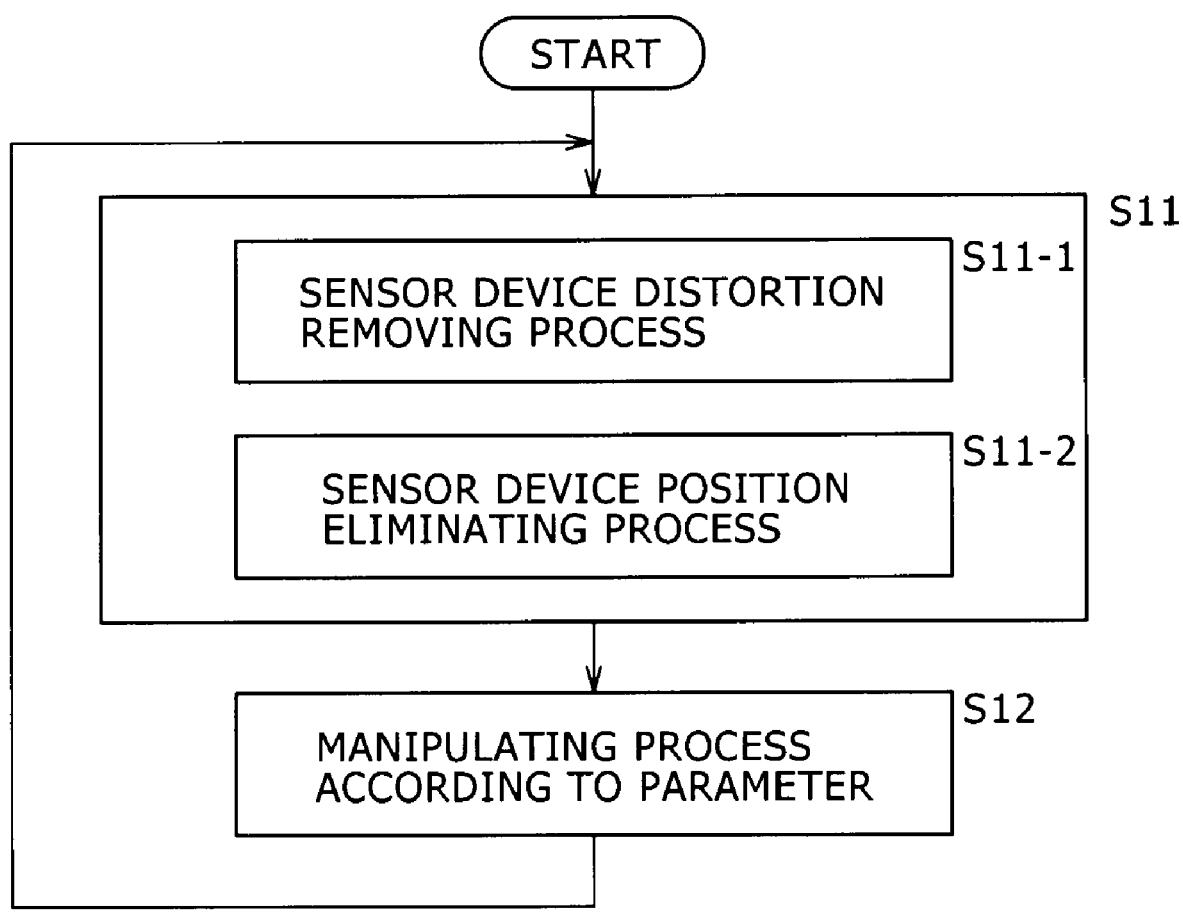
FIG. 2 is a flowchart of assistance in explaining processing of the data processing device according to the first embodiment.

The processing of the data processing device of FIG. 1 will next be described further with reference to FIG. 2.

When the processing section 11 is supplied with input data, the processing section 11 in step S11 processes the input data. The process then proceeds to step S12.

Specifically, in step S11, the sensor device distortion removing block 12 of the processing section 11 in step S11-1 performs a sensor device distortion removing process that removes distortion occurring when the sensor device senses the first object and distortion caused by the signal processing which distortion is included in the input data supplied to the processing section 11.

In addition, in step S11-2, the sensor device position eliminating block 13 of the processing section 11 performs a sensor device position eliminating process that generates first object data representing the first object, which data is not dependent on at least the position of the sensor device, from the input data supplied to the processing section 11. The sensor device position eliminating block 13 supplies the first object data obtained as a result to the manipulating section 15.

In step S12, the manipulating section 15 performs a manipulating process that manipulates the first object data from the processing section 11 according to the sensing parameter supplied from the parameter setting section 14. The manipulating section 15 outputs the first object data after the manipulation as output data.

Then, the process waits for next input data to be supplied to the processing section 11, and returns from step S12 to step S11 to thereafter repeat a similar process.

Figure 3:
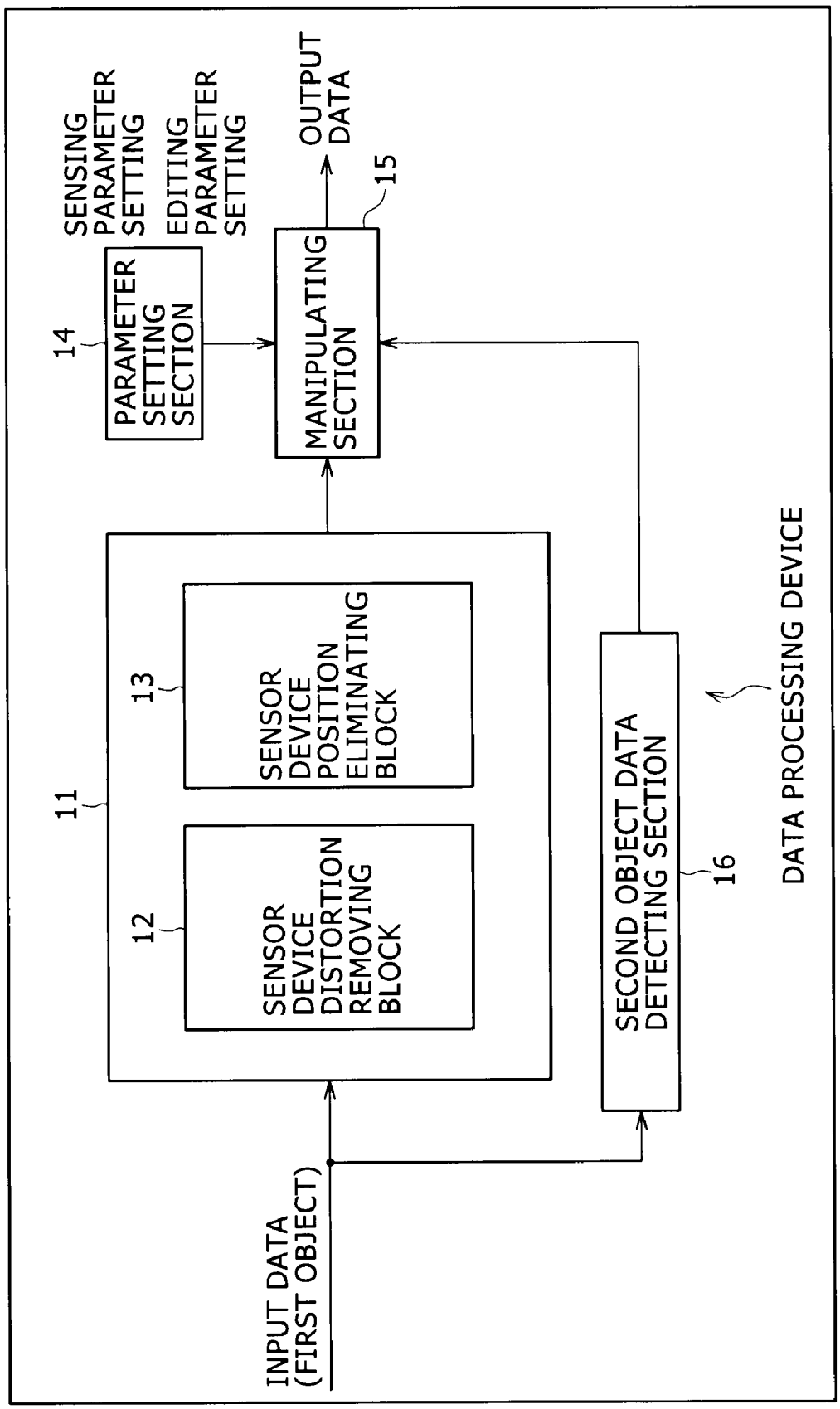
FIG. 3 is a block diagram showing an example of configuration of a second embodiment of the data processing device to which the present invention is applied.

FIG. 3 is a block diagram showing an example of configuration of a second embodiment of the data processing device to which the present invention is applied.

Incidentally, in the figure, parts corresponding to those of FIG. 1 are identified by the same reference numerals, and description thereof will be omitted in the following as appropriate.

Specifically, the data processing device of FIG. 3 is identical to the data processing device of FIG. 1 in that the data processing device of FIG. 3 includes a processing section 11, a parameter setting section 14, and a manipulating section 15. The data processing device of FIG. 3 is different from the data processing device of FIG. 1 in that the data processing device of FIG. 3 is newly provided with a second object data detecting section 16.

However, in FIG. 3, input data supplied to the processing section 11 is data obtained by superimposing second object data different from sensing data on the sensing data by editing and performing signal processing on the sensing data on which the second object data is superimposed.

The second object data detecting section 16 is supplied with the same input data as supplied to the processing section 11.

The second object data detecting section 16 detects the second object data from the input data supplied thereto. The second object data detecting section 16 supplies the second object data to the manipulating section 15.

The manipulating section 15 manipulates first object data from the processing section 11 according to a sensing parameter from the parameter setting section 14 as described with reference to FIG. 1 and FIG. 2. In addition, the manipulating section 15 performs editing using the second object data supplied from the second object data detecting section 16 according to an editing parameter supplied from the parameter setting section 14.

That is, in FIG. 3, the parameter setting section 14 sets the sensing parameter, and also sets the editing parameter as a parameter used to perform editing according to an operation of a user, for example. The parameter setting section 14 supplies the editing parameter together with the sensing parameter to the manipulating section 15.

Then, the manipulating section 15 manipulates the first object data from the processing section 11 according to the sensing parameter from the parameter setting section 14, and performs editing using the second object data from the second object data detecting section 16 according to the editing parameter. The manipulating section 15 outputs data obtained as a result of the manipulation and the editing as output data.

In the data processing device formed as described above, when the sensor device is for example an image pickup device that picks up an image of the real world via an optical system, and the input data is image data obtained by superimposing, by editing, image data of a telop or the like as second object data on image data of a moving image obtained by picking up an image of scenery or the like as a first object in the real world by the image pickup device, the input data is processed in the processing section 11, and thereby image data of an image in which a wider range than one frame picked up by the image pickup device is seen and from which image data the image data of the telop as second object data is removed is generated as the first object data.

In addition, the second object data detecting section 16 detects the image data of the telop as second object data from the input data supplied thereto. The second object data detecting section 16 supplies the image data to the manipulating section 15.

Meanwhile, as in the case of FIG. 1, the parameter setting section 14 sets a range and a position to be extracted as image data of one frame from the first object data as a sensing parameter according to an operation of the user. The parameter setting section 14 supplies the sensing parameter to the manipulating section 15.

Further, the parameter setting section 14 sets a size, a position and the like in which to superimpose the image data of the telop as second object data as an editing parameter according to an operation of the user. The parameter setting section 14 supplies the editing parameter to the manipulating section 15.

The manipulating section 15 extracts image data identified by the range and the position indicated by the sensing parameter from the parameter setting section 14 from the first object data from the processing section 11.

Further, the manipulating section 15 performs editing that superimposes the image data of the telop as second object data from the second object data detecting section 16 at the position indicated by the editing parameter from the parameter setting section 14 in the image data extracted from the first object data in the size indicated by the editing parameter. The manipulating section 15 outputs the image data after the editing as output data.

The image data as the output data is supplied to a monitor not shown in the figure, and displayed.

Thus, the user can view an image in a desired range and a desired position by operating the parameter setting section 14, and have a bodily sensation as if the user were picking up (sensing) the scenery of the real world by a video camera and collecting image data as a material.

Further, the user can have a bodily sensation of editing that superimposes image data of a telop, for example.

Figure 4:
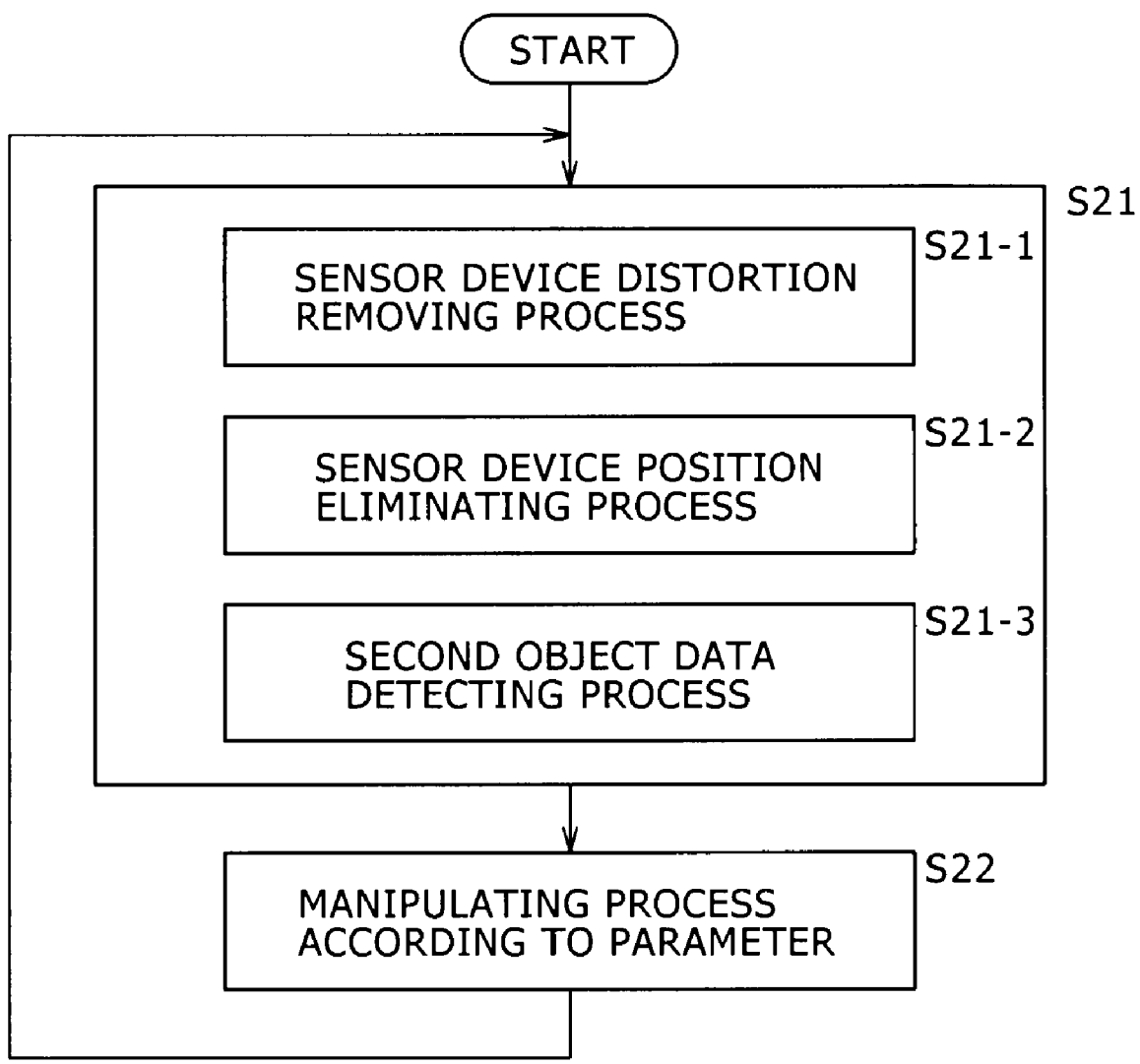
FIG. 4 is a flowchart of assistance in explaining processing of the data processing device according to the second embodiment.

The processing of the data processing device of FIG. 3 will next be described further with reference to FIG. 4.

When the processing section 11 and the second object data detecting section 16 are supplied with input data, the processing section 11 and the second object data detecting section 16 in step S21 process the input data. The process then proceeds to step S22.

Specifically, in step S21, the sensor device distortion removing block 12 of the processing section 11 in step S21-1 performs a sensor device distortion removing process that removes distortion occurring when the sensor device senses the first object and distortion caused by the signal processing which distortion is included in the input data supplied to the processing section 11.

In addition, in step S21-2, the sensor device position eliminating block 13 of the processing section 11 performs a sensor device position eliminating process that generates first object data representing the first object, which data is not dependent on at least the position of the sensor device, from the input data supplied to the processing section 11. The sensor device position eliminating block 13 supplies the first object data obtained as a result to the manipulating section 15.

Further, in step S21-3, the second object data detecting section 16 detects second object data from the input data. The second object data detecting section 16 supplies the second object data to the manipulating section 15.

In step S22, the manipulating section 15 manipulates the first object data from the processing section 11 according to the sensing parameter supplied from the parameter setting section 14, and subjects the first object data after the manipulation to editing using the second object data supplied from the second object data detecting section 16 according to the editing parameter supplied from the parameter setting section 14. The manipulating section 15 outputs data obtained as a result as output data.

Then, the process waits for next input data to be supplied to the processing section 11 and the second object data detecting section 16, and returns from step S22 to step S21 to thereafter repeat a similar process.

Incidentally, while an object sensed by the sensor device is light that can be felt by the sense of sight in FIGS. 1 to 4, the object sensed by the sensor device is not limited to light, but may be for example sound that can be felt by the sense of hearing or a stimulus that can be felt by the sense of smell, the sense of taste, or the sense of touch.

Figure 5:
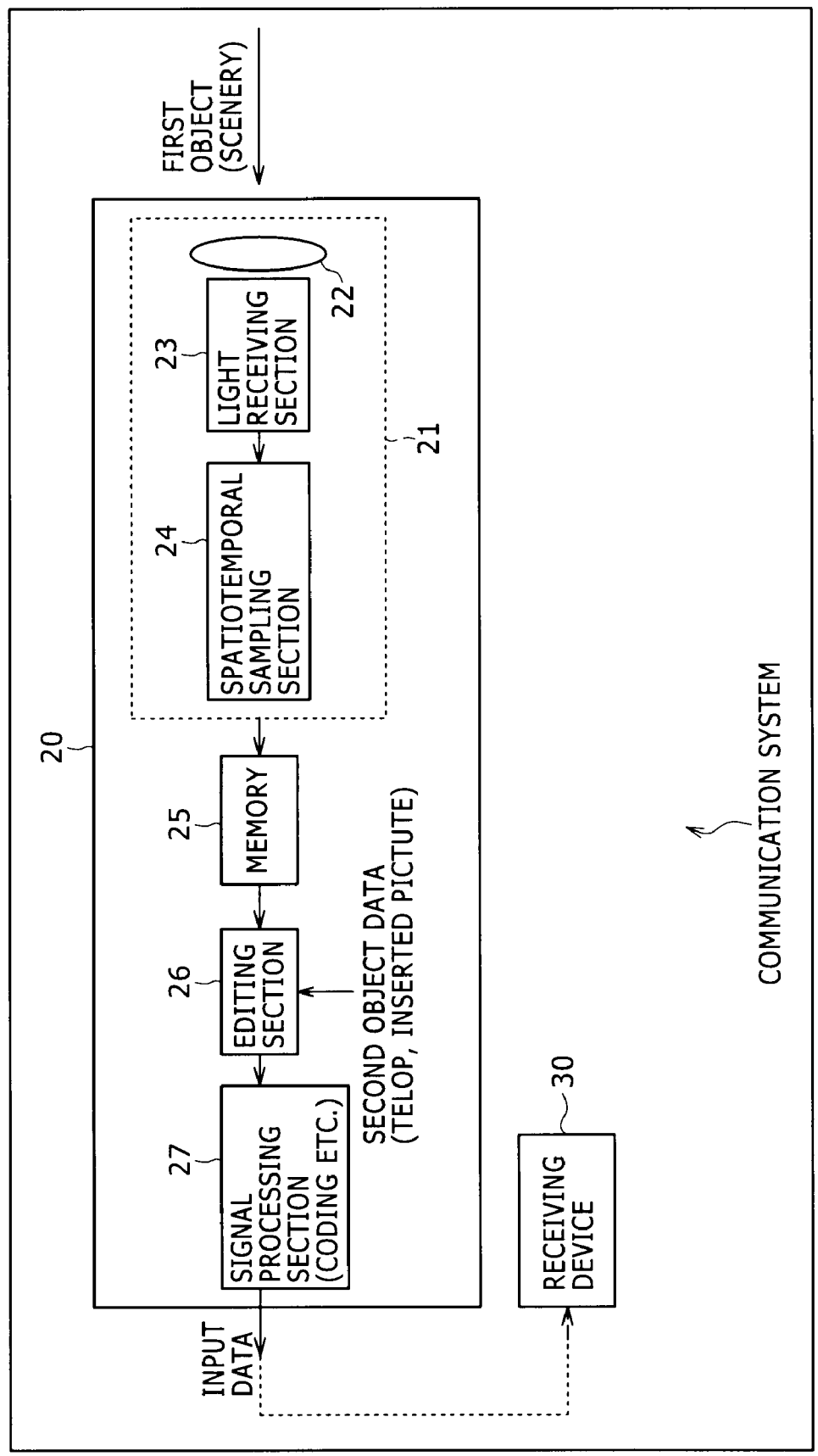
FIG. 5 is a block diagram showing an example of configuration of an embodiment of a communication system to which the data processing device is applied.

Next, FIG. 5 is a block diagram showing an example of configuration of an embodiment of a communication system to which the data processing device of FIG. 1 or FIG. 3 is applied.

In FIG. 5, the communication system includes a transmitting device 20 and a receiving device 30. The communication system for example transmits and receives image data as a program of television broadcasting.

Incidentally, transmission and reception of audio (sound) data as a program will be described later.

The transmitting device 20 is for example installed in a broadcasting station that broadcasts programs or the like. The transmitting device 20 transmits image data as a program.

Specifically, the transmitting device 20 includes an image pickup device 21, a memory 25, an editing section 26, and a signal processing section 27.

In FIG. 5, the above-described sensor device is the image pickup device 21 that picks up an image of the real world via an optical system 22.

The image pickup device 21 obtains first object picked-up image data (corresponding to sensing data) by picking up an image of a first object such as scenery (view) of the real world or the like via the optical system 22 and sampling the first object in a spatiotemporal direction. The image pickup device 21 supplies the first object picked-up image data to the memory 25.

Specifically, the image pickup device 21 includes the optical system 22, a light receiving section 23, and a spatiotemporal sampling section 24.

Light from the first object such as scenery (view) of the real world or the like enters the light receiving section 23 via the optical system 22.

The light receiving section 23 and the spatiotemporal sampling section 24 are blocks modeling a photoelectric conversion element for converting light to image data as an electric signal (for example a CCD (Charge Coupled Device) or CMOS (Complementary Metal Oxide Semiconductor) imager or the like). The light receiving section 23 receives light from the optical system 22, and supplies an analog signal corresponding to the amount of the received light to the spatiotemporal sampling section 24.

The spatiotemporal sampling section 24 samples the analog signal from the light receiving section 23 in a spatial direction and a temporal direction. The spatiotemporal sampling section 24 supplies image data as a result of the sampling as first object picked-up image data to the memory 25.

The interval of the sampling in the spatial direction of the spatiotemporal sampling section 24 corresponds to the interval of pixels of the photoelectric conversion element. The interval of the sampling in the temporal direction of the spatiotemporal sampling section 24 corresponds to the cycle of frames (fields).

The memory 25 temporarily stores the first object picked-up image data supplied from the spatiotemporal sampling section 24 of the image pickup device 21.

The editing section 26 reads the first object picked-up image data stored in the memory 25, superimposes, by editing, second object image data (corresponding to second object data) as image data representing a telop or the like as a second object, for example, on the first object picked-up image data, and supplies the result to the signal processing section 27.

The signal processing section 27 performs signal processing such for example as MPEG coding or the like on the first object picked-up image data on which the second object image data is superimposed from the editing section 26. The signal processing section 27 outputs image data obtained as a result of the signal processing as input data.

The input data obtained in the signal processing section 27 is transmitted to the receiving device 30 and received by the receiving device 30.

The receiving device 30 is for example a television receiver or a tuner as an image processing device to which the data processing device of FIG. 1 or FIG. 3 is applied. The receiving device 30 processes the input data transmitted from the transmitting device 20 as described above.

Figure 6:
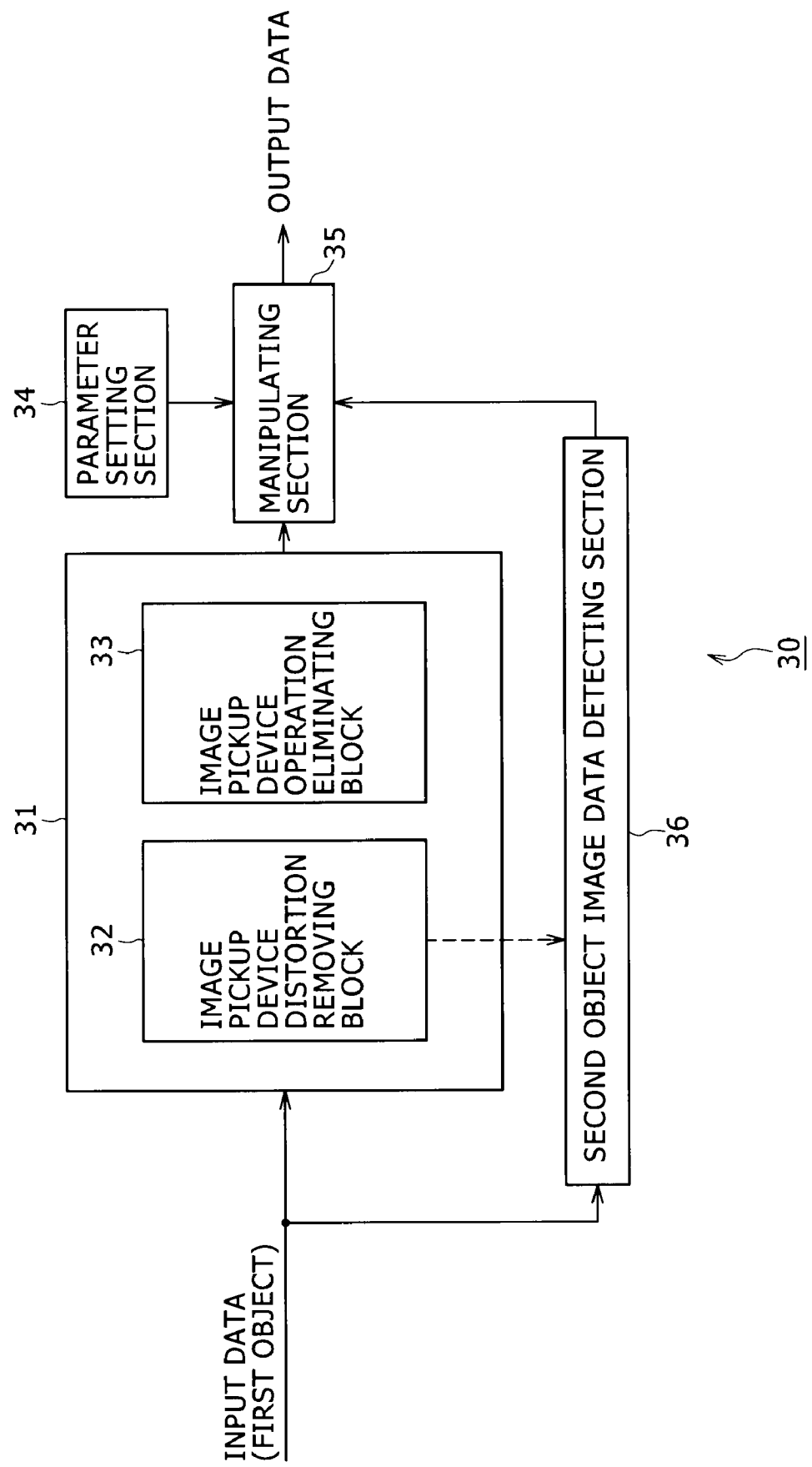
FIG. 6 is a block diagram showing a first example of configuration of a receiving device 30.

Specifically, FIG. 6 is a block diagram showing a first example of configuration of the receiving device 30 in FIG. 5.

In FIG. 6, the receiving device 30 includes a processing section 31, a parameter setting section 34, a manipulating section 35, and a second object image data detecting section 36. The input data from the transmitting device 20 in FIG. 5 is supplied to the processing section 31 and the second object image data detecting section 36.

The processing section 31 (corresponding to the processing section 11 in FIG. 3) includes an image pickup device distortion removing block 32 and an image pickup device operation eliminating block 33. The processing section 31 processes the input data supplied thereto.

Specifically, the image pickup device distortion removing block 32 (corresponding to the sensor device distortion removing block 12 in FIG. 3) removes distortion occurring when the image pickup device 21 (FIG. 5) picks up an image of the first object and distortion caused by the signal processing in the signal processing section 27 (FIG. 5), which distortion is included in the input data supplied to the processing section 31.

The image pickup device operation eliminating block 33 (corresponding to the sensor device position eliminating block 13 in FIG. 3) detects relative operation of the image pickup device 21 with respect to the first object from the input data supplied to the processing section 31, adds in the input data while compensating by the operation of the image pickup device 21, and thereby generates first object image data representing the first object before the image pickup device 21 picks up the image of the first object, that is, for example first object image data that is image data having a wider angle of view (wider angle) than image data of one frame picked up by the image pickup device 21 and which is image data from which the image data of a telop or the like as second object image data is removed.

The first object image data obtained in the processing section 31 as described above is supplied to the manipulating section 35.

Meanwhile, the parameter setting section 34 (corresponding to the parameter setting section 14 in FIG. 3) for example sets an image pickup parameter as a parameter used to pick up an image of the first object, that is, for example an image pickup parameter for identifying image data of one frame to be extracted from the first object image data as a sensing parameter according to an operation of the user. The parameter setting section 34 supplies the image pickup parameter to the manipulating section 35.

In addition, the parameter setting section 34 for example sets an editing parameter used for editing using the second object image data and the like, that is, for example an editing parameter indicating a manner of superimposing the image data of a telop as second object image data according to an operation of the user. The parameter setting section 34 supplies the editing parameter to the manipulating section 35.

In this case, the image pickup parameter includes positional information indicating a horizontal position and a vertical position of image data (hereinafter referred to as extraction image data as appropriate) having a size of one frame to be extracted from the first object image data as wide-angle image data, the speed and acceleration of panning or tilting when image data that would be obtained if the user performed image pickup while panning or tilting a video camera in the real world with the positions indicated by the positional information as initial positions is obtained, the zoom magnification of a zoom when image data that would be obtained if the user performed image pickup while adjusting the zoom of the video camera in the real world is obtained, and the like.

The first object image data is image data having a wider angle than image data of one frame picked up by the image pickup device 21 as described above. Thus, by changing the positions where the extraction image data is extracted from the wide-angle image data, image data as if the user performed image pickup while panning or tilting the video camera in the real world can be obtained.

Further, image data as if the user performed image pickup while adjusting the zoom of the video camera in the real world can be obtained by adjusting (for example reducing) the range of the image data extracted from the first object image data and performing interpolation (or class classification adaptive processing).

In addition, the editing parameter includes positional information indicating a horizontal position and a vertical position where the second object image data as image data of a telop is superimposed on the extraction image data, and the size of the second object image data. Further, when the telop is moved, the speed and acceleration of the movement can be set as the editing parameter, and when the size of the telop is changed, the manner (pattern) of the change can be set as the editing parameter.

The manipulating section 35 (corresponding to the manipulating section 15 in FIG. 3) synthesizes the first object image data from the processing section 31 and the second object image data from the second object image data detecting section 36 according to the image pickup parameter and the editing parameter from the parameter setting section 34.

Specifically, the second object image data detecting section 36 (corresponding to the second object data detecting section 16 in FIG. 3) detects the second object image data as image data of the telop or the like from the input data supplied thereto. The second object image data detecting section 36 supplies the second object image data to the manipulating section 35.

The manipulating section 35 extracts the extraction image data from the first object image data from the processing section 31 according to the image pickup parameter from the parameter setting section 34. Further, the manipulating section 35 superimposes the image data of the telop as the second object image data from the second object image data detecting section 36 on the extraction image data according to the editing parameter from the parameter setting section 34. The manipulating section 35 outputs image data obtained as a result as output data.

The image data as the output data is supplied to a monitor not shown in the figure, and displayed.

As described above, the processing section 31 generates the first object image data as image data having a wider angle than image data obtained by image pickup by the image pickup device 21, and the manipulating section 35 extracts the extraction image data from the first object image data according to the image pickup parameter set according to an operation of the user. Thus, the user can have a bodily sensation of collecting a material of image data.

That is, the user can enjoy a feeling as if the user were picking up an image of the first object by the video camera in the real world.

Further, the manipulating section 35 superimposes the image data of the telop as the second object image data on the extraction image data according to the editing parameter set according to an operation of the user. Thus, the user can have a bodily sensation of editing image data.

Incidentally, in FIG. 6, the second object image data detecting section 36 detects the second object image data from the input data itself. However, the second object image data detecting section 36 can also detect the second object image data from the input data after being processed in the image pickup device distortion removing block 32, as indicated by a dotted line in FIG. 6.

In addition, the processing section 31 can process the input data from which the second object image data detected in the second object image data detecting section 36 is removed, rather than the input data itself.

That is, the processing section 31 can remove the second object image data detected in the second object image data detecting section 36 from the input data, and process the input data after the removal.

Figure 7:
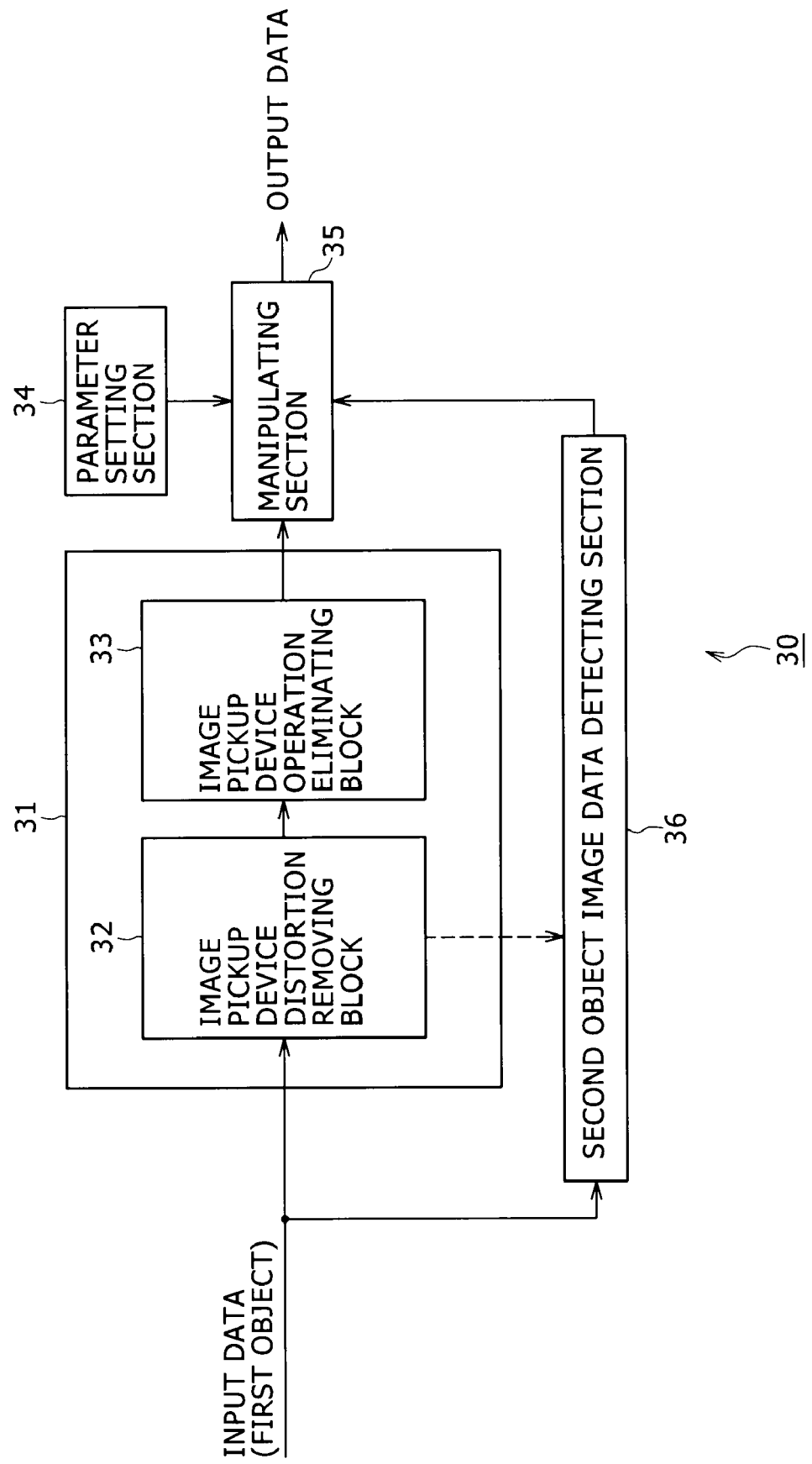
FIG. 7 is a block diagram showing an example of configuration of a processing section 31.

Next, FIG. 7 shows another example of configuration of the processing section 31 in FIG. 6.

In FIG. 6, the order of processing by the image pickup device distortion removing block 32 and the image pickup device operation eliminating block 33 in the processing section 31 is arbitrary. In FIG. 7, however, the image pickup device distortion removing block 32 processes the input data supplied to the processing section 31, and thereafter the image pickup device operation eliminating block 33 processes the input data after being processed by the image pickup device distortion removing block 32.

Incidentally, the image pickup device operation eliminating block 33 can process the input data supplied to the processing section 31, and the image pickup device distortion removing block 32 can thereafter process the input data after being processed by the image pickup device operation eliminating block 33.

Figure 8:
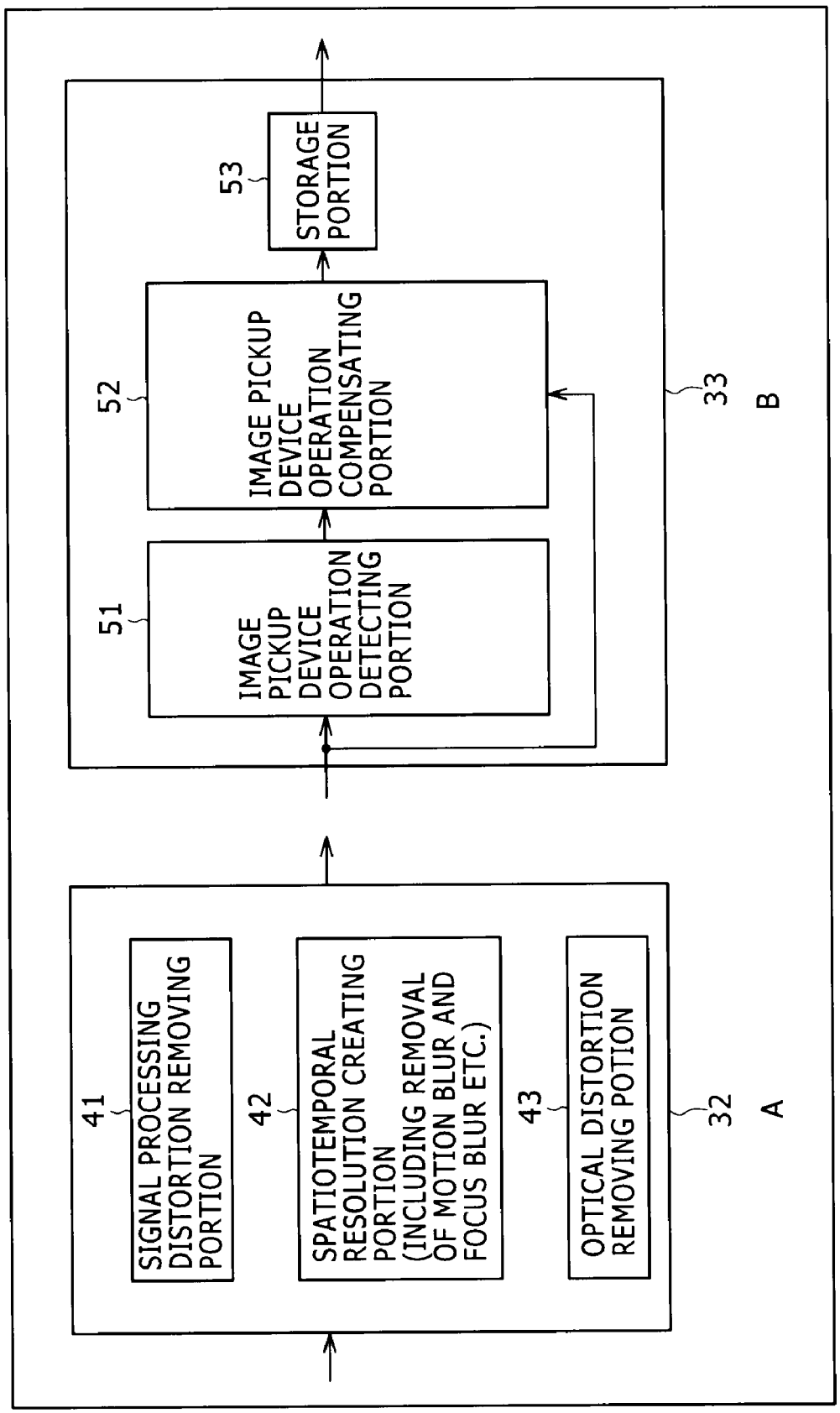
FIG. 8 is a block diagram showing an example of configuration of an image pickup device distortion removing block 32 and an image pickup device operation eliminating block 33.

FIG. 8 shows an example of configuration of the image pickup device distortion removing block 32 and the image pickup device operation eliminating block 33 in FIG. 7 (and FIG. 6).

Specifically, FIG. 8A shows an example of configuration of the image pickup device distortion removing block 32 in FIG. 7.

In FIG. 8A, the image pickup device distortion removing block 32 includes a signal processing distortion removing portion 41, a spatiotemporal resolution creating portion 42, and an optical distortion removing portion 43.

The signal processing distortion removing portion 41 removes distortion caused by the signal processing by the signal processing section 27 of the transmitting device 20 (FIG. 5) from the input data supplied thereto.

Specifically, when the signal processing section 27 performs MPEG coding as the signal processing in the transmitting device 20, the signal processing distortion removing portion 41 performs a signal processing distortion removing process that for example subjects the input data to MPEG decoding and which further removes block distortion or the like caused by the MPEG coding/decoding.

Incidentally, the MPEG decoding can be performed not only in the signal processing distortion removing portion 41 but also in the spatiotemporal resolution creating portion 42, the optical distortion removing portion 43, or another block (including a block not shown in the figure) than the signal processing distortion removing portion 41, the spatiotemporal resolution creating portion 42, and the optical distortion removing portion 43.

The spatiotemporal resolution creating portion 42 improves resolution in a spatiotemporal direction of image data as the input data supplied thereto.

Specifically, even when the monitor of the receiving device 30 is a high-performance monitor capable of displaying an image that faithfully reproduces the real world, image quality, that is, for example spatial resolution and temporal resolution (frame rate) of an image displayable on the monitor is limited by the performance of the image pickup device 21 of the transmitting device 20 (FIG. 5).

Accordingly, the spatiotemporal resolution creating portion 42 improves the resolution in the spatiotemporal direction of image data as the input data in order to display an image of sufficient image quality on the monitor.

Incidentally, the spatiotemporal resolution creating portion 42 also removes a motion blur caused by hand movement and a focus blur caused by a defocus state, for example, by improving the resolution in the spatiotemporal direction.

The optical distortion removing portion 43 removes distortion caused by the optical system 22 of the transmitting device 20 (FIG. 5) (for example distortion of an image which distortion is caused by an aberration of the optical system 22) from the input data supplied thereto.

Incidentally, order in which the signal processing distortion removing portion 41, the spatiotemporal resolution creating portion 42, and the optical distortion removing portion 43 perform processing in the image pickup device distortion removing block 32 is not particularly limited.

In addition, processing performed by the signal processing distortion removing portion 41, the spatiotemporal resolution creating portion 42, and the optical distortion removing portion 43 in the image pickup device distortion removing block 32 can be performed collectively by class classification adaptive processing.

FIG. 8B shows an example of configuration of the image pickup device operation eliminating block 33 in FIG. 7.

In FIG. 8B, the image pickup device operation eliminating block 33 includes an image pickup device operation detecting portion 51, an image pickup device operation compensating portion 52, and a storage portion 53.

The image pickup device operation detecting portion 51 detects a relative operation on the first object by the image pickup device 21 (FIG. 5), that is, for example an operation of panning, tilting, or zooming the image pickup device 21 from the input data after being processed in the image pickup device distortion removing block 32. The image pickup device operation detecting portion 51 supplies operation information indicating the operation to the image pickup device operation compensating portion 52.

The image pickup device operation compensating portion 52 adds the input data after being processed in the image pickup device distortion removing block 32 into the storage portion 53 while compensating by the operation of the image pickup device 21 which operation is indicated by the operation information from the image pickup device operation detecting portion 51. The image pickup device operation compensating portion 52 thereby generates first object image data representing the first object before the image pickup device 21 picks up an image of the first object.

Specifically, the storage portion 53 has a sufficiently larger storage capacity than image data of one frame picked up by the image pickup device 21. The image pickup device operation compensating portion 52 writes image data of a frame immediately after a scene change, for example, of image data of a moving image as the input data after being processed in the image pickup device distortion removing block 32 to the storage portion 53 as an initial value.

Further, the image pickup device operation compensating portion 52 performs adding in that performs weighting addition of image data of a frame next to the frame immediately after the scene change and subsequent frames, for example, of the image data of the moving image as the input data after being processed in the image pickup device distortion removing block 32 to image data stored in the storage portion 53 while performing registration with the image data of the frame immediately after the scene change according to the operation of the image pickup device 21 such as panning, tilting, or zooming indicated by the operation information from the image pickup device operation detecting portion 51.

Thereby, when image pickup by the image pickup device 21 of the transmitting device 20 (FIG. 5) is performed while panning, tilting, or zooming (including making an angle of view of an image being picked up both a wide angle of view and a telescopic angle of view) as appropriate, the storage portion 53 stores first object image data representing the first object before the image pickup device 21 picks up the image of the first object, that is, image data having a wider angle than image data of one frame picked up by the image pickup device 21, that is, for example image data of a range that would be seen if the user viewed the first object in the real world.

Incidentally, suppose that the first object appearing in the image data (the image corresponding to the image data) processed by the image pickup device operation compensating portion 52 is a stationary object such as scenery (view), for example. In this case, when the image data being processed by the image pickup device operation compensating portion 52 includes second object image data such as image data of a moving telop and other image data of a moving object, the image pickup device operation compensating portion 52 adds in the image data while performing registration, whereby the image data of the moving objects is gradually erased (removed).

That is, the image data stored in the storage portion 53 is the first object image data representing only the first object before the image pickup device 21 picks up an image of the first object.

Figure 9:
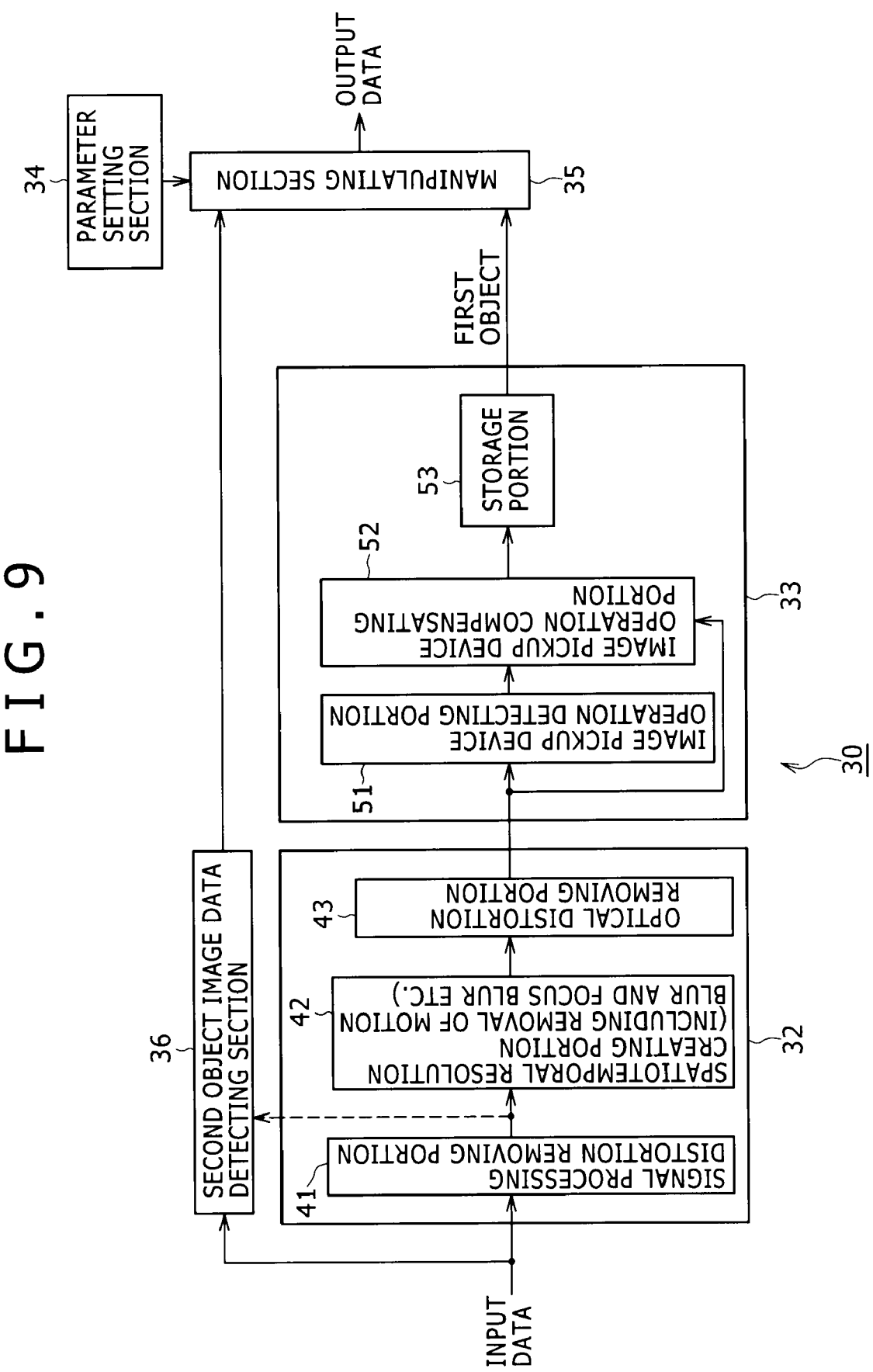
FIG. 9 is a block diagram showing an example of configuration of the image pickup device distortion removing block 32.

FIG. 9 shows another example of configuration of the image pickup device distortion removing block 32 in the receiving device 30.

In FIG. 8A, order in which the signal processing distortion removing portion 41, the spatiotemporal resolution creating portion 42, and the optical distortion removing portion 43 perform processing in the image pickup device distortion removing block 32 is not particularly limited. In FIG. 9, however, the signal processing distortion removing portion 41, the spatiotemporal resolution creating portion 42, and the optical distortion removing portion 43 perform processing in this order.

Specifically, in FIG. 9, input data from the transmitting device 20 (FIG. 5) is supplied to the image pickup device distortion removing block 32 and the second object image data detecting section 36.

The signal processing distortion removing portion 41 in the image pickup device distortion removing block 32 removes distortion caused by signal processing by the signal processing section 27 of the transmitting device 20 from image data as the input data from the transmitting device 20 (FIG. 5), and then supplies the image data to the spatiotemporal resolution creating portion 42.

The spatiotemporal resolution creating portion 42 improves resolution in the spatiotemporal direction of the image data from the signal processing distortion removing portion 41. The spatiotemporal resolution creating portion 42 supplies image data obtained as a result to the optical distortion removing portion 43.

The optical distortion removing portion 43 removes distortion caused by the optical system 22 of the transmitting device 20 (FIG. 5) from the image data from the spatiotemporal resolution creating portion 42. The optical distortion removing portion 43 supplies the image data to the image pickup device operation eliminating block 33.

The image pickup device operation detecting portion 51 in the image pickup device operation eliminating block 33 detects relative operation of the image pickup device 21 (FIG. 5) with respect to the first object, that is, for example operation such as panning, tilting, zooming or the like of the image pickup device 21 from the image data from the image pickup device distortion removing block 32 (the optical distortion removing portion 43 in the image pickup device distortion removing block 32). The image pickup device operation detecting portion 51 supplies operation information indicating the operation to the image pickup device operation compensating portion 52.

The image pickup device operation compensating portion 52 registers the image data from the image pickup device distortion removing block 32 (registration that makes the position of the first object appearing in images corresponding to the image data coincide) according to the operation of the image pickup device 21 such as panning, tilting, zooming or the like indicated by the operation information from the image pickup device operation detecting portion 51, and performs adding in that performs weighting addition of the image data after the registration to image data stored in the storage portion 53.

Thereby, as described above, the storage portion 53 stores first object image data (wide-angle image data) representing the first object before the image pickup device 21 picks up an image of the first object.

The first object image data stored in the storage portion 53 is supplied to the manipulating section 35.

Meanwhile, the second object image data detecting section 36 detects second object image data as image data of a telop or the like from the image data as the input data from the transmitting device 20 (which image data is obtained by MPEG decoding of the input data when the input data from the transmitting device 20 is MPEG-coded). The second object image data detecting section 36 supplies the second object image data to the manipulating section 35.

As described above, the manipulating section 35 is supplied with the first object image data from the storage portion 53 and supplied with the second object image data from the second object image data detecting section 36, and is also supplied with the image pickup parameter and the editing parameter from the parameter setting section 34.

Specifically, according to an operation of the user, the parameter setting section 34 sets the image pickup parameter such as positional information indicating a horizontal position and a vertical position of extraction image data to be extracted from the first object image data, the speed and acceleration of panning or tilting of the video camera, a zoom magnification and the like. The parameter setting section 34 supplies the image pickup parameter to the manipulating section 35.

Further, according to an operation of the user, the parameter setting section 34 sets the editing parameter such as positional information (including information indicating whether to perform superimposition) indicating a horizontal position and a vertical position at which to superimpose the second object image data as image data of a telop on the extraction image data, the size of the telop, a speed and an acceleration at which to move the telop (including the angular velocity of rotation when the telop is rotated), a manner of changing the size of the telop, and the like. The parameter setting section 34 supplies the editing parameter to the manipulating section 35.

The manipulating section 35 extracts the extraction image data from the first object image data from the storage portion 53 according to the image pickup parameter from the parameter setting section 34. Further, the manipulating section 35 superimposes the image data of the telop as the second object image data from the second object image data detecting section 36 on the extraction image data according to the editing parameter from the parameter setting section 34. The manipulating section 35 outputs image data obtained as a result as output data.

The image data as the output data is supplied to a monitor not shown in the figure, and displayed.

Thus, the user can view an image as if the user were actually performing image pickup by the video camera in the real world while performing an operation of panning, tilting, zooming or the like by operating the parameter setting section 34.

Further, by operating the parameter setting section 34, the user can turn on or off display of the image data of the telop as the second object image data, and change the display of the telop to a desired display when the display of the image data of the telop is turned on.

Incidentally, the second object image data detecting section 36 can not only detect the second object image data from the input data but also detect the second object image data from image data after being processed in the signal processing distortion removing portion 41, as indicated by a dotted line in FIG. 9.

Figure 10:
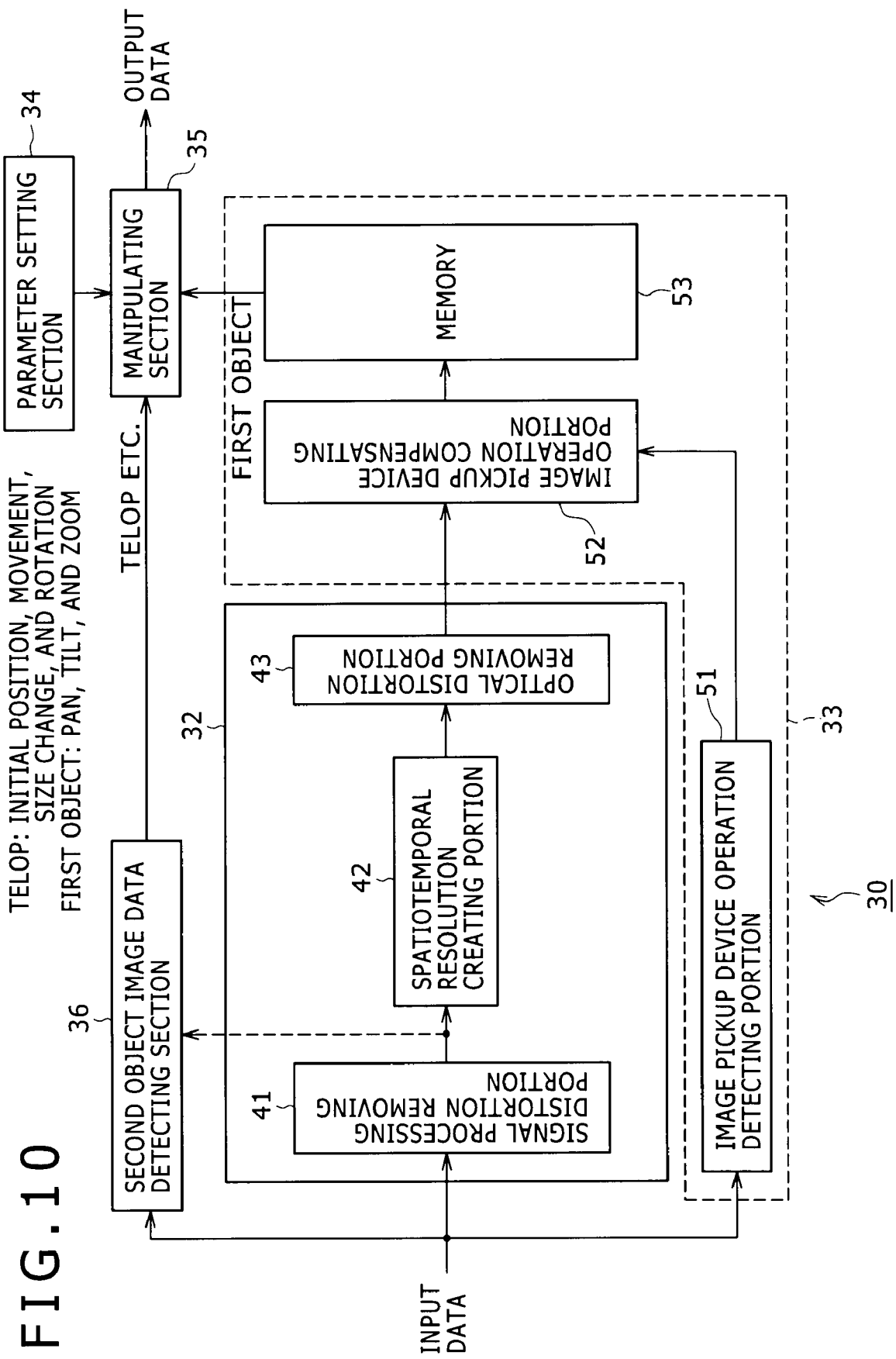
FIG. 10 is a block diagram showing a second example of configuration of the receiving device 30.

FIG. 10 shows a second example of configuration of the receiving device 30 in FIG. 5.

Incidentally, in the figure, parts corresponding to those of FIGS. 6 to 9 are identified by the same reference numerals, and description thereof will be omitted in the following as appropriate.

In FIG. 9, the image pickup device operation detecting portion 51 is supplied with the image data after processing of the optical distortion removing portion 43. However, in the receiving device 30 of FIG. 10, the image pickup device operation detecting portion 51 is supplied with the same input data as supplied to the processing section 31. The image pickup device operation detecting portion 51 detects relative operation of the image pickup device 21 (FIG. 5) with respect to the first object from the input data, and supplies operation information indicating the operation to the image pickup device operation compensating portion 52.

The receiving device 30 of FIG. 10 performs similar processing to that of FIG. 9 as other processing, and therefore description thereof will be omitted.

Figure 11:
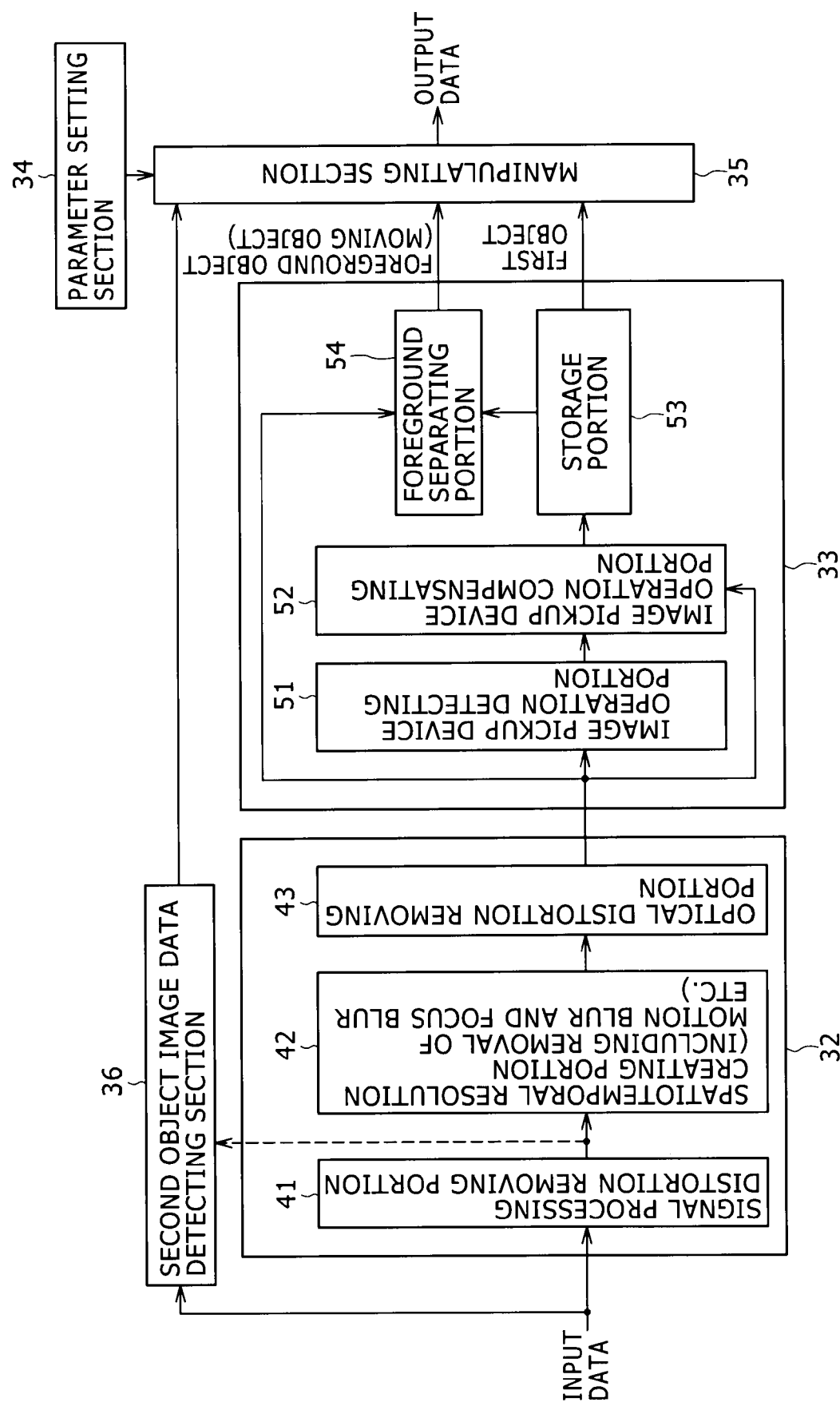
FIG. 11 is a block diagram showing a third example of configuration of the receiving device 30.

FIG. 11 shows a third example of configuration of the receiving device 30 in FIG. 5.

Incidentally, in the figure, parts corresponding to those of FIGS. 6 to 9 are identified by the same reference numerals, and description thereof will be omitted in the following as appropriate.

The receiving device 30 of FIG. 11 is different from FIG. 9 in that a foreground separating portion 54 is newly provided to the image pickup device operation eliminating block 33.

The foreground separating portion 54 is supplied with input data after processing of the optical distortion removing portion 43 and first object image data stored in the storage portion 53.

The foreground separating portion 54 compares the input data from the optical distortion removing portion 43 and the first object image data stored in the storage portion 53 with each other. Thereby, when image data of other than the first object which image data is included in the input data, that is, for example second object image data such as image data of a telop or the like and for example third object image data representing a third object, which is a person, an animal, a vehicle such as an automobile or the like, or another moving object are included as a so-called foreground in the input data, the foreground separating portion 54 functions as an image generating portion for generating the second object image data and the third object image data.

That is, the foreground separating portion 54 separates the second object image data and the third object image data from the input data by subtracting image data, which is included in the first object image data stored in the storage portion 53, of a range corresponding to image data as the input data from the input data. The foreground separating portion 54 supplies the second object image data and the third object image data to the manipulating section 35.

The manipulating section 35 synthesizes the first object image data stored in the storage portion 53, the second object image data from the second object image data detecting section 36, and the third object image data supplied from the foreground separating portion 54 according to the image pickup parameter and the editing parameter from the parameter setting section 34.

In this case, in FIG. 11, according to an operation of the user, the parameter setting section 34 sets not only the editing parameter for the second object image data as image data of the telop but also the editing parameter for the third object image data as the image data of the foreground, that is, for example the editing parameter such as positional information indicating a horizontal position and a vertical position at which to superimpose the foreground on extraction image data, the size of the foreground, a speed and an acceleration at which to move the foreground (including the angular velocity of rotation when the foreground is rotated), a manner of changing the size of the foreground, and the like. The parameter setting section 34 supplies the editing parameter to the manipulating section 35.

The manipulating section 35 compares the second object image data and the third object image data from the foreground separating portion 54 with the second object image data from the second object image data detecting section 36, and thereby separates the third object image data from the second object image data and the third object image data from the foreground separating portion 54.

Then, the manipulating section 35 extracts extraction image data from the first object image data from the storage portion 53 according to the image pickup parameter from the parameter setting section 34. Further, the manipulating section 35 superimposes the image data of the telop as the second object image data from the second object image data detecting section 36 on the extraction image data according to the editing parameter from the parameter setting section 34, and superimposes the image data of the foreground as the third object image data on the extraction image data according to the editing parameter from the parameter setting section 34. The manipulating section 35 outputs image data obtained as a result as output data.

The image data as the output data is supplied to a monitor not shown in the figure, and displayed.

As in the cases of FIGS. 6 to 9, the receiving device 30 of FIG. 11 allows the user to have a bodily sensation of collection of a material and editing.

Further, the receiving device 30 of FIG. 11 makes it possible to edit not only the image data of the telop as the second object image data but also the image data of the foreground as the third object image data.

Figure 12:
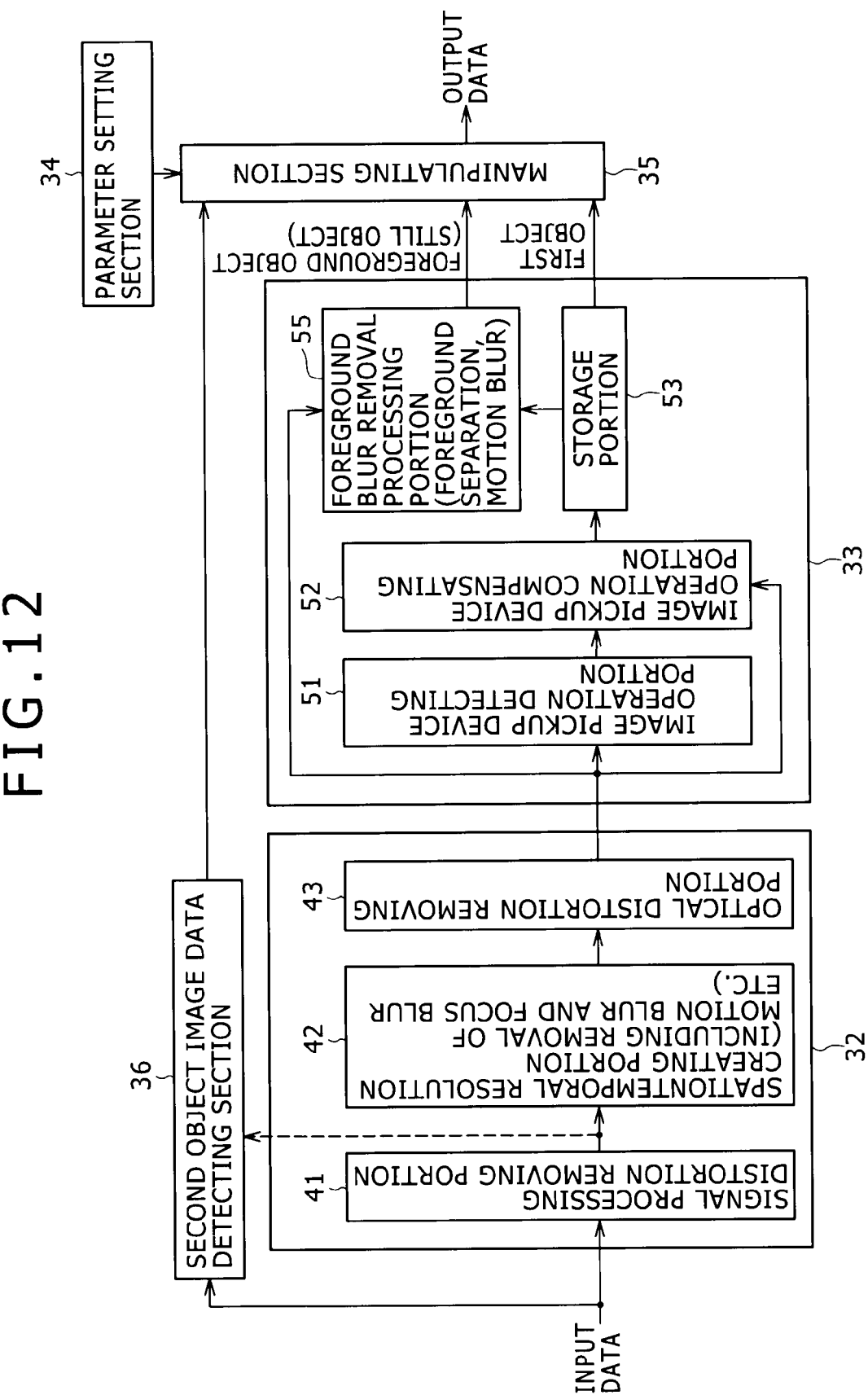
FIG. 12 is a block diagram showing a fourth example of configuration of the receiving device 30.

FIG. 12 shows a fourth example of configuration of the receiving device 30 in FIG. 5.

Incidentally, in the figure, parts corresponding to those of FIGS. 6 to 9 are identified by the same reference numerals, and description thereof will be omitted in the following as appropriate.

The receiving device 30 of FIG. 12 is different from FIG. 9 in that a foreground blur removal processing portion 55 is newly provided to the image pickup device operation eliminating block 33.

The foreground blur removal processing portion 55 is supplied with input data after processing of the optical distortion removing portion 43 and first object image data stored in the storage portion 53.

As with the foreground separating portion 54 in FIG. 11, the foreground blur removal processing portion 55 compares the input data from the optical distortion removing portion 43 and the first object image data stored in the storage portion 53 with each other. Thereby, when image data of other than a first object which image data is included in the input data, that is, for example second object image data such as image data of a telop or the like and third object image data representing a third object as a foreground are included in the input data, the foreground blur removal processing portion 55 functions as an image generating portion for generating the second object image data and the third object image data.

However, the foreground blur removal processing portion 55 generates the third object image data whose motion blur is reduced using the input data and the first object image data stored in the storage portion 53, assuming that the pixel values of pixels of the third object included in the input data are values obtained by integrating the pixel values of respective pixels free from the motion blur in a temporal direction while moving the pixel values of the respective pixels free from the motion blur. The foreground blur removal processing portion 55 supplies the third object image data whose motion blur is reduced to the manipulating section 35.

The manipulating section 35 synthesizes the first object image data stored in the storage portion 53, the second object image data from the second object image data detecting section 36, and the third object image data supplied from the foreground blur removal processing portion 55 according to the image pickup parameter and the editing parameter from the parameter setting section 34.

In this case, also in FIG. 12, as in FIG. 11, according to an operation of the user, the parameter setting section 34 sets not only the editing parameter for the second object image data as image data of the telop but also the editing parameter for the third object image data as the image data of the foreground. The parameter setting section 34 supplies the editing parameter to the manipulating section 35.

The manipulating section 35 extracts extraction image data from the first object image data from the storage portion 53 according to the image pickup parameter from the parameter setting section 34. Further, the manipulating section 35 superimposes the image data of the telop as the second object image data from the second object image data detecting section 36 on the extraction image data according to the editing parameter from the parameter setting section 34, and superimposes the image data of the foreground as the third object image data on the extraction image data according to the editing parameter from the parameter setting section 34. The manipulating section 35 outputs image data obtained as a result as output data.

The image data as the output data is supplied to a monitor not shown in the figure, and displayed.

As in the case of FIG. 11, the receiving device 30 of FIG. 12 also allows the user to have a bodily sensation of collection of a material and editing, and edit each of the image data of the telop as the second object image data and the image data of the foreground as the third object image data.

Figure 13:
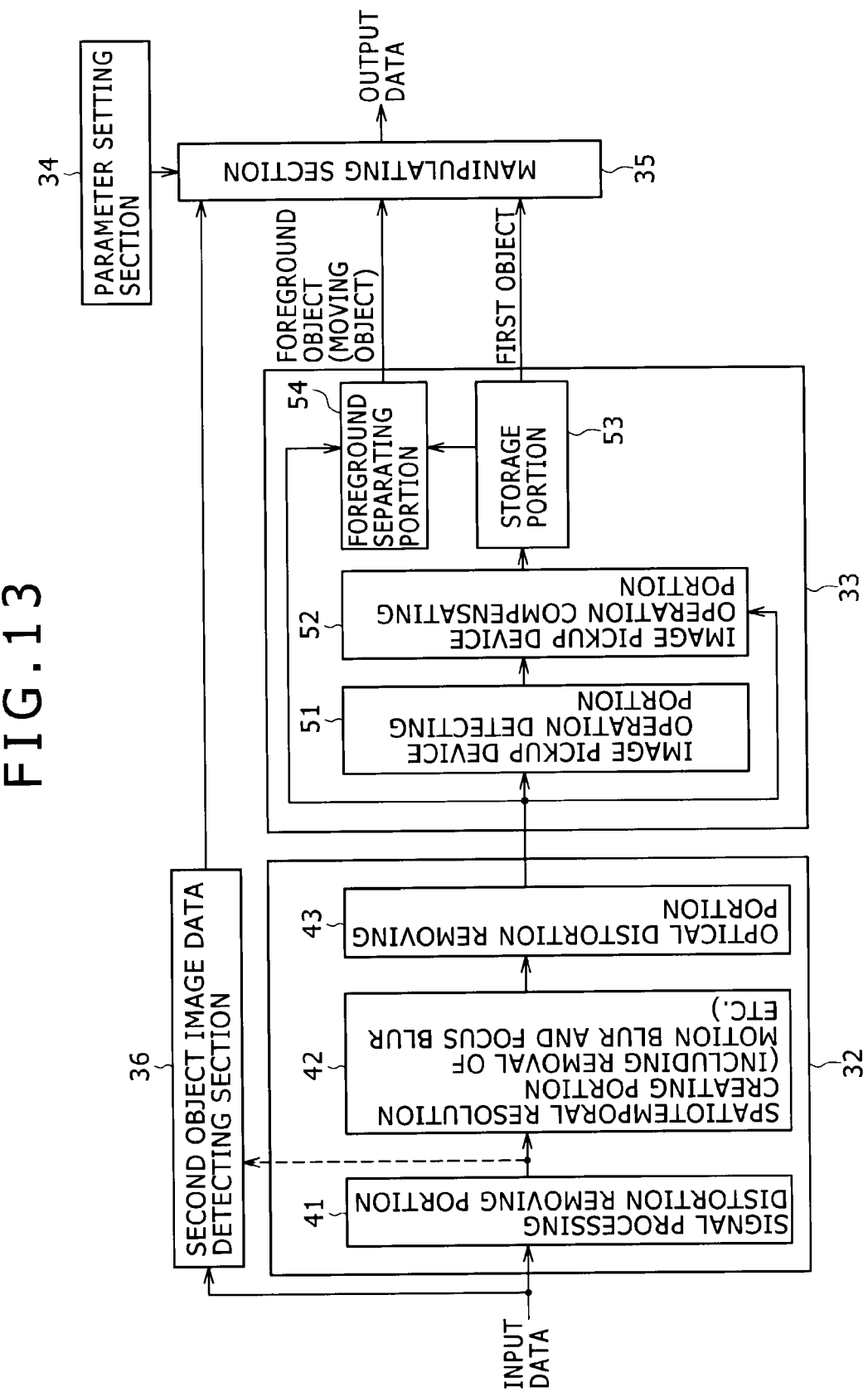
FIG. 13 is a block diagram showing a fifth example of configuration of the receiving device 30.

FIG. 13 shows a fifth example of configuration of the receiving device 30 in FIG. 5.

Incidentally, in the figure, parts corresponding to those of FIG. 11 are identified by the same reference numerals.

The receiving device 30 of FIG. 13 is formed in a similar manner to that of FIG. 11.

However, for example, according to an operation of the user, the parameter setting section 34 in the receiving device 30 of FIG. 13 sets the image pickup parameter and the editing parameter as described above, and generates a size ratio as a ratio between the size of a screen of a monitor as an output destination to which the manipulating section 35 outputs output data and the size of third object image data.

Further, when the size of the screen of the monitor as the output destination is changed by replacing the monitor as the output destination to which the manipulating section 35 performs output, for example, the parameter setting section 34 adjusts the editing parameter for editing the size of the third object image data according to the size ratio. The parameter setting section 34 then supplies the editing parameter to the manipulating section 35.

Specifically, in FIG. 13, for an object that can be a foreground such as the face of a person or the like, the parameter setting section 34 stores a size (an average size of the faces of people, for example) perceived as the face of a person in the real world by the user when the face of the person as the object is displayed on a monitor, for example, as reference size A (in cm, inches, or the like).

The parameter setting section 34 recognizes size B of a screen of the monitor as an output destination (in cm, inches, or the like), and determines a size ratio A/B between reference size A of the face of a person as an object whose third object image data is obtained in the foreground separating portion 54 and size B of the screen of the monitor as the output destination.

Then, according to the size ratio A/B, the parameter setting section 34 adjusts the editing parameter specifying the size of the third object image data as image data of the face of a person which image data is obtained in the foreground separating portion 54 such that ratio M/N between the number M of pixels of the face of the person displayed on the monitor as output destination and the number N of pixels of the monitor as output destination is the size ratio A/B. The parameter setting section 34 supplies the editing parameter to the manipulating section 35.

In this case, reference size A of the face of the person is for example a size when the face of the person at a position distant from the image pickup device 21 (FIG. 5) by a predetermined reference distance (for example a position immediately in front of the image pickup device 21) is viewed in the real world. A quantity for adjusting the editing parameter specifying the size of the third object image data is corrected according to a ratio between the distance of the person corresponding to the third object image data from the image pickup device 21 and a reference distance.

Specifically, for example, when the person corresponding to the third object image data is far away from the image pickup device 21, the editing parameter specifying the size of the third object image data is corrected such that the size of the face of the person displayed on the monitor as output destination is smaller than reference size A.

Incidentally, suppose that the distance of the person corresponding to the third object image data from the image pickup device 21 is included in input data from the transmitting device 20, for example.

In addition, reference size A of each object can be stored in the parameter setting section 34 in advance, or transmitted from the transmitting device 20 in a state of being included in the input data, for example.

The manipulating section 35 extracts extraction image data from first object image data from the storage portion 53 according to the image pickup parameter from the parameter setting section 34. Further, the manipulating section 35 superimposes the image data of a telop as second object image data from the second object image data detecting section 36 on the extraction image data according to the editing parameter from the parameter setting section 34, and superimposes the image data of the foreground as the third object image data on the extraction image data according to the editing parameter from the parameter setting section 34. The manipulating section 35 outputs image data obtained as a result as output data.

The image data as the output data is supplied to the monitor not shown in the figure, and displayed.

In this case, the monitor for example displays the face of a person as a third object in a size perceived as the face of the person in the real world by the user, that is, a size similar to a size when the person is viewed in the real world.

Thus, the user can enjoy a feeling as if the user were actually in the scenery of the real world appearing in an image displayed on the monitor.

Figure 14:
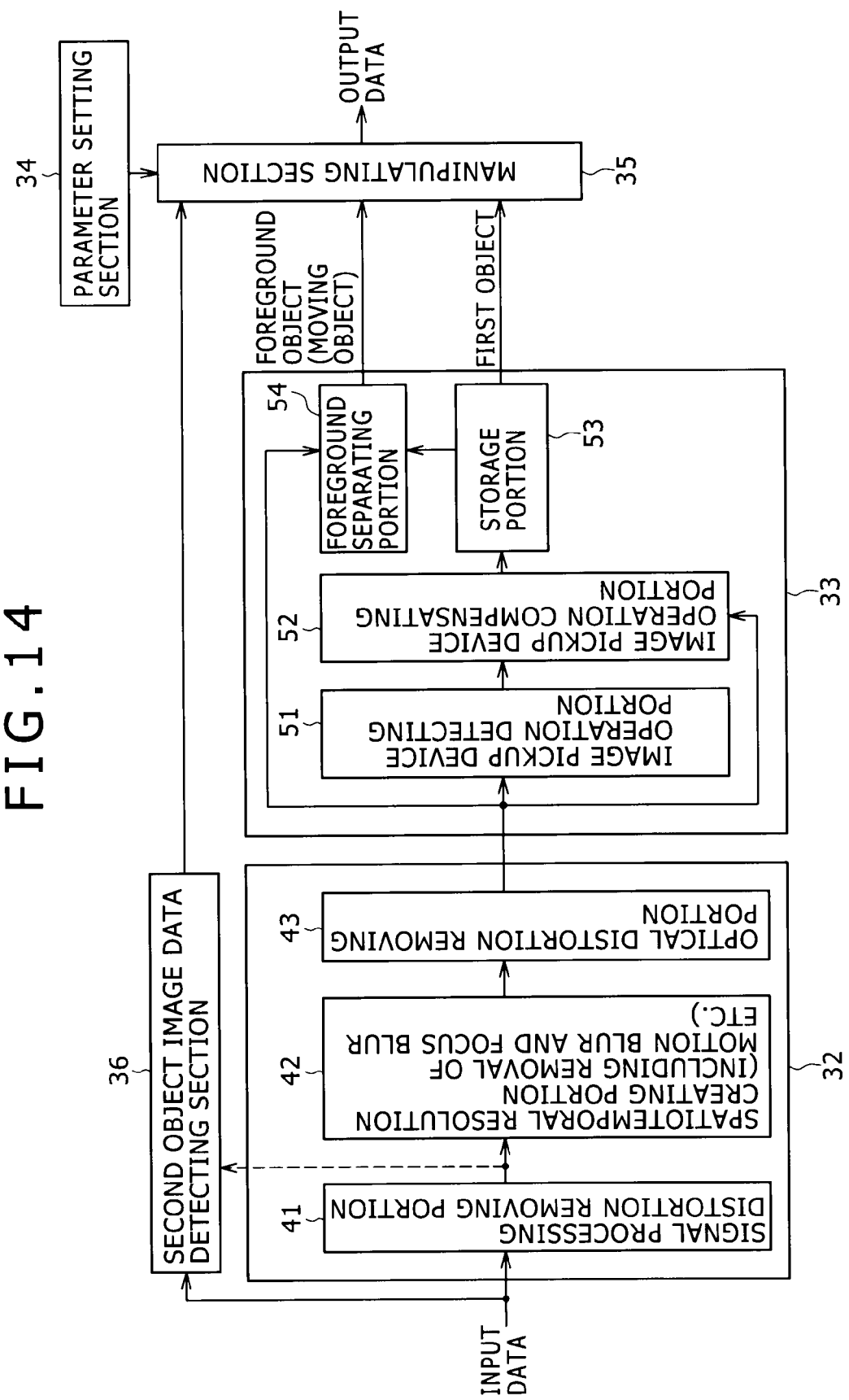
FIG. 14 is a block diagram showing a sixth example of configuration of the receiving device 30.

FIG. 14 shows a sixth example of configuration of the receiving device 30 in FIG. 5.

Incidentally, in the figure, parts corresponding to those of FIG. 11 are identified by the same reference numerals.

The receiving device 30 of FIG. 14 is formed in a similar manner to that of FIG. 11.

However, for example, according to an operation of the user, the parameter setting section 34 in the receiving device 30 of FIG. 14 sets the editing parameter such that gamma correction processing is performed only on third object image data obtained in the foreground separating portion 54. The parameter setting section 34 supplies the editing parameter to the manipulating section 35.

In this case, the manipulating section 35 performs similar processing to that of FIG. 11, and performs editing that makes gamma correction to only the third object image data according to the editing parameter from the parameter setting section 34.

As described above, by making gamma correction to only the third object image data, the receiving device 30 of FIG. 14 can for example display an image of a third object contrasted with an image of a first object according to a preference of the user.

Figure 15:
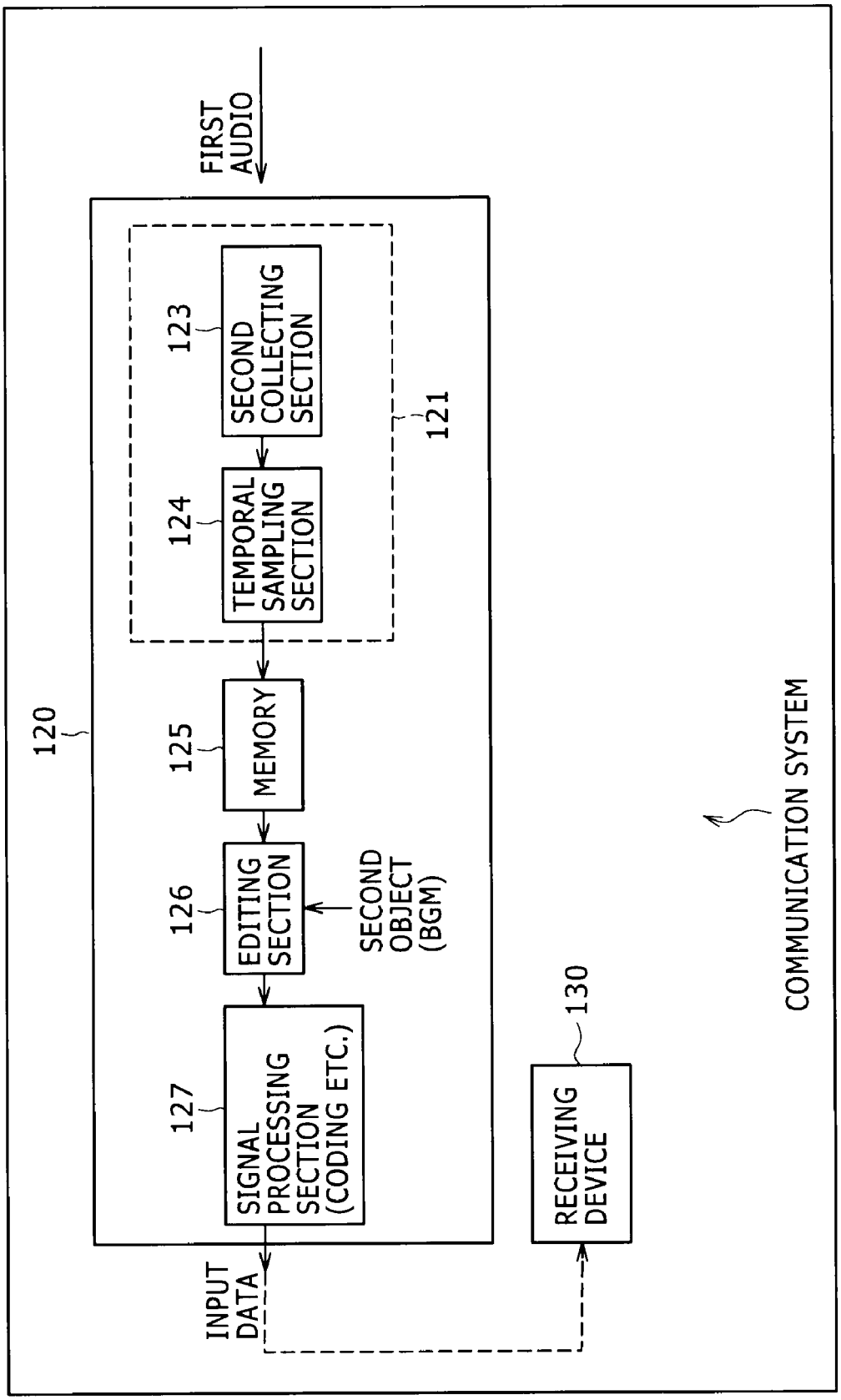
FIG. 15 is a block diagram showing an example of configuration of another embodiment of the communication system to which the data processing device is applied.

Next, FIG. 15 is a block diagram showing an example of configuration of another embodiment of the communication system to which the data processing devices of FIG. 1 and FIG. 3 are applied.

In FIG. 15, the communication system includes a transmitting device 120 and a receiving device 130. The communication system for example transmits and receives audio data as a program of television broadcasting.

Incidentally, in the present specification, to simplify description, the transmission and reception of image data as a program and the transmission and reception of audio data as a program are described separately from each other. However, image data and audio data as a program can be transmitted and received simultaneously by being multiplexed, for example.

The transmitting device 120 is for example installed in a broadcasting station that broadcasts programs or the like. The transmitting device 120 transmits audio data as a program.

Specifically, the transmitting device 120 includes a sound collecting device 121, a memory 125, an editing section 126, and a signal processing section 127.

In FIG. 15, the sensor device described with reference to FIGS. 1 to 4 is the sound collecting device 121 having a sound collecting section 123 for collecting first audio in the real world.

The sound collecting device 121 collects the sound of the first audio such as the voice of a person in the real world or the like and samples the first audio in a temporal direction. The sound collecting device 121 thereby obtains first audio collected sound data (corresponding to sensing data). The sound collecting device 121 supplies the first audio collected sound data to the memory 125.

Specifically, the sound collecting device 121 includes the sound collecting section 123 and a temporal sampling section 124.

The sound collecting section 123 for example collects first audio such as the voice of a person in the real world or the like. The sound collecting section 123 converts the first audio into an analog signal as an electric signal, that is, converts the vibration of an air into an analog signal as an electric signal. The sound collecting section 123 supplies the analog signal to the temporal sampling section 124.

The temporal sampling section 124 samples the analog signal from the sound collecting section 123 in the temporal direction. The temporal sampling section 124 supplies audio data as a result of the sampling as first audio collected sound data to the memory 125.

The memory 125 temporarily stores the first audio collected sound data supplied from the temporal sampling section 124 of the sound collecting device 121.

The editing section 126 reads the first audio collected sound data stored in the memory 125, superimposes, by editing, second audio data (corresponding to second object data) as audio data of BGM (Back Ground Music) or the like as second audio, for example, on the first audio collected sound data, and supplies the result to the signal processing section 127.

The signal processing section 127 performs signal processing such for example as MPEG coding or the like on the first audio collected sound data on which the second audio data is superimposed from the editing section 126. The signal processing section 127 outputs audio data obtained as a result of the signal processing as input data.

The input data obtained in the signal processing section 127 is transmitted to the receiving device 130 and received by the receiving device 130.

The receiving device 130 is for example a television receiver or a tuner as an audio processing device to which the data processing device of FIG. 1 or FIG. 3 is applied. The receiving device 130 processes the input data transmitted from the transmitting device 120 as described above.

Figure 16:
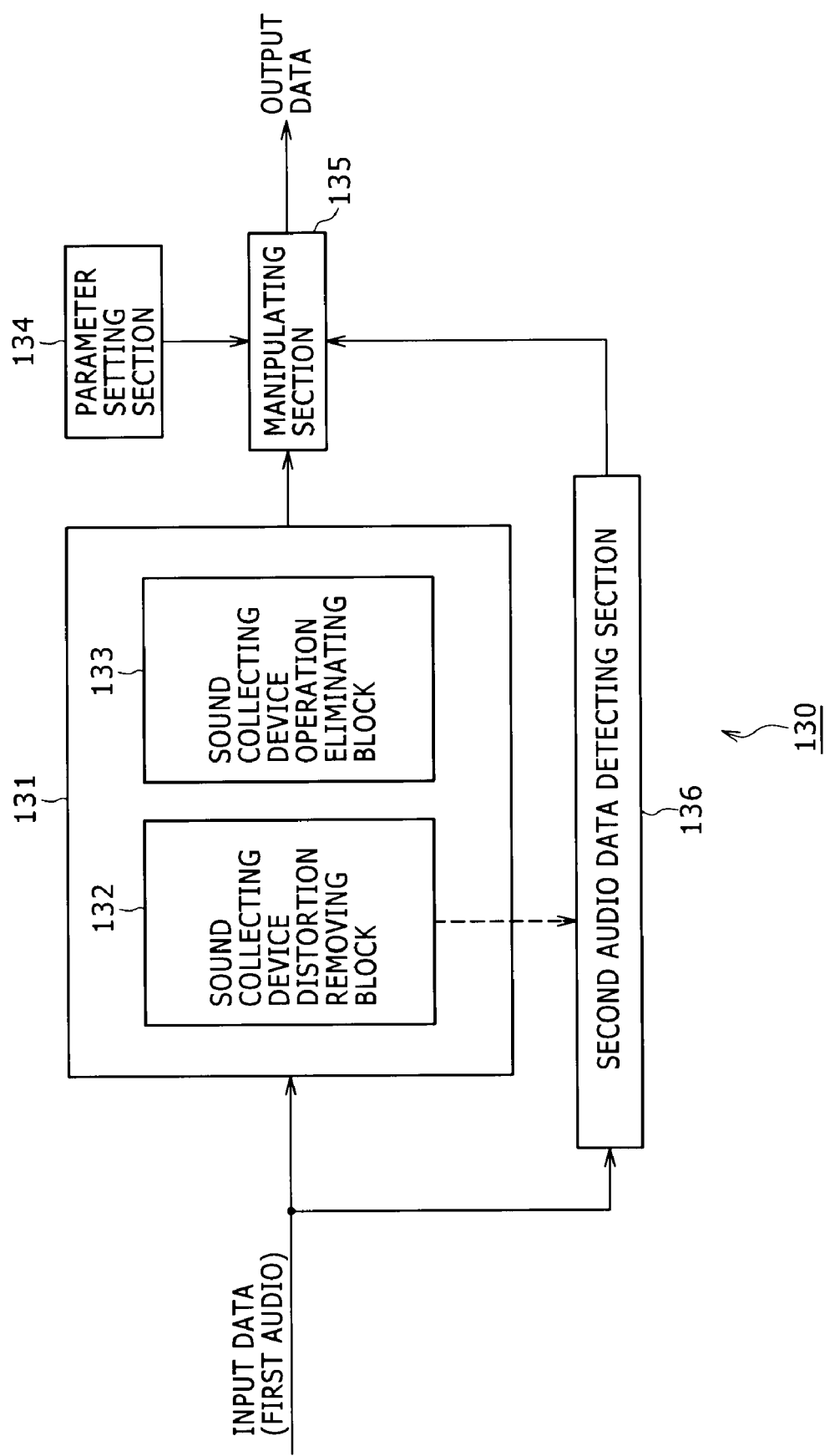
FIG. 16 is a block diagram showing a first example of configuration of a receiving device 130.

Specifically, FIG. 16 is a block diagram showing a first example of configuration of the receiving device 130 in FIG. 15.

In FIG. 16, the receiving device 130 includes a processing section 131, a parameter setting section 134, a manipulating section 135, and a second audio data detecting section 136. The input data from the transmitting device 120 in FIG. 15 is supplied to the processing section 131 and the second audio data detecting section 136.

The processing section 131 (corresponding to the processing section 11 in FIG. 3) includes a sound collecting device distortion removing block 132 and a sound collecting device operation eliminating block 133. The processing section 131 processes the input data supplied thereto.

Specifically, the sound collecting device distortion removing block 132 (corresponding to the sensor device distortion removing block 12 in FIG. 3) removes distortion occurring when the sound collecting device 121 (FIG. 15) collects the sound of the first audio and distortion caused by the signal processing in the signal processing section 127 (FIG. 15), which distortion is included in the input data supplied to the processing section 131.

In order to generate first audio data representing the first audio in the real world which data is not dependent on at least the position of the sound collecting device 121 (FIG. 15), the sound collecting device operation eliminating block 133 (corresponding to the sensor device position eliminating block 13 in FIG. 3) detects at least the sound source position of the first audio (a relative position from the sound collecting device 121 (FIG. 15) that collected the sound of the first audio) and the sound pressure (power) of the first audio at the sound source position from the input data supplied to the processing section 131. The sound collecting device operation eliminating block 133 generates the first audio data (first audio data representing the first audio in the real world which data is not dependent on the position of the sound collecting device 121) having the sound pressure of the first audio at the sound source position of the first audio.

The first audio data (data of the first audio itself at the sound source position) which is obtained by the processing of the sound collecting device distortion removing block 132 and the sound collecting device operation eliminating block 133 in the processing section 131, from which data the distortion occurring when the sound of the first audio is collected and the distortion caused by the signal processing are removed, and which data has the sound pressure of the first audio at the sound source position of the first audio is supplied to the manipulating section 135 together with the sound source position of the first audio.

Meanwhile, the parameter setting section 134 (corresponding to the parameter setting section 14 in FIG. 3) for example sets a sound collecting parameter, which is a parameter used to collect the sound of the first audio, that is, for example a sound collecting parameter indicating a relative position (hereinafter referred to as a sound collecting position as appropriate) from the sound source position of the first audio at which relative position the sound of the first audio is collected, as a sensing parameter according to an operation of the user. The parameter setting section 134 supplies the sound collecting parameter to the manipulating section 135.

In addition, according to an operation of the user, the parameter setting section 134 for example sets an editing parameter used for editing using the second audio data and the like, that is, for example an editing parameter indicating a sound pressure when the audio data of the BGM as second audio data is superimposed as well as a starting time at which to start the superimposition, an ending time and the like. The parameter setting section 134 supplies the editing parameter to the manipulating section 135.

The manipulating section 135 (corresponding to the manipulating section 15 in FIG. 3) synthesizes the first audio data from the processing section 131 and the second audio data from the second audio data detecting section 136 according to the sound collecting parameter and the editing parameter from the parameter setting section 134 as well as the sound source position of the first audio from the processing section 131.

That is, the second audio data detecting section 136 (corresponding to the second object data detecting section 16 in FIG. 3) detects the second audio data as the audio data of the BGM or the like from the input data supplied thereto. The second audio data detecting section 136 supplies the second audio data to the manipulating section 135.

The manipulating section 135 adjusts (manipulates) the sound pressure of the first audio data from the processing section 131 according to the sound collecting parameter from the parameter setting section 134. That is, the manipulating section 135 for example adjusts the sound pressure of the first audio data from the processing section 131 to a sound pressure that would be heard if the first audio corresponding to the first audio data emitted from the sound source position from the processing section 131 were heard at a sound collecting position indicated by the sound collecting parameter.

Further, the manipulating section 135 superimposes the audio data of the BGM as second audio data from the second audio data detecting section 136 on the first audio data after the adjustment of the sound pressure (hereinafter referred to as adjusted audio data as appropriate) according to the editing parameter from the parameter setting section 134. The manipulating section 135 outputs audio data obtained as a result as output data.

The audio data as the output data is supplied to a speaker not shown in the figure, and output.

As described above, the processing section 131 generates the first audio data having the sound pressure at the sound source position of the first audio, and the manipulating section 135 adjusts the sound pressure of the first audio data or the like according to the sound collecting parameter set according to an operation of the user. Thus the user can have a bodily sensation of collecting a material of audio data.

That is, the user can enjoy a feeling as if the user were collecting the sound of the first audio by a microphone in the real world (for example a feeling of directing a microphone at a speaker as the sound source of the first audio).

Further, because the manipulating section 135 superimposes the audio data of the BGM as second audio data on the adjusted audio data after the adjustment of the sound pressure or the like according to the editing parameter set according to an operation of the user, the user can have a bodily sensation of editing audio data.

Incidentally, in FIG. 16, the second audio data detecting section 136 detects the second audio data from the input data itself. However, the second audio data detecting section 136 can also detect the second audio data from the input data after being processed in the sound collecting device distortion removing block 132, as indicated by a dotted line in FIG. 16.

In addition, the processing section 131 can process the input data from which the second audio data detected in the second audio data detecting section 136 is removed, rather than the input data itself.

That is, the processing section 131 can remove the second audio data detected in the second audio data detecting section 136 from the input data, and process the input data after the removal.

Figure 17:
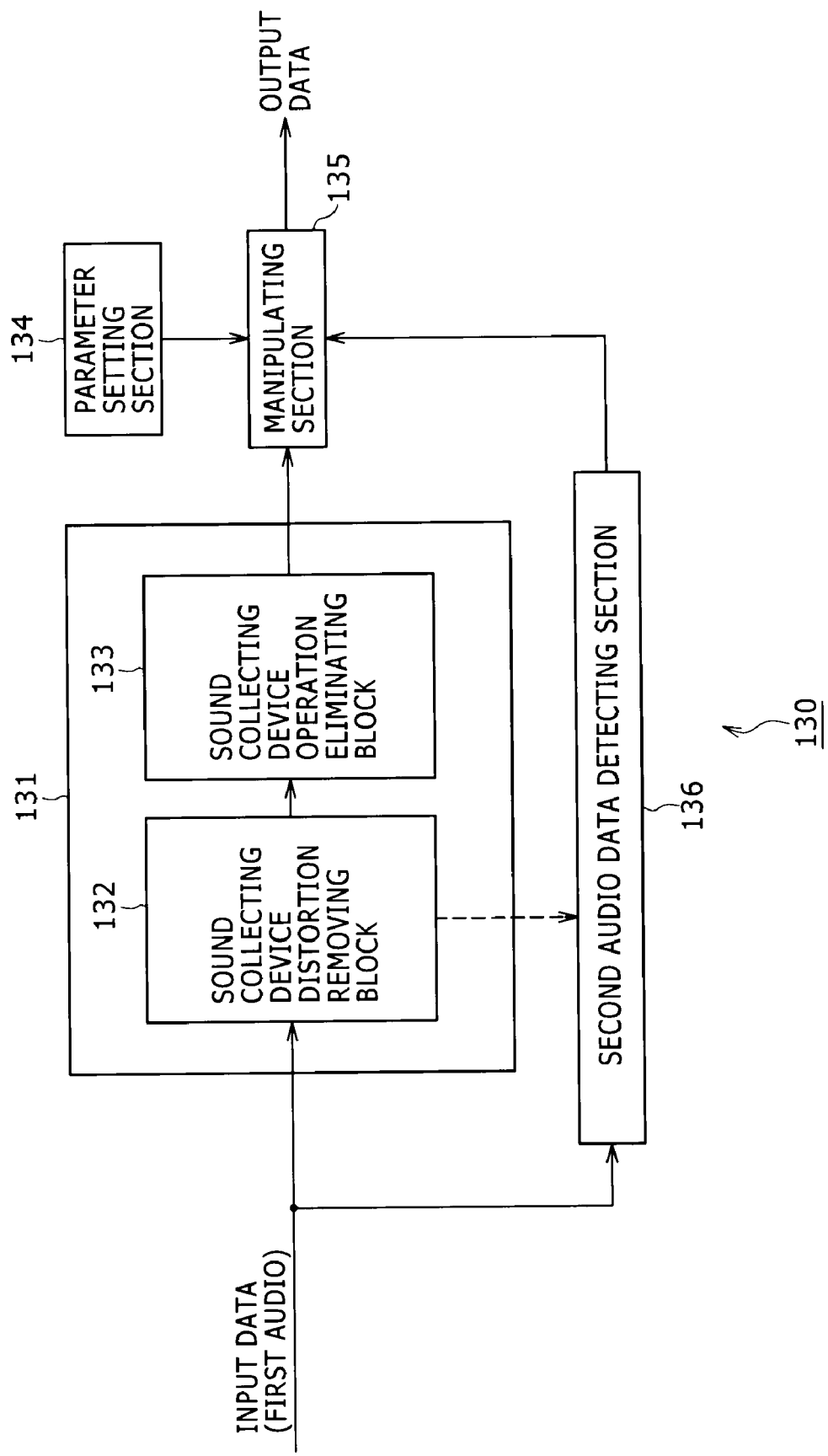
FIG. 17 is a block diagram showing an example of configuration of a processing section 131.

Next, FIG. 17 shows another example of configuration of the processing section 131 in FIG. 16.

In FIG. 16, the order of processing by the sound collecting device distortion removing block 132 and the sound collecting device operation eliminating block 133 in the processing section 131 is arbitrary. In FIG. 17, however, the sound collecting device distortion removing block 132 processes the input data supplied to the processing section 131, and thereafter the sound collecting device operation eliminating block 133 processes the input data after being processed by the sound collecting device distortion removing block 132.

Incidentally, the sound collecting device operation eliminating block 133 can process the input data supplied to the processing section 131, and the sound collecting device distortion removing block 132 can thereafter process the input data after being processed by the sound collecting device operation eliminating block 133.

Figure 18:
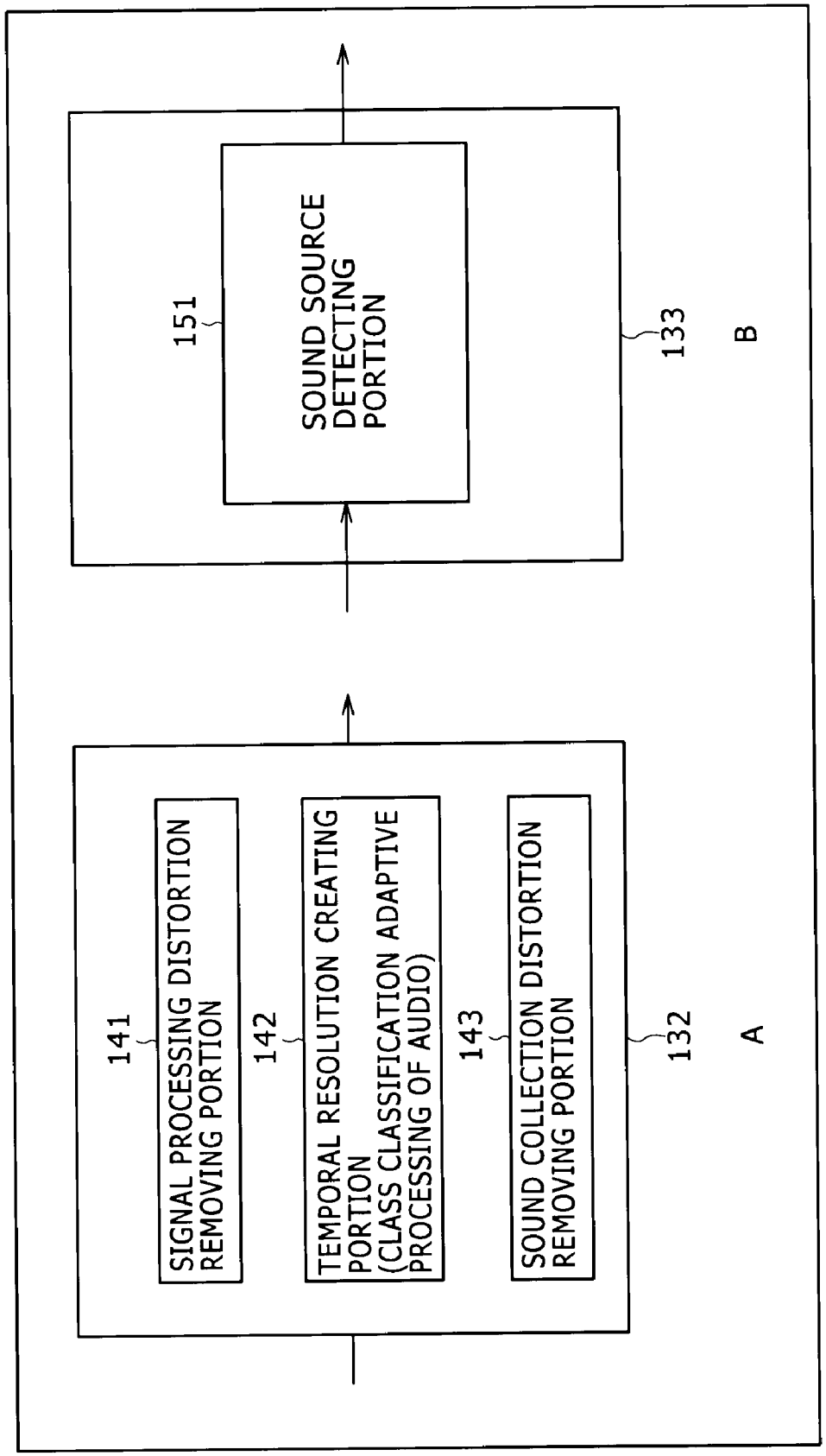
FIG. 18 is a block diagram showing an example of configuration of a sound collecting device distortion removing block 132 and a sound collecting device operation eliminating block 133.

FIG. 18 shows an example of configuration of the sound collecting device distortion removing block 132 and the sound collecting device operation eliminating block 133 in FIG. 17 (and FIG. 16).

Specifically, FIG. 18A shows an example of configuration of the sound collecting device distortion removing block 132 in FIG. 17.

In FIG. 18A, the sound collecting device distortion removing block 132 includes a signal processing distortion removing portion 141, a temporal resolution creating portion 142, and a sound collection distortion removing portion 143.

The signal processing distortion removing portion 141 removes distortion caused by the signal processing by the signal processing section 127 of the transmitting device 120 (FIG. 15) from the input data supplied thereto.

Specifically, when the signal processing section 127 performs MPEG coding as the signal processing in the transmitting device 120, the signal processing distortion removing portion 141 performs a signal processing distortion removing process that for example subjects the input data to MPEG decoding and which further removes distortion or the like caused by the MPEG coding/decoding.

Incidentally, the MPEG decoding can be performed not only in the signal processing distortion removing portion 141 but also in the temporal resolution creating portion 142, the sound collection distortion removing portion 143, or another block (including a block not shown in the figure) than the signal processing distortion removing portion 141, the temporal resolution creating portion 142, and the sound collection distortion removing portion 143.

The temporal resolution creating portion 142 improves resolution in a temporal direction of audio data as the input data supplied thereto.

Specifically, even when the speaker of the receiving device 130 is a high-performance speaker capable of outputting audio (sound) that faithfully reproduces the real world, the sound quality of audio that can be output by the speaker, that is, for example temporal resolution (sampling rate) is limited by the performance of the sound collecting device 121 of the transmitting device 120 (FIG. 15).

Accordingly, in order to output audio of sufficient sound quality at the speaker, the temporal resolution creating portion 142 improves the resolution in the temporal direction of the audio data as the input data.

The sound collection distortion removing portion 143 removes distortion caused by the sound collecting section 123 of the transmitting device 120 (FIG. 15) (for example distortion of waveform of the audio due to frequency characteristics of the sound collecting section 123) from the input data supplied thereto.

Incidentally, order in which the signal processing distortion removing portion 141, the temporal resolution creating portion 142, and the sound collection distortion removing portion 143 perform processing in the sound collecting device distortion removing block 132 is not particularly limited.

In addition, processing performed by the signal processing distortion removing portion 141, the temporal resolution creating portion 142, and the sound collection distortion removing portion 143 in the sound collecting device distortion removing block 132 can be performed collectively by class classification adaptive processing.

FIG. 18B shows an example of configuration of the sound collecting device operation eliminating block 133 in FIG. 17.

In FIG. 18B, the sound collecting device operation eliminating block 133 includes a sound source detecting portion 151.

In order to generate first audio data representing the first audio in the real world which data is not dependent on at least the position of the sound collecting device 121 (FIG. 15), the sound source detecting portion 151 detects at least the sound source position of the first audio and the sound pressure (power) of the first audio at the sound source position from the input data supplied thereto. The sound source detecting portion 151 generates the first audio data (first audio data representing the first audio in the real world which data is not dependent on the position of the sound collecting device 121) having the sound pressure of the first audio at the sound source position of the first audio. The sound source detecting portion 151 outputs the first audio data together with the sound source position of the first audio.

Figure 19:
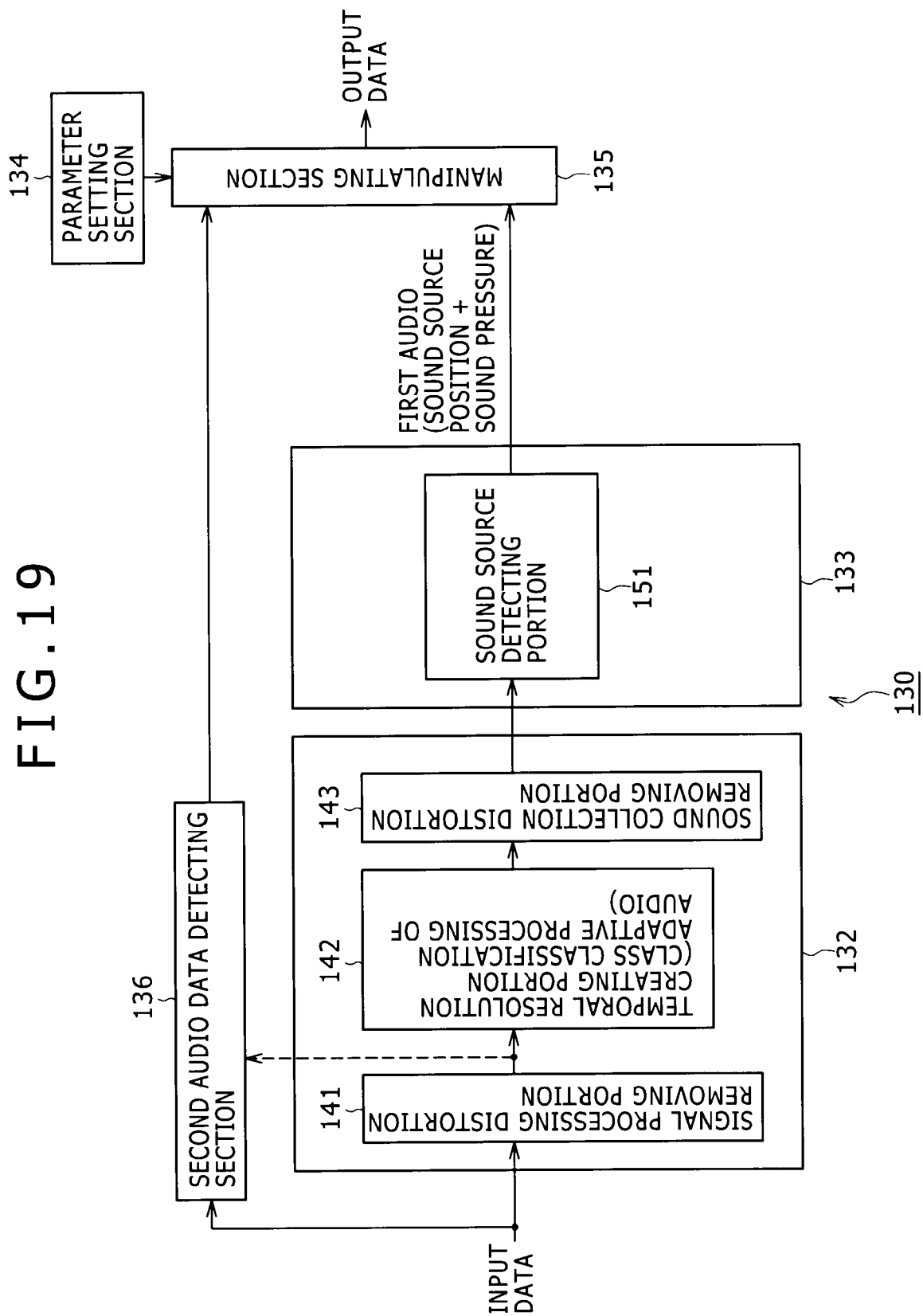
FIG. 19 is a block diagram showing an example of configuration of the sound collecting device distortion removing block 132 in the receiving device 130.

FIG. 19 shows another example of configuration of the sound collecting device distortion removing block 132 in the receiving device 130.

In FIG. 18A, order in which the signal processing distortion removing portion 141, the temporal resolution creating portion 142, and the sound collection distortion removing portion 143 perform processing in the sound collecting device distortion removing block 132 is not particularly limited. In FIG. 19, however, the signal processing distortion removing portion 141, the temporal resolution creating portion 142, and the sound collection distortion removing portion 143 perform processing in this order.

Specifically, in FIG. 19, input data from the transmitting device 120 (FIG. 15) is supplied to the sound collecting device distortion removing block 132 and the second audio data detecting section 136.

The signal processing distortion removing portion 141 in the sound collecting device distortion removing block 132 removes distortion caused by signal processing by the signal processing section 127 of the transmitting device 120 from audio data as the input data from the transmitting device 120 (FIG. 15), and then supplies the audio data to the temporal resolution creating portion 142.

The temporal resolution creating portion 142 improves resolution in the temporal direction of the audio data from the signal processing distortion removing portion 141. The temporal resolution creating portion 142 supplies audio data obtained as a result to the sound collection distortion removing portion 143.

The sound collection distortion removing portion 143 removes distortion caused by the sound collecting section 123 of the transmitting device 120 (FIG. 15) from the audio data from the temporal resolution creating portion 142. The sound collection distortion removing portion 143 supplies the audio data to the sound collecting device operation eliminating block 133.

The sound source detecting portion 151 in the sound collecting device operation eliminating block 133 detects the sound source position and sound pressure of first audio from the audio data from the sound collecting device distortion removing block 132 (the sound collection distortion removing portion 143 in the sound collecting device distortion removing block 132). Further, the sound source detecting portion 151 generates first audio data (first audio data representing the first audio in the real world which data is not dependent on the position of the sound collecting device 121) having the sound pressure of the first audio at the sound source position of the first audio. The sound source detecting portion 151 outputs the first audio data to the manipulating section 135 together with the sound source position of the first audio.

Meanwhile, the second audio data detecting section 136 detects second audio data as audio data of BGM or the like from the audio data as the input data from the transmitting device 120. The second audio data detecting section 136 supplies the second audio data to the manipulating section 135.

As described above, the manipulating section 135 is supplied with the first audio data from the sound source detecting portion 151 and supplied with the second audio data from the second audio data detecting section 136, and is also supplied with the sound collecting parameter and the editing parameter from the parameter setting section 134.

Specifically, for example, as described above, the parameter setting section 134 sets the sound collecting parameter and the editing parameter according to an operation of the user. The parameter setting section 134 supplies the sound collecting parameter and the editing parameter to the manipulating section 135.

The manipulating section 135 adjusts the sound pressure of the first audio data from the sound source detecting portion 151 according to the sound collecting parameter from the parameter setting section 134 (adjusts the sound pressure of the first audio data from the sound source detecting portion 151 to a sound pressure that would be heard if the first audio corresponding to the first audio data emitted from the sound source position from the sound source detecting portion 151 were heard at a sound collecting position indicated by the sound collecting parameter). The manipulating section 135 thereby generates adjusted audio data.

Further, the manipulating section 135 superimposes the audio data of the BGM as second audio data from the second audio data detecting section 136 on the adjusted audio data according to the editing parameter from the parameter setting section 134. The manipulating section 135 outputs audio data obtained as a result as output data.

The audio data as the output data is supplied to a speaker not shown in the figure, and output.

Thus, by operating the parameter setting section 134, the user can listen to audio (sound) as if the user were actually collecting sound by a microphone in the real world.

That is, for example, the user can enjoy a feeling as if while a plurality of people were speaking, the user were listening to a particular person of the plurality of people with the microphone brought close to the particular person.

Further, by operating the parameter setting section 134, the user can turn on or off the superimposition of the audio data of the BGM as the second audio data, and change the sound volume of the BGM or the like to a desired state when the superimposition of the audio data of the BGM is turned on.

Incidentally, the second audio data detecting section 136 can not only detect the second audio data from the input data but also detect the second audio data from audio data after being processed in the signal processing distortion removing portion 141, as indicated by a dotted line in FIG. 19.

Figure 20:
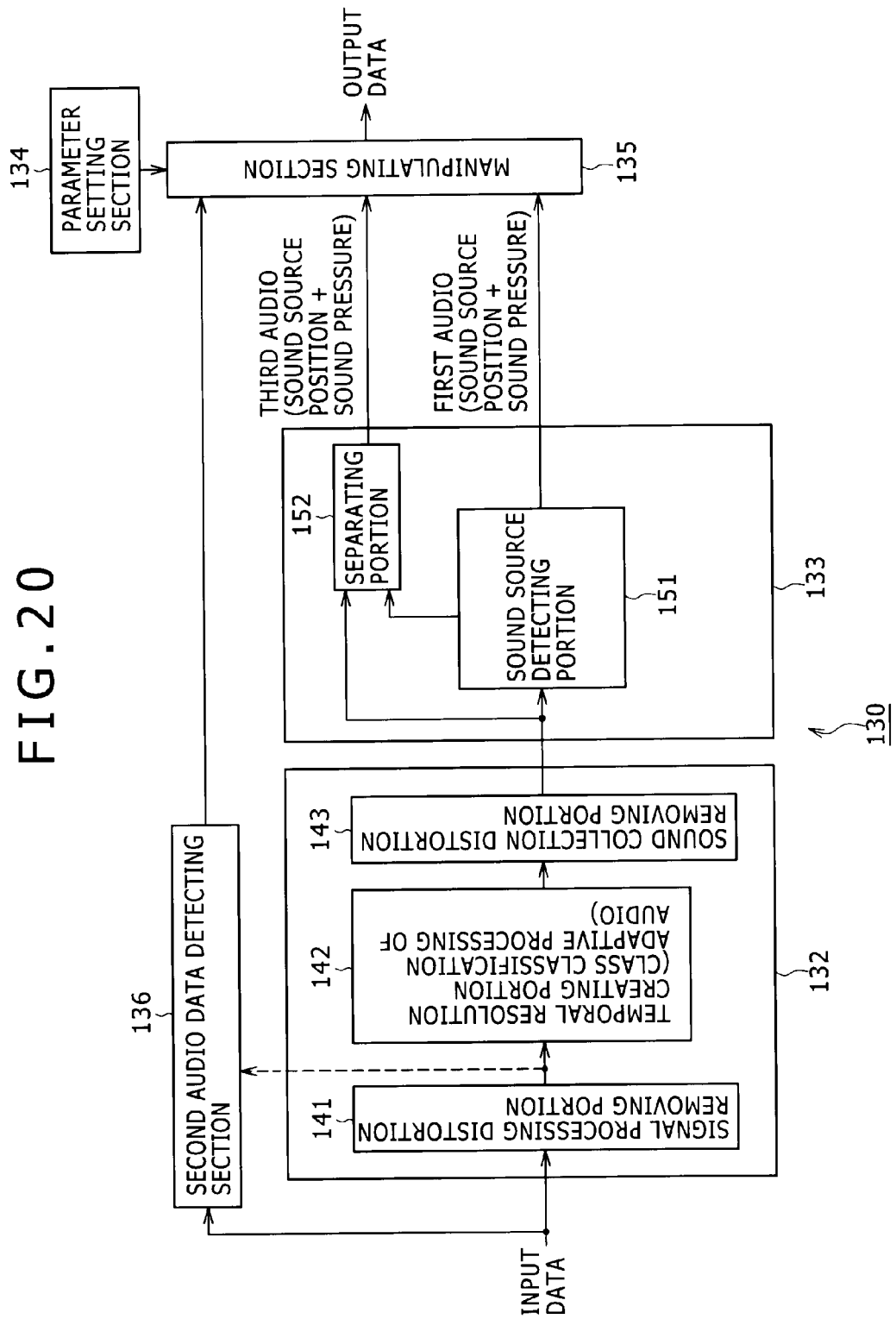
FIG. 20 is a block diagram showing a second example of configuration of the receiving device 130.

FIG. 20 shows a second example of configuration of the receiving device 130 in FIG. 15.

Incidentally, in the figure, parts corresponding to those of FIGS. 16 to 19 are identified by the same reference numerals, and description thereof will be omitted in the following as appropriate.

The receiving device 130 of FIG. 20 is different from FIG. 19 in that a separating portion 152 is newly provided to the sound collecting device operation eliminating block 133.

The separating portion 152 is supplied with input data after processing of the sound collection distortion removing portion 143 and first audio data generated in the sound source detecting portion 151.

The separating portion 152 compares the input data from the sound collection distortion removing portion 143 and the first audio data generated in the sound source detecting portion 151 with each other. Thereby, when the input data for example includes not only the first audio collected sound data such as the voice of a person or the like and second audio data such as audio data of BGM or the like but also third audio data (third audio collected sound data) generated from a sound source different from first audio, such as the voice of another person or the like, the separating portion 152 functions as an audio data generating section for generating audio data other than the first audio data generated in the sound source detecting portion 151, that is, the second audio data and the third audio data.

That is, the separating portion 152 appropriately adjusts the sound pressure of the first audio data generated in the sound source detecting portion 151 and performs subtraction from the input data. The separating portion 152 thereby separates the second audio data and the third audio data from the input data. The separating portion 152 supplies the second audio data and the third audio data to the manipulating section 135.

The manipulating section 135 synthesizes the first audio data from the sound source detecting portion 151, the second audio data from the second audio data detecting section 136, and the third audio data supplied from the separating portion 152 according to the sound collecting parameter and the editing parameter from the parameter setting section 134.

In this case, in FIG. 20, according to an operation of the user, the parameter setting section 134 sets not only the editing parameter for the second audio data as the audio data of the BGM but also the editing parameter for the third audio data as the audio data of the other person, that is, for example the editing parameter indicating a sound pressure when the third audio data is superimposed as well as a starting time at which to start the superimposition, an ending time and the like. The parameter setting section 134 supplies the editing parameter to the manipulating section 135.

The manipulating section 135 compares the second audio data and the third audio data from the separating portion 152 with the second audio data from the second audio data detecting section 136, and thereby separates the third audio data from the second audio data and the third audio data from the separating portion 152.

Then, the manipulating section 135 generates adjusted audio data by adjusting the first audio data of the voice of a person, for example, from the sound source detecting portion 151 according to the sound collecting parameter from the parameter setting section 134. Further, the manipulating section 135 superimposes the audio data of BGM as the second audio data from the second audio data detecting section 136 on the adjusted audio data according to the editing parameter from the parameter setting section 134, and superimposes the audio data of the voice of another person as the third audio data on the adjusted audio data according to the editing parameter from the parameter setting section 134. The manipulating section 135 outputs audio data obtained as a result as output data.

The audio data as the output data is supplied to a speaker not shown in the figure, and output.

As in the case of FIGS. 16 to 19, the receiving device 130 of FIG. 20 allows the user to have a bodily sensation of collection of a material and editing.

Further, the receiving device 130 of FIG. 20 enables editing of each of the audio data of BGM as second audio data and the audio data of the voice of another person as third audio data.

Description will next be made of a method of detecting second object image data as image data of a telop from image data as input data in the second object image data detecting section 36 in FIG. 9 and the like.

A technique described in Japanese Patent Laid-Open No. 2002-084458, for example, can be used as a method of detecting a telop.

Japanese Patent Laid-Open No. 2002-084458 describes a technique of extracting a telop region moving on a stationary background by repeating a process of extracting a telop region from a storage image, obtaining a motion vector of the telop region with respect to an input image, shifting a pixel position in the storage image by an amount corresponding to the motion vector, and forming a new storage image by synthesizing the storage image after the shift and the input image.

Figure 21:
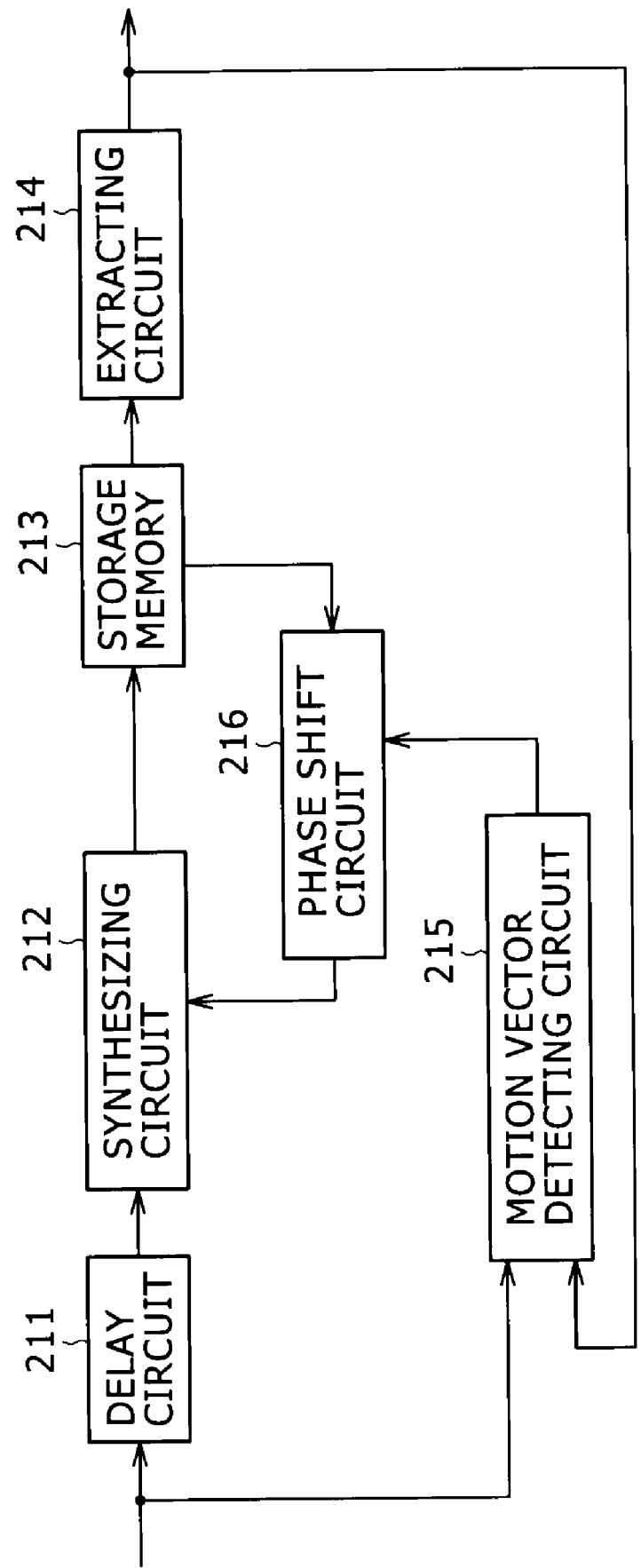
FIG. 21 is a block diagram showing an example of configuration of an extracting device for extracting a telop region moving on a stationary background.

FIG. 21 shows an example of configuration of an extracting device for extracting a telop region moving on a stationary background using the technique described in Japanese Patent Laid-Open No. 2002-084458.

The extracting device extracts an image of a telop, for example, which image has a characteristic of moving differently from a background (which image will hereinafter be referred to as a characteristic image), from an input image input thereto.

The input image input to the extracting device is supplied to a delay circuit 211 and a motion vector detecting circuit 215. The delay circuit 211 delays the input image by a predetermined time, and then supplies the input image to a synthesizing circuit 212.

The synthesizing circuit 212 synthesizes the input image supplied from the delay circuit 211 and a storage image that is supplied from a phase shift circuit 216, shifted in phase, and stored in a storage memory 213. The synthesizing circuit 212 supplies an image after the synthesis as a new storage image to the storage memory 213.

The storage memory 213 stores the storage image from the synthesizing circuit 212, and supplies the storage image to an extracting circuit 214 and the phase shift circuit 216.

The extracting circuit 214 extracts a characteristic image (an image region judged to be the characteristic image, to be exact) on the storage image supplied from the storage memory 213, and supplies the image data of the extracted image region and the display position of the extracted image region to the motion vector detecting circuit 215 and the outside.

The motion vector detecting circuit 215 is supplied with the input image and supplied with the image data of the image region judged to be the characteristic image on the storage image and the display position of the image region from the extracting circuit 214. The motion vector detecting circuit 215 detects a motion vector between the image region on the storage image which image region is extracted in the extracting circuit 214 (the image region on the storage image which image region is judged to be the characteristic image) and an image region on the input image which image region corresponds to that image region, using the image data and the display position supplied from the extracting circuit 214. The motion vector detecting circuit 215 supplies the motion vector to the phase shift circuit 216.

The phase shift circuit 216 shifts the phase of the storage image from the storage memory 213 on the basis of the motion vector from the motion vector detecting circuit 215 (thereby changes pixels of the storage image to be synthesized with pixels of the input image in the synthesizing circuit 212). The phase shift circuit 216 supplies the result to the synthesizing circuit 212.

Figure 22:
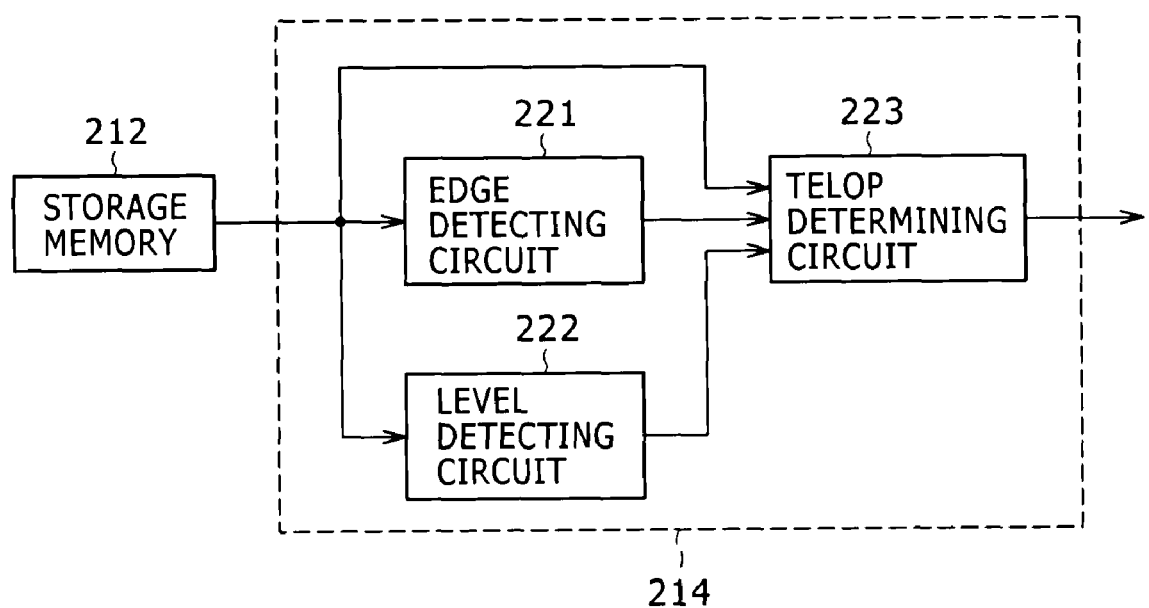
FIG. 22 is a block diagram showing an example of configuration of an extracting circuit 214.

FIG. 22 shows an example of configuration of the extracting circuit 214 in FIG. 21 when a telop is extracted as a characteristic image.

A storage image supplied from the storage memory 213 to the extracting circuit 214 is supplied to each of an edge detecting circuit 221, a level detecting circuit 222, and a telop determining circuit 223.

The edge detecting circuit 221 performs edge processing on each predetermined area (image region) of the storage image, detects a degree of sharpness of an edge, and supplies a result of the detection to the telop determining circuit 223.

The level detecting circuit 222 detects the level value of an average of luminance, for example, in each predetermined image region (image region subjected to the edge processing in the edge detecting circuit 221) of the storage image. The level detecting circuit 222 supplies a result of the detection to the telop determining circuit 223.

The telop determining circuit 223 makes threshold value determination for the degree of sharpness of the edge from the edge detecting circuit 221 and the level value from the level detecting circuit 222. The telop determining circuit 223 determines that an image region on the storage image which image region is judged to have a degree of sharpness and a level value both higher than a predetermined threshold value is a telop. Because telops generally have a high degree of sharpness and a high level value, a telop can be detected by thus subjecting each value to threshold value determination.

The telop determining circuit 223 obtains the image data of the image region judged to be a telop and the display position of the image region from the storage image. The telop determining circuit 223 outputs the image data of the image region and the display position of the image region to the motion vector detecting circuit 215.

In the thus formed extracting device of FIG. 21, the motion vector detecting circuit 215 detects a motion vector between the image region extracted in the extracting circuit 214 and judged to be a telop on the storage image and an image region on the input image at a position corresponding to the display position of that image region. The motion vector detecting circuit 215 supplies the motion vector to the phase shift circuit 216.

Incidentally, in this case, suppose that the input of an input image is already started, and that a storage image is stored in the storage memory 213. When the image data of a new input image is input, the extracting circuit 214 obtains the image data of an image region judged to be a telop and the display position of the image region from the storage image stored in the storage memory 213 by the method described with reference to FIG. 22. The extracting circuit 214 supplies the image data of the image region and the display position of the image region to the motion vector detecting circuit 215.

The phase shift circuit 216 shifts the phase of the storage image stored in the storage memory 213 on the basis of the motion vector from the motion vector detecting circuit 215 such that the phase (position) of pixels of the image region on the storage image judged to be a telop and the phase (position) of pixels of the image region on the input image at the position corresponding to the display position of that image region coincide with each other.

Thereby, the phase of pixels of an image region not judged to be a telop (for example a part of a background) on the storage image and the phase of pixels of an image region on the input image corresponding to that image region do not coincide with each other.

The phase shift circuit 216 supplies the storage image shifted in phase to the synthesizing circuit 212.

The synthesizing circuit 212 synthesizes the pixel value A of a pixel of the input image from the delay circuit 211 and the pixel value B of a corresponding pixel of the storage image shifted in phase from the phase shift circuit 216 according to Equation $C=(1-\alpha)A+\alpha B$, for example, obtains the pixel value C of a pixel of a new storage image, and supplies the pixel value C to the storage memory 213. Incidentally, $\alpha$ is a weighting factor in a range $0<\alpha<1$.

That is, the input image and the storage image are subjected to weighting addition in pixel units, and addition values become pixel values of the new storage image to be stored in the storage memory 213.

The storage memory 213 stores (accumulates) the storage image from the synthesizing circuit 212.

Then, the extracting circuit 214 reads the storage image from the storage memory 213, extracts an image region judged to be a telop from the storage image, and supplies the image region to the motion vector detecting circuit 215. Thereafter a similar process is repeated.

As described above, the extracting device of FIG. 21 synthesizes the input image and the storage image in a state in which the phase of pixels of the image region judged to be a telop on the storage image and the phase of pixels of the image region on the input image corresponding to that image region coincide with each other and the phases of pixels of image regions other than the telop on the input image and the storage image do not coincide with each other. Therefore, the storage image becomes an image in which a telop region is emphasized and other regions are averaged. As a result, a moving telop can be extracted.

Description will next be made of a method of removing distortion caused by signal processing from image data as input data in the signal processing distortion removing portion 41 in FIG. 9 and the like.

Class classification adaptive processing, for example, can be used as a method of removing distortion caused by signal processing.

Class classification adaptive processing is a technique for converting (mapping) first data to second data different from the first data. A tap coefficient for statistically minimizing a prediction error of a predicted value of the second data obtained by an operation using the first data and a predetermined tap coefficient is obtained for each of a plurality of classes, and the first data is converted to the second data (predicted value of the second data is obtained) by an operation using the tap coefficient and the first data.

The class classification adaptive processing that converts the first data to the second data becomes various signal processing according to definitions of the first and second data.

Specifically, for example, when the first data is image data of low spatial resolution, and the second data is image data of high spatial resolution, the class classification adaptive processing can be said to be spatial resolution creating (improving) processing that improves the spatial resolution.

In addition, for example, when the first data is image data of low S/N (Signal/Noise), and the second data is image data of high S/N, the class classification adaptive processing can be said to be noise removing processing that removes noise.

Further, for example, when the first data is image data having a predetermined number of pixels (size), and the second data is image data obtained by increasing or decreasing the number of pixels of the first data, the class classification adaptive processing can be said to be resizing processing that resizes (enlarges or reduces) an image.

In addition, for example, when the first data is image data of low temporal resolution (low frame rate), and the second data is image data of high temporal resolution (high frame rate), the class classification adaptive processing can be said to be temporal resolution creating (improving) processing that improves the temporal resolution.

Further, for example, when the first data is decoded image data obtained by decoding image data coded in block units by MPEG coding or the like, and the second data is image data before the coding, the class classification adaptive processing can be said to be distortion removing processing that removes various distortions such as block distortion caused by the MPEG coding and decoding and the like.

Incidentally, in the spatial resolution creating processing, in converting the first data as image data of low spatial resolution to the second data as image data of high spatial resolution, the second data can be image data having the same number of pixels as the first data, or can be image data having a larger number of pixels than the first data. When the second data is image data having a larger number of pixels than the first data, the spatial resolution creating processing is processing that improves the spatial resolution and is also resizing processing that enlarges image size (number of pixels).

As described above, according to the class classification adaptive processing, various signal processing can be realized depending on the definitions of the first and second data.

The class classification adaptive processing as described above obtains a sample of interest (a predicted value of the sample value of the sample of interest) by an operation using the tap coefficient of a class obtained by class classification of the sample of interest (sample value of the sample of interest) to which attention is directed among a plurality of samples forming the second data into one of a plurality of classes and a plurality of samples (sample values of the plurality of samples) of the first data which samples are selected for the sample of interest.

Figure 23:
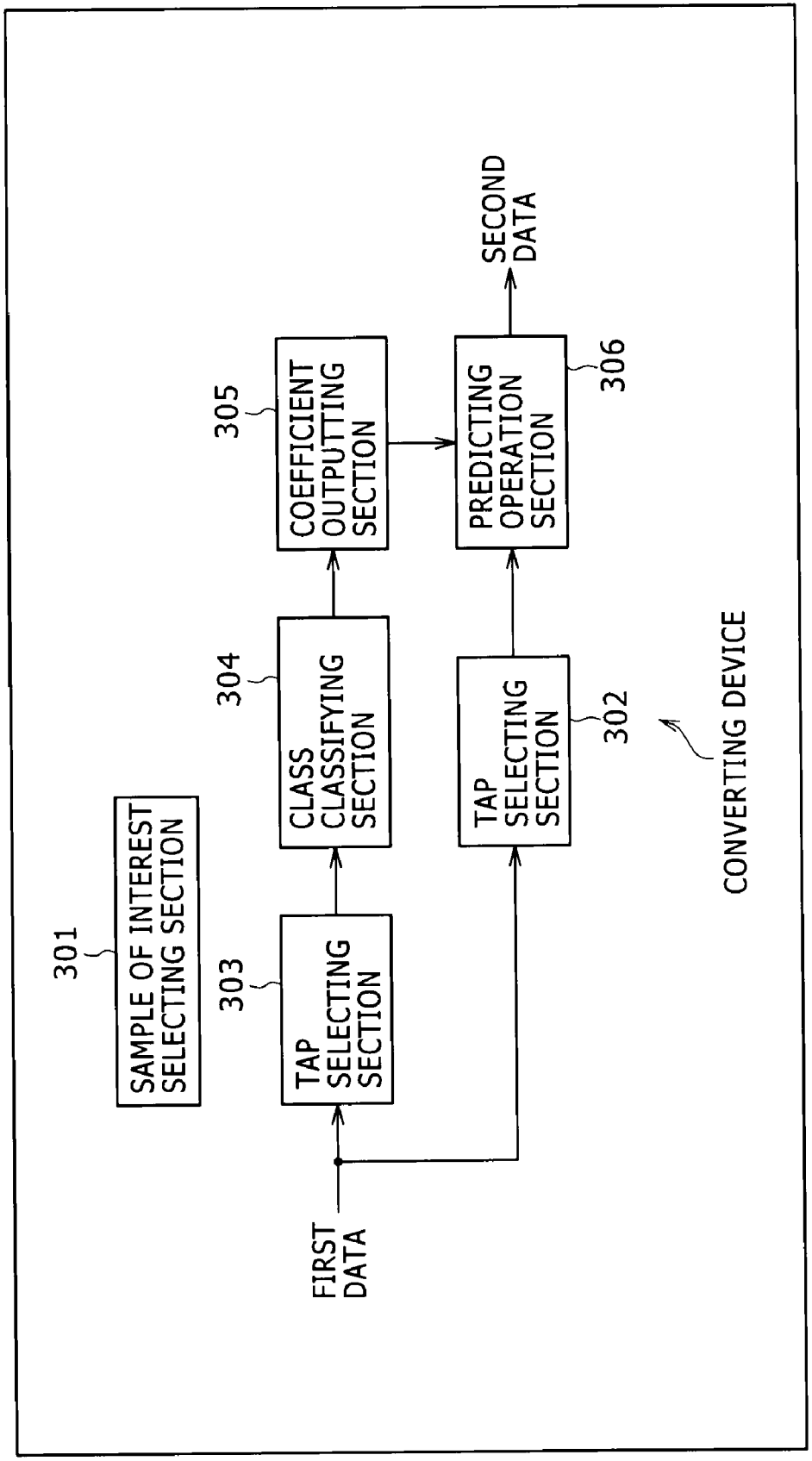
FIG. 23 is a block diagram showing an example of configuration of a converting device that converts first data to second data by DRC.

Specifically, FIG. 23 shows an example of configuration of a converting device that converts the first data to the second data by the class classification adaptive processing.

The converting device is supplied with the first data. The first data is supplied to tap selecting sections 302 and 303.

A sample of interest selecting section 301 sequentially sets samples forming the second data as a sample of interest, and supplies information indicating the sample of interest to necessary blocks.

The tap selecting section 302 selects some of samples (sample values of the samples) forming the first data used to predict the sample of interest (sample value of the sample of interest) as a prediction tap.

Specifically, the tap selecting section 302 selects a plurality of samples of the first data at positions spatially or temporally close to the position of the sample of interest as a prediction tap.

For example, when the first and second data are image data, a plurality of pixels (pixel values of the pixels) of the image data as the first data at positions spatially or temporally close to a pixel as the sample of interest are selected as a prediction tap.

In addition, for example, when the first and second data are audio data, a plurality of samples (sample values of the samples) of the audio data as the first data at positions temporally close to the sample of interest are selected as a prediction tap.

The tap selecting section 303 selects a plurality of samples forming the first data used to perform class classification that classifies the sample of interest into one of a plurality of predetermined classes as a class tap. That is, the tap selecting section 303 selects the class tap in a manner similar to the selection of the prediction tap by the tap selecting section 302.

Incidentally, the prediction tap and the class tap may have a same tap structure (positional relation of the plurality of samples as the prediction tap (class tap) with the sample of interest as a reference), or may have different tap structures.

The prediction tap obtained in the tap selecting section 302 is supplied to a predicting operation section 306, and the class tap obtained in the tap selecting section 303 is supplied to a class classifying section 304.

The class classifying section 304 performs class classification of the sample of interest on the basis of the class tap from the tap selecting section 303. The class classifying section 304 supplies a class code corresponding to a class obtained as a result to a coefficient outputting section 305.

For example, ADRC (Adaptive Dynamic Range Coding) or the like can be adopted as a method of performing class classification.

In a method using ADRC, the samples (sample values of the samples) forming the class tap are subjected to ADRC processing, and the class of the sample of interest is determined according to an ADRC code obtained as a result of the ADRC processing.

Incidentally, in K-bit ADRC, for example, a maximum value MAX and a minimum value MIN of sample values of the samples forming the class tap are detected, DR=MAX−MIN is set as a local dynamic range of the set, and the sample value of each sample forming the class tap is requantized into K bits on the basis of the dynamic range DR. That is, the minimum value MIN is subtracted from the sample value of each sample forming the class tap, and the subtraction value is divided (requantized) by $DR/2^K$.

Then, a bit string obtained by arranging the K-bit sample values of the samples forming the class tap which sample values are obtained as described above in predetermined order is output as an ADRC code. Thus, when the class tap is subjected to one-bit ADRC processing, for example, the sample value of each sample forming the class tap is divided by an average value of the maximum value MAX and the minimum value MIN (a fractional part is dropped), and thereby the sample value of each sample is converted into one bit (binarized).

Then, a bit string obtained by arranging the one-bit sample values in predetermined order is output as an ADRC code.

Incidentally, the class classifying section 304 for example can be made to output a pattern of level distribution of the sample values of the samples forming the class tap as a class code as it is. However, in this case, when the class tap is formed by the sample values of N samples and K bits are assigned to the sample value of each sample, the number of patterns in the case of the class code output by the class classifying section 304 is $(2^N)^K$, which is an enormous number exponentially proportional to the number K of bits of the sample values of the samples.

It is therefore desirable that the class classifying section 304 perform class classification by compressing the amount of information of the class tap, that is, the sample values of the plurality of samples forming the class tap by the above-described ADRC processing, vector quantization or the like.

The coefficient outputting section 305 stores the tap coefficient of each class obtained by learning to be described later, and further outputs a tap coefficient stored at an address corresponding to the class code supplied from the class classifying section 304 (the tap coefficient of a class indicated by the class code supplied from the class classifying section 304) among the stored tap coefficients. This tap coefficient is supplied to the predicting operation section 306.

In this case, the tap coefficient corresponds to a coefficient multiplied by input data at a so-called tap in a digital filter.

The predicting operation section 306 obtains the prediction tap output by the tap selecting section 302 and the tap coefficient output by the coefficient outputting section 305, and performs a predetermined predicting operation for obtaining the predicted value of the true value of the sample of interest using the prediction tap and the tap coefficient. The predicting operation section 306 thereby obtains and outputs the sample value of the sample of interest (predicted value of the sample value of the sample of interest), that is, the sample value of the sample forming the second data.

In the thus formed converting device, the sample of interest selecting section 301 selects, as a sample of interest, one of samples that have not been a sample of interest yet among the samples forming the second data as opposed to the first data input to the converting device.

Meanwhile, the tap selecting sections 302 and 303 respectively select samples to be set as the prediction tap and the class tap for the sample of interest from the first data supplied thereto. The prediction tap is supplied from the tap selecting section 302 to the predicting operation section 306. The class tap is supplied from the tap selecting section 303 to the class classifying section 304.

The class classifying section 304 receives the class tap for the sample of interest from the tap selecting section 303, and performs class classification of the sample of interest on the basis of the class tap. Further, the class classifying section 304 supplies a class code indicating the class of the sample of interest which class is obtained as a result of the class classification to the coefficient outputting section 305.

The coefficient outputting section 305 obtains a tap coefficient stored at an address corresponding to the class code supplied from the class classifying section 304. The coefficient outputting section 305 supplies the tap coefficient to the predicting operation section 306.

The predicting operation section 306 performs a predetermined predicting operation using the prediction tap output by the tap selecting section 302 and the tap coefficient from the coefficient outputting section 305. The predicting operation section 306 thereby obtains and outputs the sample value of the sample of interest.

The sample of interest selecting section 301 selects, as a new sample of interest, one of samples that have not been a sample of interest yet among the samples forming the second data as opposed to the first data input to the converting device. A similar process is thereafter repeated.

Description will next be made of the predicting operation in the predicting operation section 306 in FIG. 23 and the learning of the tap coefficient stored in the coefficient outputting section 305.

Incidentally, suppose in this case that image data, for example, is used as the first and second data.

Consideration will be given to a case where, for example, image data of high image quality (high image quality image data) is set as second data and image data of low image quality (low image quality image data) which image data is lowered in image quality (resolution) by filtering the high image quality image data by an LPF (Low Pass Filter), for example, is set as first data, a prediction tap is selected from the low image quality image data, and the pixel value of a pixel (high image quality pixel) of the high image quality image data is obtained (predicted) by a predetermined predicting operation using the prediction tap and a tap coefficient.

Supposing that a linear first-degree predicting operation, for example, is adopted as the predetermined predicting operation, the pixel value y of a high image quality pixel is obtained by the following linear first-degree equation.

[Equation 1]

$$y = \sum_{n=1}^{N} w_n x_n \quad (1)$$

In Equation (1), $x_n$ denotes the pixel value of an nth pixel of the low image quality image data (which pixel will hereinafter be referred to as a low image quality pixel as appropriate) which pixel forms the prediction tap for the high image quality pixel y, and $w_n$ denotes an nth tap coefficient multiplied by the nth low image quality pixel (pixel value of the low image quality pixel). Incidentally, in Equation (1), the prediction tap is formed by N low image quality pixels $x_1, x_2, \ldots, x_N$.

In this case, the pixel value y of the high image quality pixel can also be obtained by a high-degree equation of a second degree or higher rather than the linear first-degree equation shown as Equation (1).

When the true value of the pixel value of a high image quality pixel as a kth pixel is denoted as $y_k$, and the predicted value of the true value $y_k$ obtained by Equation (1) is denoted as $y_k'$, the prediction error $e_k$ is expressed by the following equation.

[Equation 2]

$$e_k = y_k - y_k' \quad (2)$$

The predicted value $y_k'$ in Equation (2) is obtained according to Equation (1). Therefore, when $y_k'$ in Equation (2) is replaced according to Equation (1), the following equation is obtained.

[Equation 3]

$$e_k = y_k - \left( \sum_{n=1}^{N} w_n x_{n,k} \right) \quad (3)$$

In Equation (3), $x_{n,k}$ denotes an nth low image quality pixel forming a prediction tap for the high image quality pixel as kth pixel.

The tap coefficient $w_n$ that makes the prediction error $e_k$ in Equation (3) (or Equation (2)) zero is an optimum for predicting the high image quality pixel. However, it is generally difficult to obtain such a tap coefficient $w_n$ for all high image quality pixels.

Accordingly, supposing that a method of least squares, for example, is adopted as a standard showing that the tap coefficient $w_n$ is an optimum, the optimum tap coefficient $w_n$ can be obtained by minimizing a sum E of square errors expressed by the following equation.

[Equation 4]

$$E = \sum_{k=1}^{K} e_k^2 \tag{4}$$

In Equation (4), K denotes the number of pixels (number of pixels for learning) of a set of the high image quality pixel $y_k$ and low image quality pixels $x_{1,k}, x_{2,k}, \ldots, x_{N,k}$ forming a prediction tap for the high image quality pixel $y_k$.

The smallest value (minimum value) of the sum E of square errors in Equation (4) is given by $w_n$ that makes a result of partial differentiation of the sum E with respect to the tap coefficient $w_n$ zero, as shown in Equation (5).

[Equation 5]

$$\frac{\partial E}{\partial w_n} = e_1 \frac{\partial e_1}{\partial w_n} + e_2 \frac{\partial e_2}{\partial w_n} + \ldots + e_k \frac{\partial e_k}{\partial w_n} = 0 \tag{5}$$

$$(n = 1, 2, \ldots N)$$

Accordingly, the following equation is obtained when the above Equation (3) is subjected to partial differentiation with respect to the tap coefficient $w_n$.

[Equation 6]

$$\frac{\partial e_k}{\partial w_1} = -x_{1,k}, \tag{6}$$

$$\frac{\partial e_k}{\partial w_2} = -x_{2,k}, \ldots ,$$

$$\frac{\partial e_k}{\partial w_N} = -x_{N,k},$$

$$(k = 1, 2, \ldots , K)$$

The following equation is obtained from Equations (5) and (6).

[Equation 7]

$$\sum_{k=1}^{K} e_k x_{1,k} = 0, \tag{7}$$

$$\sum_{k=1}^{K} e_k x_{2,k} = 0, \ldots$$

$$\sum_{k=1}^{K} e_k x_{N,k} = 0$$

By substituting Equation (3) for $e_k$ in Equation (7), Equation (7) can be expressed as a normal equation shown in Equation (8).

[Equation 8]

$$\begin{pmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{pmatrix} \begin{pmatrix} w_1 \\ w_2 \\ \vdots \\ w_N \end{pmatrix} = \tag{8}$$

$$\begin{pmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{pmatrix}$$

The normal equation of Equation (8) can be solved for the tap coefficient $w_n$ by using a sweep-out method (Gauss-Jordan elimination method) and the like, for example.

By setting up and solving the normal equation of Equation (8) for each class, an optimum tap coefficient (tap coefficient that minimizes the sum E of square errors in this case) $w_n$ can be obtained for each class.

For the learning of the tap coefficient, a large number of pieces of student data corresponding to the first data (low image quality image data in the above-described case) and teacher data corresponding to the second data (high image quality image data in the above-described case) are prepared, and the learning of the tap coefficient is performed by using the student data and the teacher data.

Then, the coefficient outputting section 305 in FIG. 23 stores a tap coefficient for each class obtained by the learning of the tap coefficient.

Depending on the selecting method of student data corresponding to the first data and teacher data corresponding to the second data, tap coefficients for performing various signal processing as described above can be obtained as the tap coefficient.

Specifically, by learning the tap coefficient with high image quality image data set as teacher data corresponding to the second data and with low image quality image data obtained by degrading the spatial resolution of the high image quality image data set as student data corresponding to the first data, as described above, a tap coefficient for performing spatial resolution creating processing that converts the first data as low image quality image data (SD (Standard Definition) image) to the second data as high image quality image data (HD (High Definition) image data) obtained by improving the spatial resolution of the low image quality image data can be obtained as the tap coefficient.

Incidentally, in this case, the first data (student data) may have a same number of pixels as the second data (teacher data), or may have a smaller number of pixels than the second data (teacher data).

In addition, for example, by learning the tap coefficient with high image quality image data set as teacher data and with image data obtained by superimposing noise on the high image quality image data as the teacher data set as student data, a tap coefficient for performing noise removing processing that converts the first data as the low-S/N image data to the second data as the high-S/N image data obtained by removing (reducing) the noise included in the low-S/N image data can be obtained as the tap coefficient.

Further, for example, by learning the tap coefficient with certain image data set as teacher data and with image data obtained by discretely reducing the number of pixels of the image data as the teacher data set as student data, a tap coefficient for performing enlarging processing (resizing processing) that converts the first data as a part of the image data to the second data as enlarged image data obtained by enlarging the first data can be obtained as the tap coefficient.

In addition, for example, by learning the tap coefficient with image data of a high frame rate set as teacher data and with image data obtained by discretely reducing frames of the image data of the high frame rate as the teacher data set as student data, a tap coefficient for performing temporal resolution creating processing that converts the first data as image data of a predetermined frame rate to the second data as image data of the high frame rate can be obtained as the tap coefficient.

Incidentally, for example, by learning the tap coefficient with high image quality image data of a high frame rate set as teacher data and with low image quality image data of a low frame rate obtained by discretely reducing pixels of each frame of the teacher data and frames of the teacher data set as student data, a tap coefficient for performing resolution creating processing in the spatial direction and the temporal direction that converts the first data as low image quality image data of a predetermined frame rate to the second data as high image quality image data of the high frame rate can be obtained as the tap coefficient.

Further, for example, by learning the tap coefficient with image data before MPEG coding set as teacher data and with decoded image data obtained by MPEG decoding of MPEG-coded image data set as student data, a tap coefficient for performing distortion removing processing that converts the first data as decoded image data including block distortion and the like which decoded image data is obtained by the MPEG coding and the MPEG decoding to the second data as image data free from block distortion or the like can be obtained as the tap coefficient.

In addition, for example, by learning the tap coefficient with image data free from distortion caused by aberration or the like set as teacher data and with image data obtained by distorting the teacher data set as student data, a tap coefficient for performing optical distortion removing processing that removes the optical distortion and which converts the first data as image data including the distortion to the second data as image data free from the distortion can be obtained as the tap coefficient.

Further, for example, by learning the tap coefficient with audio data having a high sampling rate set as teacher data and with audio data having a low sampling rate, which audio data is obtained by discretely reducing samples of the teacher data, set as student data, a tap coefficient for performing temporal resolution creating processing that converts the first data as audio data of the low sampling rate to the second data as audio data of the high sampling rate can be obtained as the tap coefficient.

The processing that removes distortion caused by signal processing from image data as input data in the signal processing distortion removing portion 41 in FIG. 9 and the like can be performed by the class classification adaptive processing as described above.

Specifically, for example, the tap coefficient for each class is obtained by learning the tap coefficient with image data before signal processing in the signal processing section 27 (FIG. 5) set as teacher data and image data obtained by subjecting the teacher data to the signal processing in the signal processing section 27 set as student data, and the class classification adaptive processing is performed using the tap coefficient. Thereby distortion caused by the signal processing can be removed from the image data as input data.

Specifically, the processing that removes distortion caused by signal processing from image data as input data can be performed using a technique described in Japanese Patent Laid-Open No. 2001-320587, for example.

Japanese Patent Laid-Open No. 2001-320587 describes a technique that performs the class classification adaptive processing using a tap coefficient obtained by learning performed with an image before MPEG coding set as teacher data and with MPEG coded data obtained by MPEG-coding the image set as student data.

Description will next be made of a method of improving resolution in the spatiotemporal direction of image data as input data in the spatiotemporal resolution creating portion 42 in FIG. 9 and the like.

The processing that improves resolution in the spatiotemporal direction of image data as input data in the spatiotemporal resolution creating portion 42 in FIG. 9 and the like can be performed by the class classification adaptive processing described above.

Specifically, for example, the tap coefficient for each class is obtained by learning the tap coefficient with image data of high resolution in the temporal direction and the spatial direction set as teacher data and with image data obtained by lowering the resolution in the temporal direction and the spatial direction of the teacher data set as student data, and the class classification adaptive processing is performed using the tap coefficient. Thereby the resolution in the spatiotemporal direction of the image data as input data can be improved.

Specifically, the processing that improves resolution in the spatiotemporal direction of image data as input data can be performed using a technique described in Japanese Patent Laid-Open No. 2005-260928, for example.

Japanese Patent Laid-Open No. 2005-260928 describes a technique that performs the class classification adaptive processing using a tap coefficient obtained by learning performed with an image of high resolution set as teacher data and with image data of low resolution set as student data.

Incidentally, the spatiotemporal resolution creating portion 42 can also remove a motion blur caused by hand movement, a focus blur caused by a defocus state, and the like by improving the resolution in the spatiotemporal direction. In addition, blur removal can be performed using a technique described in Japanese Patent Laid-Open No. 2005-063097, for example.

Japanese Patent Laid-Open No. 2005-063097 describes a technique that assumes a product of a matrix A of pixel values of an image without a blur and a matrix W of coefficients conforming to a Gaussian distribution is a column vector B of pixel values of a blurred image, that is, that an equation B=WA holds, imposes a condition that a difference between adjacent pixel values of an image without a blur is zero on pixels other than pixels of an edge part, obtains an inverse matrix $W^{-1}$ of the matrix W, calculates a product $A=W^{-1}B$ of the blurred image B and the coefficient $W^{-1}$, and thereby obtains the image A without a blur.

Description will next be made of a method of removing distortion caused by the optical system 22 (for example image distortion caused by the aberration of the optical system 22 or the like) from image data as input data in the optical distortion removing portion 43 in FIG. 9 and the like.

The processing that removes distortion (optical distortion) caused by the optical system 22 from image data as input data in the optical distortion removing portion 43 in FIG. 9 and the like can be performed by the class classification adaptive processing described above.

Specifically, for example, the tap coefficient for each class is obtained by learning the tap coefficient with image data without optical distortion set as teacher data and image data obtained by causing optical distortion to the teacher data set as student data, and the class classification adaptive processing is performed using the tap coefficient. Thereby the optical distortion can be removed from the image data as input data.

Specifically, the processing that removes optical distortion from image data as input data can be performed using a technique described in WO00/56075 Pamphlet, for example.

WO00/56075 Pamphlet describes a technique that performs the class classification adaptive processing using a tap coefficient obtained by learning performed with a distorted image set as student data and with an image without distortion set as teacher data.

Incidentally, processing performed by the signal processing distortion removing portion 41, the spatiotemporal resolution creating portion 42, and the optical distortion removing portion 43 in the image pickup device distortion removing block 32 in FIG. 9 and the like can be performed collectively by class classification adaptive processing.

Specifically, for example, the tap coefficient for each class is obtained by learning the tap coefficient with image data of high resolution in the temporal direction and the spatial direction set as teacher data and with image data obtained by causing optical distortion to the teacher data, degrading the resolution in the temporal direction and the spatial direction of the teacher data, and performing signal processing on the teacher data set as student data, and the class classification adaptive processing is performed using the tap coefficient. Thereby the processing performed by the signal processing distortion removing portion 41, the spatiotemporal resolution creating portion 42, and the optical distortion removing portion 43 can be performed collectively.

Description will next be made of a method of detecting relative operation of the image pickup device 21 (FIG. 5) with respect to the first object, that is, for example operation such as panning, tilting, zooming or the like of the image pickup device 21 from image data as input data in the image pickup device operation detecting portion 51 in FIG. 9 and the like.

Techniques described in Japanese Patent Laid-Open No. Hei 06-165014 and Japanese Patent Laid-Open No. Hei 05-328201, for example, can be used as a method of detecting the operation of panning, tilting, or zooming of the image pickup device 21.

Japanese Patent Laid-Open No. Hei 06-165014 describes a techniques that, for a reference image and an enlarged image obtained by enlarging the reference image, performs linear interpolation that enlarges the reference image at a plurality of zoom ratios, obtains correlation coefficients between interpolated images obtained by the linear interpolation and the enlarged image, and obtains the zoom ratio at which the correlation coefficient is a maximum as the zoom ratio of the enlarged image.

In addition, Japanese Patent Laid-Open No. Hei 05-328201 describes a technique that detects the motion vector of one screen, stores motion vectors of a plurality of screens, determines that an intentional camera operation (movement) such as panning, tilting, or the like has occurred when there is a uniform motion except for a start of the motion, there is a uniformly accelerated motion at the start of the motion, and the direction of the motion is fixed and otherwise determines that a hand movement has occurred, and makes hand movement correction.

Figure 24:
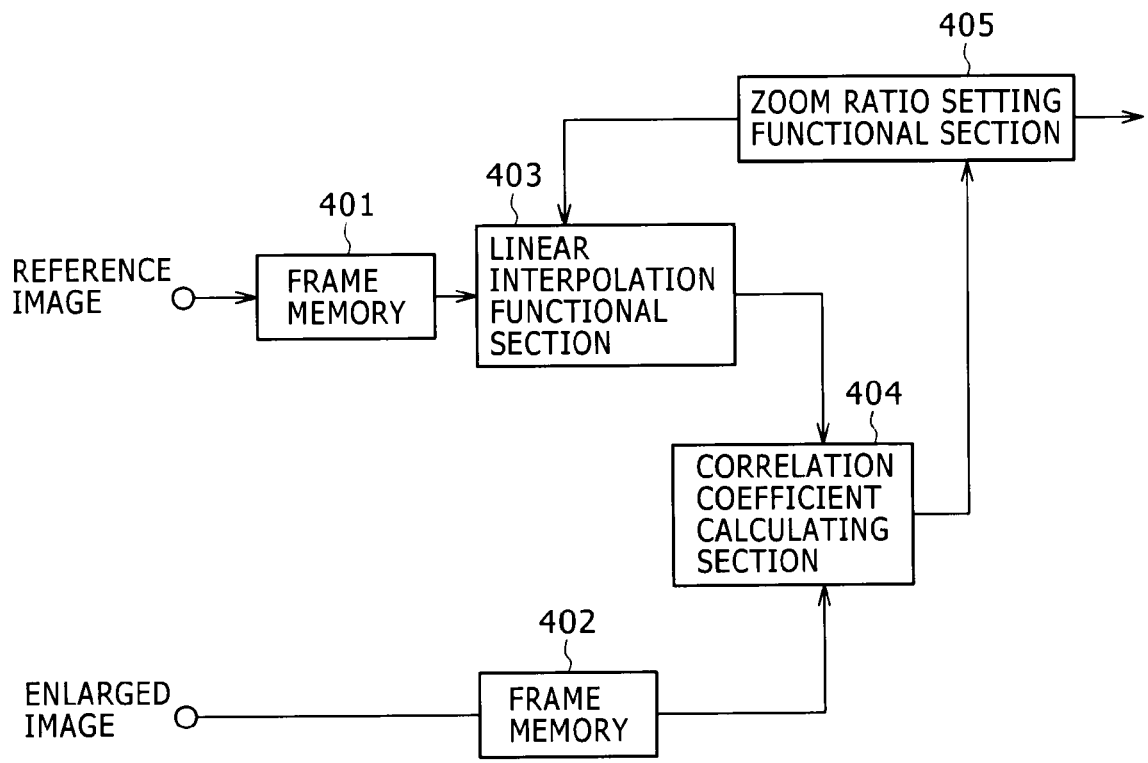
FIG. 24 is a block diagram showing an example of configuration of a detecting device that detects zoom operation.

FIG. 24 shows an example of configuration of a detecting device that detects the operation of zooming using the technique described in Japanese Patent Laid-Open No. Hei 06-165014.

In FIG. 24, the detecting device includes frame memories 401 and 402, a linear interpolation functional section 403, a correlation coefficient calculating section 404, and a zoom ratio setting functional section 405.

The frame memory 401 is supplied with image data of a frame immediately after a scene change, for example, which image data is included in image data as input data. The frame memory 401 stores the image data supplied thereto as reference image data.

On the other hand, the frame memory 402 is sequentially supplied with image data of a frame succeeding the frame supplied to the frame memory 401. The frame memory 402 stores the image data supplied thereto as enlarged image data resulting from enlarging the reference image data at a predetermined zoom ratio.

Suppose in this case that the zoom ratio can assume not only a value of a magnification of one or more but also a value of less than the magnification of one. When the zoom ratio is less than the magnification of one, the enlarged image data is image data obtained by enlarging the reference image data at less than the magnification of one, that is, image data obtained by reducing the reference image data.

When new enlarged image data is stored in the frame memory 402 after the reference image data is stored in the frame memory 401, the zoom ratio setting functional section 405 sets the enlarged image data stored in the frame memory 402 as image data of interest, selects, for the image data of interest, for example one of a plurality of predetermined zoom ratios which zoom ratio has not been a zoom ratio of interest yet as a zoom ratio of interest, and supplies the zoom ratio of interest to the linear interpolation functional section 403.

The linear interpolation functional section 403 performs linear interpolation that enlarges the reference image data stored in the frame memory 401 to a magnification of a numerical value indicated by the zoom ratio of interest from the zoom ratio setting functional section 405 (discretely reduces the reference image data when the numerical value indicated by the zoom ratio of interest is less than one). The linear interpolation functional section 403 supplies interpolated image data obtained as a result to the correlation coefficient calculating section 404.

For the zoom ratio of interest, the correlation coefficient calculating section 404 obtains a correlation coefficient between the interpolated image data from the linear interpolation functional section 403 and the image data of interest stored in the frame memory 402, that is, a value obtained by dividing a covariance of pixel values of the interpolated image data and pixel values of the image data of interest by a product of a standard deviation of the pixel values of the interpolated image data and a standard deviation of the pixel values of the image data of interest. The correlation coefficient calculating section 404 supplies the correlation coefficient to the zoom ratio setting functional section 405.

In this case, the linear interpolation functional section 403 obtains a correlation coefficient while shifting the position of pixels of the interpolated image data and the image data of interest which pixels are made to correspond to each other as appropriate, and adopts a correlation coefficient having a largest value among a plurality of correlation coefficients obtained as a result as a correlation coefficient for the zoom ratio of interest.

After the zoom ratio setting functional section 405 selects all of the plurality of predetermined zoom ratios as zoom ratio of interest, and correlation coefficients for all of the plurality of zoom ratios are supplied from the correlation coefficient calculating section 404 to the zoom ratio setting functional section 405 by performing processing in the linear interpolation functional section 403 and the correlation coefficient calculating section 404 for all of the plurality of zoom ratios, the zoom ratio setting functional section 405 detects a correlation coefficient having a largest value from the correlation coefficients for all of the plurality of zoom ratios, and determines and outputs the zoom ratio corresponding to that correlation coefficient as the zoom ratio of the image data of interest (zoom ratio for the reference image data).

Thereafter, each time new image data is stored in the frame memory 402, the new image data is set as image data of interest, and a similar process is repeated.

Figure 25:
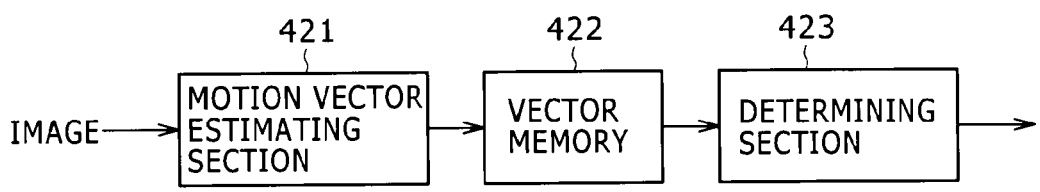
FIG. 25 is a block diagram showing an example of configuration of a detecting device for detecting an intentional camera operation (movement).

Next, FIG. 25 shows an example of configuration of a detecting device for detecting an intentional camera operation (movement) such as panning, tilting or the like using the technique described in Japanese Patent Laid-Open No. Hei 05-328201.

In FIG. 25, the detecting device includes a motion vector estimating section 421, a vector memory, and a determining section 423.

The motion vector estimating section 421 is supplied with image data as input data. For each frame (field) of the image data supplied to the motion vector estimating section 421, the motion vector estimating section 421 detects the motion vector of the frame as a whole (entire screen). The motion vector estimating section 421 supplies the motion vector to the vector memory 422.

The vector memory 422 stores motion vectors supplied from the motion vector estimating section 421 for a few frames to a few ten frames.

The determining section 423 determines whether an intentional camera operation such as panning, tilting or the like is performed on the basis of motion vectors for a plurality of frames for the few frames to the few ten frames in the past stored in the vector memory 422. The determining section 423 outputs a result of the determination.

Specifically, the determining section 423 determines that an intentional camera operation such as panning, tilting or the like is performed when a motion indicated by the motion vectors is for example a uniform motion except for a start of the motion, the start of the motion is a uniformly accelerated motion, and the direction of the motion is fixed. The determining section 423 otherwise determines that no intentional camera operation is performed. The determining section 423 outputs a result of the determination.

Description will next be made of a method of generating the first object image data representing the first object before the image pickup device 21 picks up an image of the first object by adding image data as input data into the storage portion 53 while compensating by the operation of the image pickup device 21 which operation is indicated by the operation information from the image pickup device operation detecting portion 51 in the image pickup device operation compensating portion 52 in FIG. 9 and the like.

Techniques described in Japanese Patent Laid-Open No. Hei 07-038858, Japanese Patent Laid-Open No. Hei 07-046533, and Japanese Patent Laid-Open No. Hei 11-164264, for example, can be used as the method of generating the first object image data representing the first object before the image pickup device 21 picks up an image of the first object by adding image data into the storage portion 53.

Japanese Patent Laid-Open No. Hei 07-038858 and Japanese Patent Laid-Open No. Hei 07-046533 describe a technique that obtains a background image $X(k)$ of a kth frame by weighting addition according to an equation $X(k)=(1-\alpha)X(k-1)+\alpha Z(k)$ using a pixel $Z(k)$ of the input image of the kth frame and a weight $\alpha$.

In addition, Japanese Patent Laid-Open No. Hei 11-164264 describes a technique that generates an image of high resolution by detecting the movement of a screen as a whole and writing a pixel at a position shifted by the movement.

Figure 26:
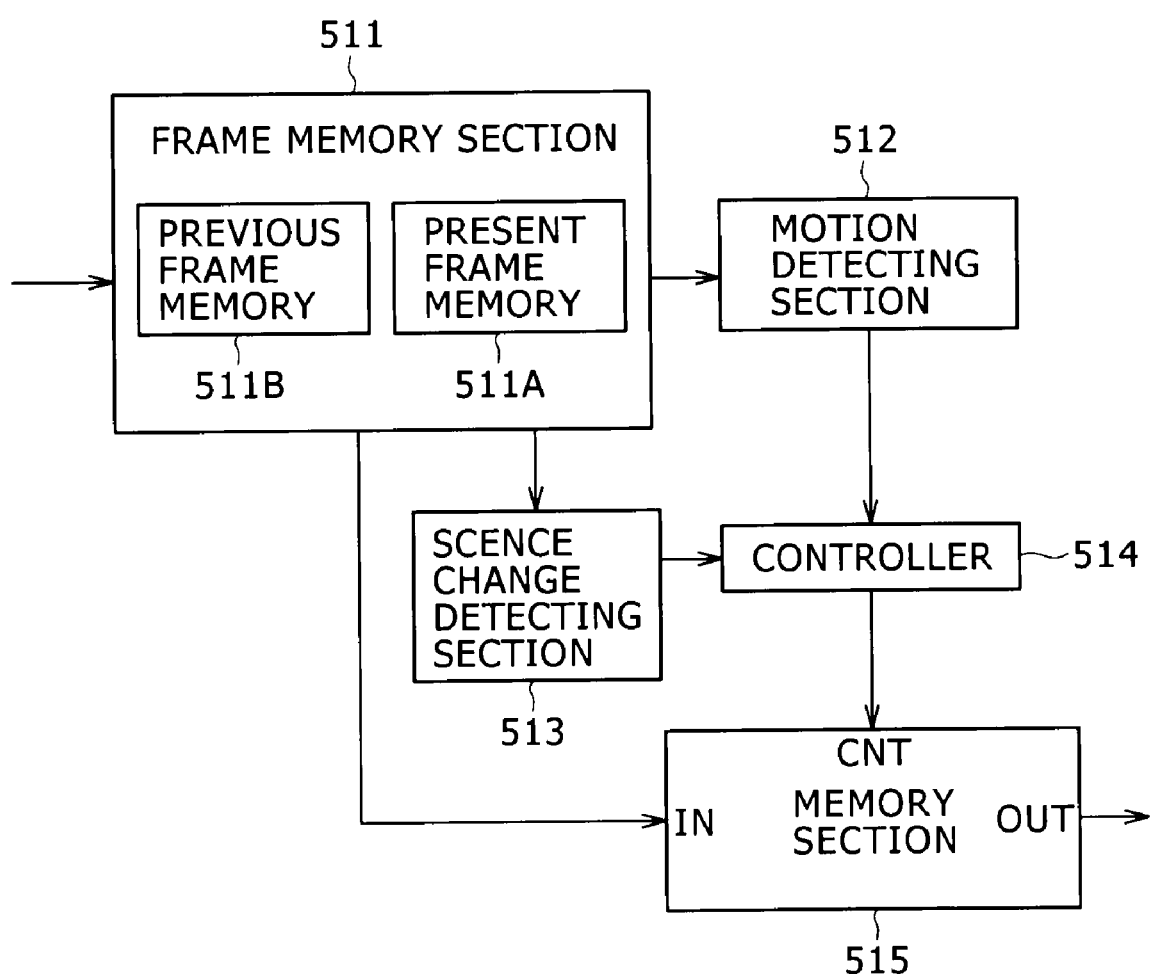
FIG. 26 is a block diagram showing an example of configuration of a generating device that generates first object image data by adding in image data.

FIG. 26 shows an example of configuration of a generating device that generates the first object image data representing the first object before the image pickup device 21 picks up an image of the first object by adding in image data using the techniques described in Japanese Patent Laid-Open No. Hei 07-038858, Japanese Patent Laid-Open No. Hei 07-046533, and Japanese Patent Laid-Open No. Hei 11-164264.

In FIG. 26, the generating device includes a frame memory section 511, a motion detecting section 512, a scene change detecting section 513, a controller 514, and a memory section 515.

Incidentally, in this case, to simplify description, suppose that image data as input data whose whole screen makes an identical movement, which data is obtained by picking up an image of scenery or the like by panning or tilting a video camera (image pickup device 21), is input to the generating device.

The frame memory section 511 is supplied with image data as input data, and the frame memory section 511 stores image data of two consecutive frames. Specifically, the frame memory section 511 has a present frame memory 511A and a previous frame memory 511B. The present frame memory 511A stores the present frame input now, and the previous frame memory 511B stores the previous frame immediately before the present frame (therefore the frame stored in the present frame memory 511A up to a time immediately before the present frame is supplied to the present frame memory 511A), respectively.

The motion detecting section 512 refers to the frame memory section 511, detects a motion vector indicating the movement of the present frame with respect to the previous frame, and supplies the motion vector to the controller 514. Incidentally, as described above, in this case, image data whose whole screen makes an identical movement is input, and therefore one motion vector is detected for the whole screen (one frame). In addition, in this case, the motion detecting section 512 detects for example a component in a vertical direction of the movement of components in a horizontal direction and the vertical direction which components form the motion vector in finer units than pixels forming the image data.

The scene change detecting section 513 detects a scene change by referring to the frame memory section 511. When the scene change detecting section 513 detects a scene change from a previous frame to a present frame, the scene change detecting section 513 outputs information to that effect to the controller 514.

The controller 514 controls a writing address and a reading address in the memory section 515 on the basis of the motion vector from the motion detecting section 512. In addition, when the controller 514 receives information indicating a scene change from the scene change detecting section 513, the controller 514 resets the writing address and the reading address in the memory section 515, and clears a stored value in the memory section 515 to a predetermined initial value.

The memory section 515 is formed by a memory or the like having a sufficiently higher storage capacity than one frame of image data. Under control of the controller 514, the memory section 515 stores the image data of the present frame stored in the present frame memory 511A of the frame memory section 511 and the like, and reads and outputs stored image data.

Figure 27:
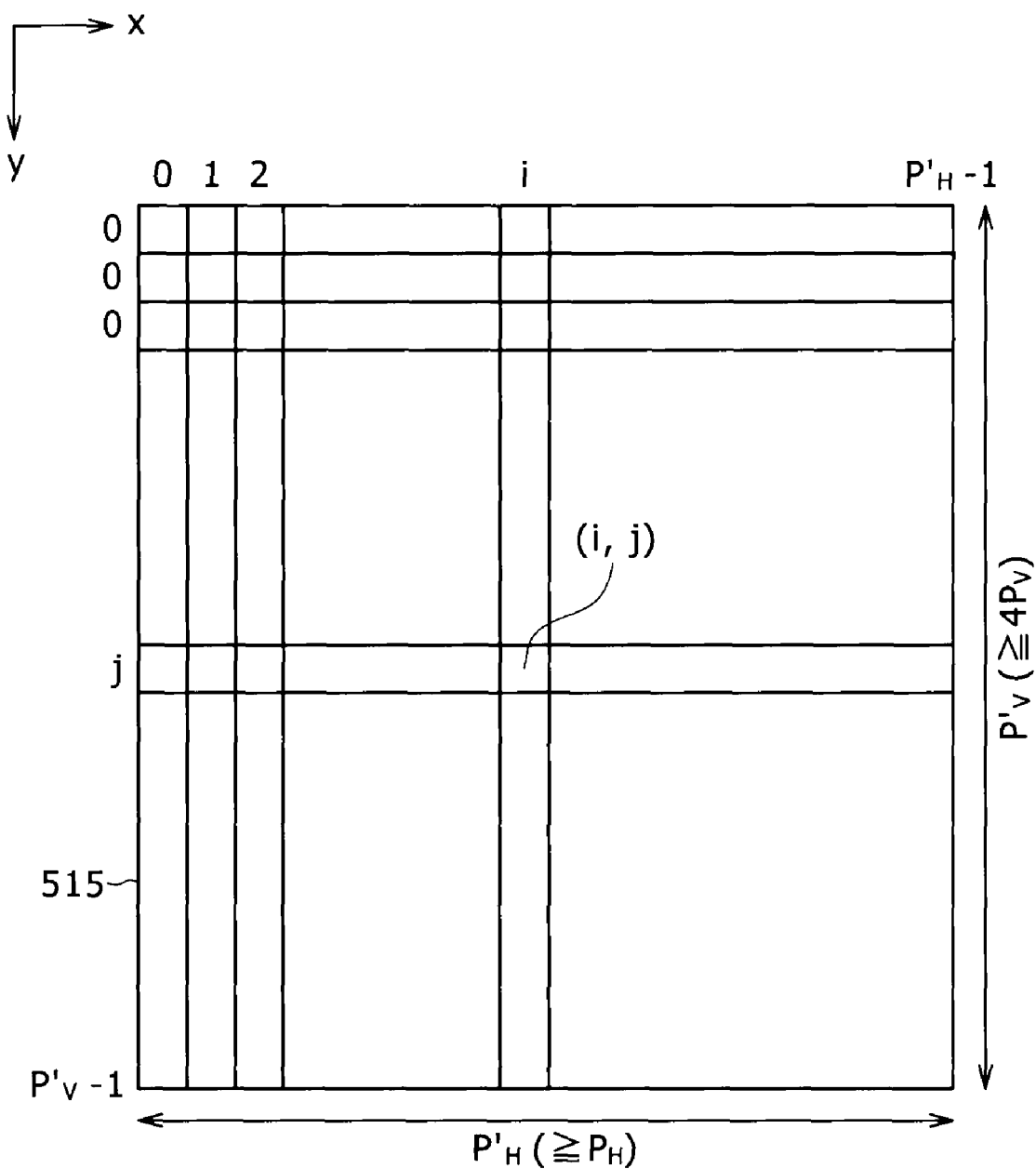
FIG. 27 is a diagram schematically showing an example of configuration of a memory section 515.

FIG. 27 schematically shows an example of configuration of the memory section 515 in FIG. 26.

For example, as shown in FIG. 27, the memory section 515 has a storage capacity to store the pixel values of PH' pixels in the horizontal direction (direction of horizontal scanning lines) and the pixel values of PV' pixels in the vertical direction, respectively.

Incidentally, letting PH or PV be the number of pixels in the horizontal direction or the vertical direction which pixels form image data, PH'>>PH, and PV'>>PV in this case.

In addition, as for addresses of the memory section 515, absolute addresses and relative addresses are defined. The absolute addresses are for example sequentially given with an uppermost and leftmost storage area in the memory section 515 set as an origin (0,0), and with the horizontal direction and the vertical direction set as an x-axis and a y-axis, respectively. Thus, an absolute address that is an (i+1)th absolute address from a left and a (j+1)th absolute address from a top is (i, j).

Figure 28:
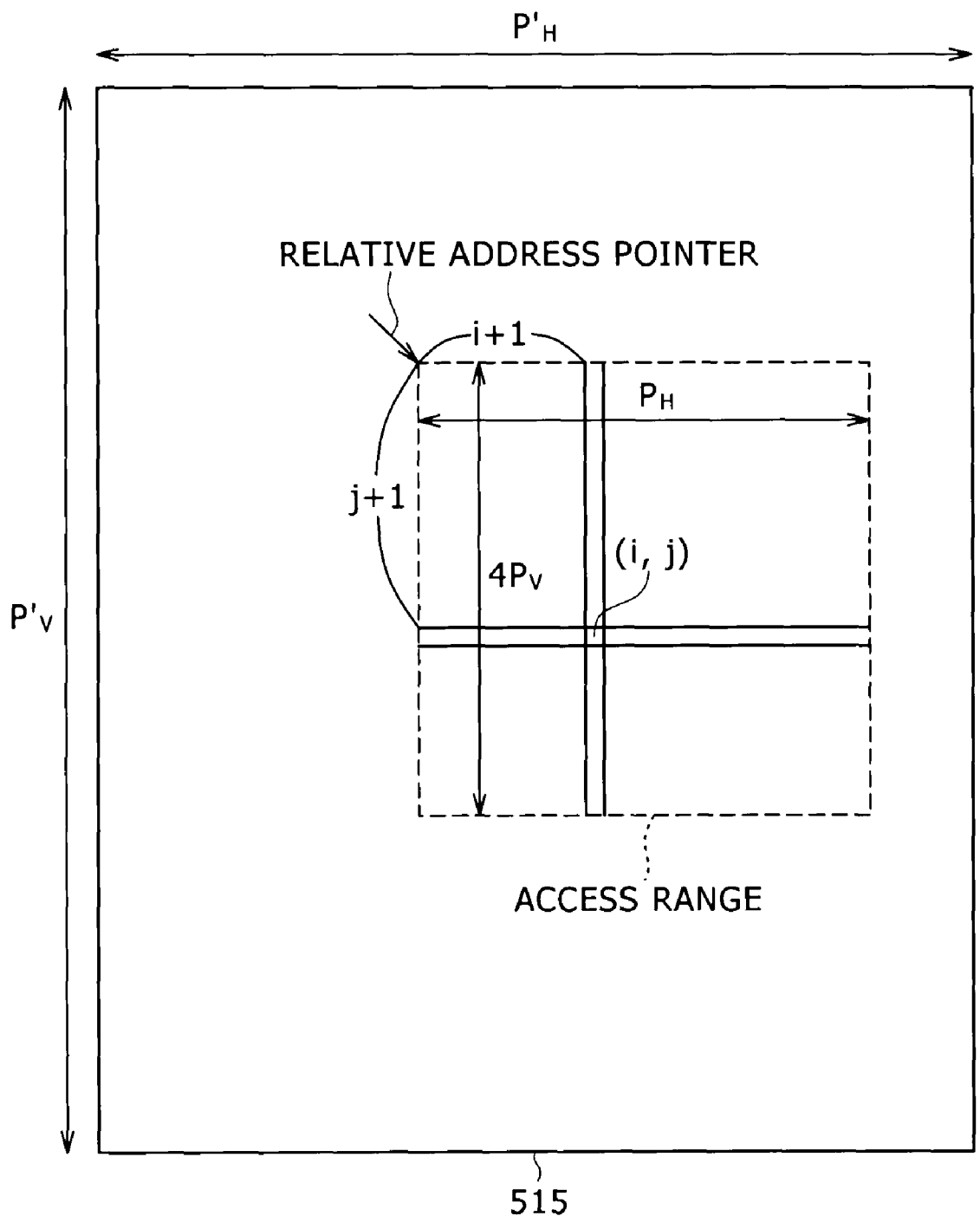
FIG. 28 is a diagram of assistance in explaining relative addresses of the memory section 515.

FIG. 28 is a diagram of assistance in explaining relative addresses of the memory section 515.

The relative addresses are addresses having an absolute address indicated by a relative address pointer as an origin, as shown in FIG. 28. A relative address that is an (i+1)th relative address from the left of the relative address pointer and a (j+1)th relative address from a top is denoted as (i, j).

The relative address pointer is controlled by the controller 514. The writing of image data to the memory section 515 and the reading of image data from the memory section 515 are performed in a range of PH×4PV pixels (part indicated by a dotted line in the same figure) (which range will hereinafter be referred to as an access range as appropriate), for example, having the relative address pointer as an uppermost and leftmost point.

In this case, as described above, the writing of image data to the memory section 515 is performed in the access range, and in this case, the size of the access range is a range of PH×4PV pixels. Therefore, only a same number of pixels as the number of pixels in the horizontal direction which pixels form image data as input data can be written in the horizontal direction of the access range, whereas pixels four times the number of pixels in the vertical direction which pixels form the image data as input data can be written in the vertical direction of the access range.

By thus allowing pixels four times the number of pixels in the vertical direction which pixels form the image data as input data to be written in the vertical direction of the access range, new pixels at a position corresponding to a movement less than a pixel of the image data are assumed for each frame of the image data as input data, and therefore an image of high resolution in the spatial direction with an increased number of pixels in the vertical direction (number of horizontal scanning lines) can be formed (created).

Figure 29:
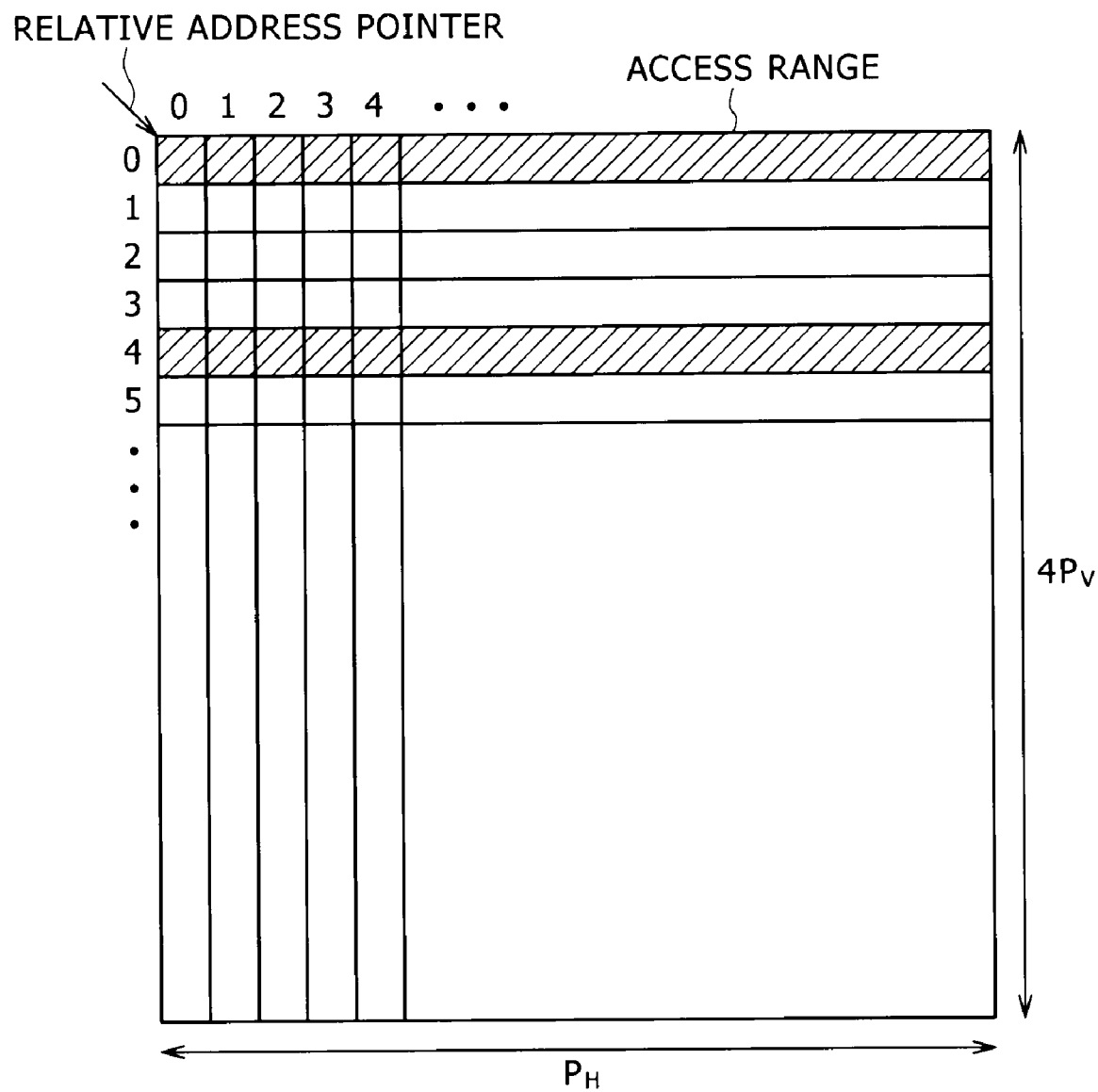
FIG. 29 is a diagram of assistance in explaining the writing of image data of one frame to an access range.

Specifically, FIG. 29 is a diagram of assistance in explaining the writing of image data of one frame to the access range.

As indicated by hatching in FIG. 29, the writing of the image data of one frame to the access range is sequentially performed from an address indicated by the relative address pointer in the horizontal direction, and is performed in every fourth row from an address indicated by the relative address pointer in the vertical direction.

Therefore, a movement in the vertical direction by one pixel in the image data corresponds to four pixels in the access range. As a result, pixels can be assumed at positions corresponding to movement in the vertical direction in units of ¼ of a pixel in the image data. That is, directing attention to only the vertical direction, the access range can be moved in finer units than one pixel (units of ¼ of a distance between pixels forming the image data in this case) according to the movement of the image data. When image data is written in every fourth row in such an access range, a space between pixels adjacent to each other in the vertical direction is filled, and an image of four times the resolution in the vertical direction can be obtained.

Description will next be made of the operation of the generating device of FIG. 26.

Image data as input data is supplied to the frame memory section 511, and is stored in the present frame memory 511A. Then, when image data of a next frame is supplied, the image data is stored as a present frame in the present frame memory 511A, and the image data that has hitherto been stored in the present frame memory 511A is supplied as a previous frame to the previous frame memory 511B to be stored in the previous frame memory 511B. Thereafter a similar process is repeated in the frame memory section 511.

When the first frame is stored in the present frame memory 511A of the frame memory section 511, the scene change detecting section 513 detects that the first frame is stored in the present frame memory 511A in a similar manner to the detection of a scene change. The scene change detecting section 513 notifies the controller 514 that a scene change has occurred.

In this case, when the first frame is stored in the present frame memory 511A, no image data has been stored in the previous frame memory 511B yet, so that a sum of absolute values of differences between the present frame memory 511A and the previous frame memory 511B is large and thus the scene change detecting section 513 detects a scene change. However, in this case, there is no problem because it is not necessary to distinguish a scene change from the storing of the first frame in the present frame memory 511A.

When the controller 514 receives the scene change (actually, however, the storing of the first frame in the present frame memory 511A rather than the scene change, as described above) from the scene change detecting section 513, the controller 514 resets the memory section 515. Specifically, the relative address pointer is moved to the origin (0, 0) of the absolute addresses, and all stored values in the memory section 515 are cleared to a predetermined initial value.

Thereafter the image data stored in the present frame memory 511A is supplied to the memory section 515 and written to the memory section 515. The writing of the image data is performed within the access range, and is performed in every fourth pixel (three pixels apart) in the vertical direction, as described above. Incidentally, address control when image data is written to the memory section 515 is performed by the controller 514.

When a next frame is supplied to the frame memory section 511, the scene change detecting section 513 determines whether a scene change has occurred. When it is determined that a scene change has occurred, the scene change detecting section 513 outputs information indicating that a scene change has occurred to the controller 514. Thereafter a similar process to that in the above-described case is performed.

When it is determined that a scene change has not occurred, on the other hand, the motion detecting section 512 detects a motion vector. Incidentally, in this case, the motion vector is detected in the vertical direction in units shorter than the interval of one line, as described above. The motion vector detected in the motion detecting section 512 is supplied to the controller 514. When the controller 514 receives the motion vector, the controller 514 moves the relative address pointer by an amount corresponding to the motion vector.

In this case, the relative address pointer is moved by the same number of pixels as a component in the horizontal direction of the motion vector in the horizontal direction, but is moved by the same number of pixels as a number obtained by for example rounding off a value four times a component in the vertical direction of the motion vector in the vertical direction. This is because the access range has a storage capacity corresponding to four times the number of pixels of image data in the vertical direction, as described above.

After the relative address pointer is moved, the image data stored in the present frame memory 511A (image from which the motion vector is detected) is supplied to the memory section 515. Then, the image data is added in in every fourth line within the access range.

That is, setting a certain pixel of the image data stored in the present frame memory 511A as a pixel of interest, letting A be the pixel value of the pixel of interest, and letting B be a pixel value stored at an address corresponding to the pixel of interest in the access range of the memory section 515, the memory section 515 obtains a new pixel value C by weighting addition according to an equation $C=(1-\alpha)B+\alpha A$, where $\alpha$ is a weight having a value in a range $0<\alpha<1$. The new pixel value C is written to the address corresponding to the pixel of interest in a form of overwriting.

Thereafter, when a next frame is supplied to the frame memory section 511, a similar process is repeated.

As described above, the image data as the input data is added in (subjected to weighting addition) in the memory section 515. Thus, when an image corresponding to the image data as the input data includes for example a stationary first object such as scenery or the like, a second object such as a moving telop or the like, and a moving third object such as a person or the like, the image data of the moving second and third objects is gradually erased (removed). As a result, the image data stored in the memory section 515 becomes image data of only the stationary first object.

Further, because the adding in is performed while the relative address pointer is moved according to the motion vector, the image data stored in the memory section 515 is image data with a wider angle than image data of one frame, that is, image data representing an image closer to an image that faithfully reproduces the real world (real world image).

Incidentally, while the memory section 515 obtains image data of high resolution in the vertical direction which resolution is four times that of the image data as input data, as described above, image data of high resolution in the horizontal direction can also be similarly obtained.

It is also possible to obtain an image of the same resolution as the image data as input data in both the horizontal direction and the vertical direction.

Description will next be made of a method of generating third object image data whose motion blur is reduced using input data and first object image data stored in the storage portion 53, assuming that the pixel values of pixels of a third object included in the input data are values obtained by integrating the pixel values of respective pixels free from the motion blur in a temporal direction while moving the pixel values of the respective pixels free from the motion blur in the foreground blur removal processing portion 55 in FIG. 12.

A technique described in Japanese Patent Laid-Open No. 2001-250119, for example, can be used as a method of generating third object image data whose motion blur is reduced assuming that the pixel values of pixels of a third object included in input data are values obtained by integrating the pixel values of respective pixels free from the motion blur in a temporal direction while moving the pixel values of the respective pixels free from the motion blur.

Japanese Patent Laid-Open No. 2001-250119 describes a technique of obtaining pixel values (real world image) free from a motion blur assuming that the pixel values of a picked-up image are values obtained by integrating the pixel values of pixels free from the motion blur in a temporal direction while moving the pixel values of the pixels free from the motion blur.

A method of generating image data whose motion blur is reduced using the technique described in Japanese Patent Laid-Open No. 2001-250119 will be described with reference to FIGS. 30 to 32.

Figure 30:
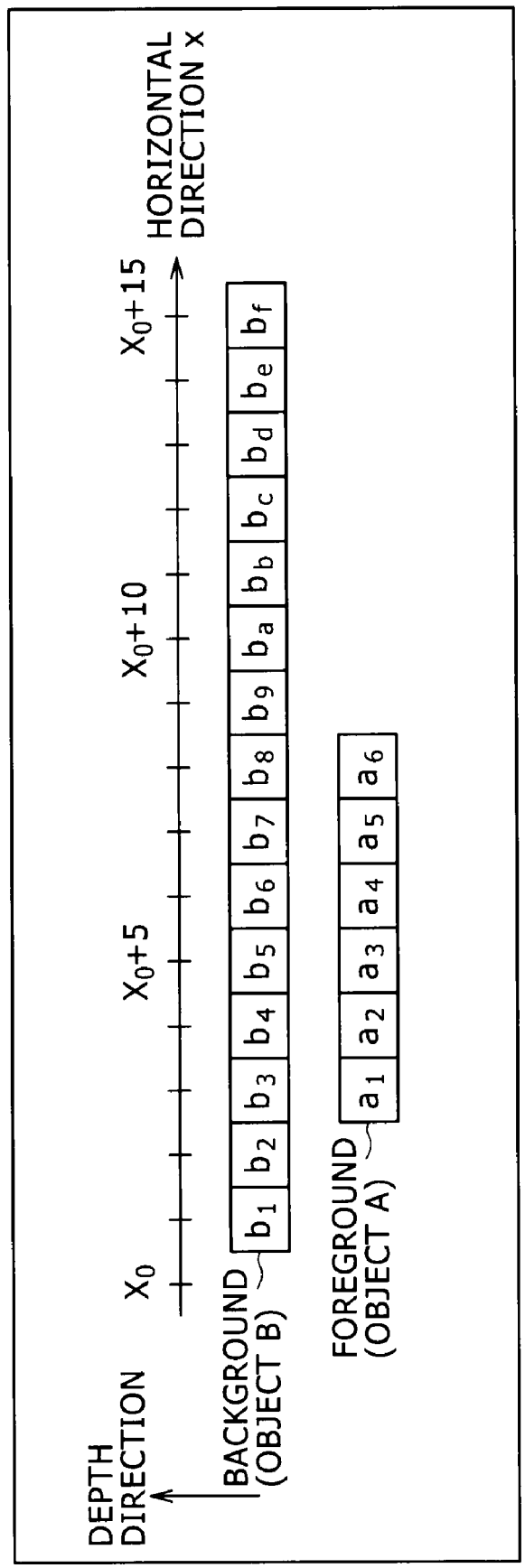
FIG. 30 is a diagram showing a stationary object B as a background and a moving object A as a foreground.

FIG. 30 shows a stationary object B as a background and a moving object A as a foreground.

Incidentally, in FIG. 30 (same is true for FIG. 31 and FIG. 32 to be described later), $b_i$ (i=1, 2, . . . , 9, a, b, c, d, e, f (a to f denote hexadecimal numbers)) denotes the pixel value of a pixel of a real world image of object B, and $a_j$ (j=1, 2, . . . , 6) denotes the pixel value of a pixel of a real world image (an image that faithfully reproduces the real world) of object A.

In FIG. 30, the moving object A is present between the stationary object B and a video camera (corresponding to the image pickup device 21) not shown in the figure on a near side.

When the video camera picks up an image of the stationary object B and object A moving on the near side, light incident for a predetermined exposure time T is subjected to photoelectric conversion in the video camera, and pixel values corresponding to the amount of the light (light quantity) are output.

In this case, supposing that the size of pixels of a photoelectric conversion element that performs the photoelectric conversion in the video camera coincides with the size of pixels of the real world image, image pickup by the video camera can be represented by a model in which pixel values output by the video camera are values obtained by integrating the pixel values of pixels of the real world image by the exposure time T (which model will hereinafter be referred to as an image pickup model).

Figure 31:
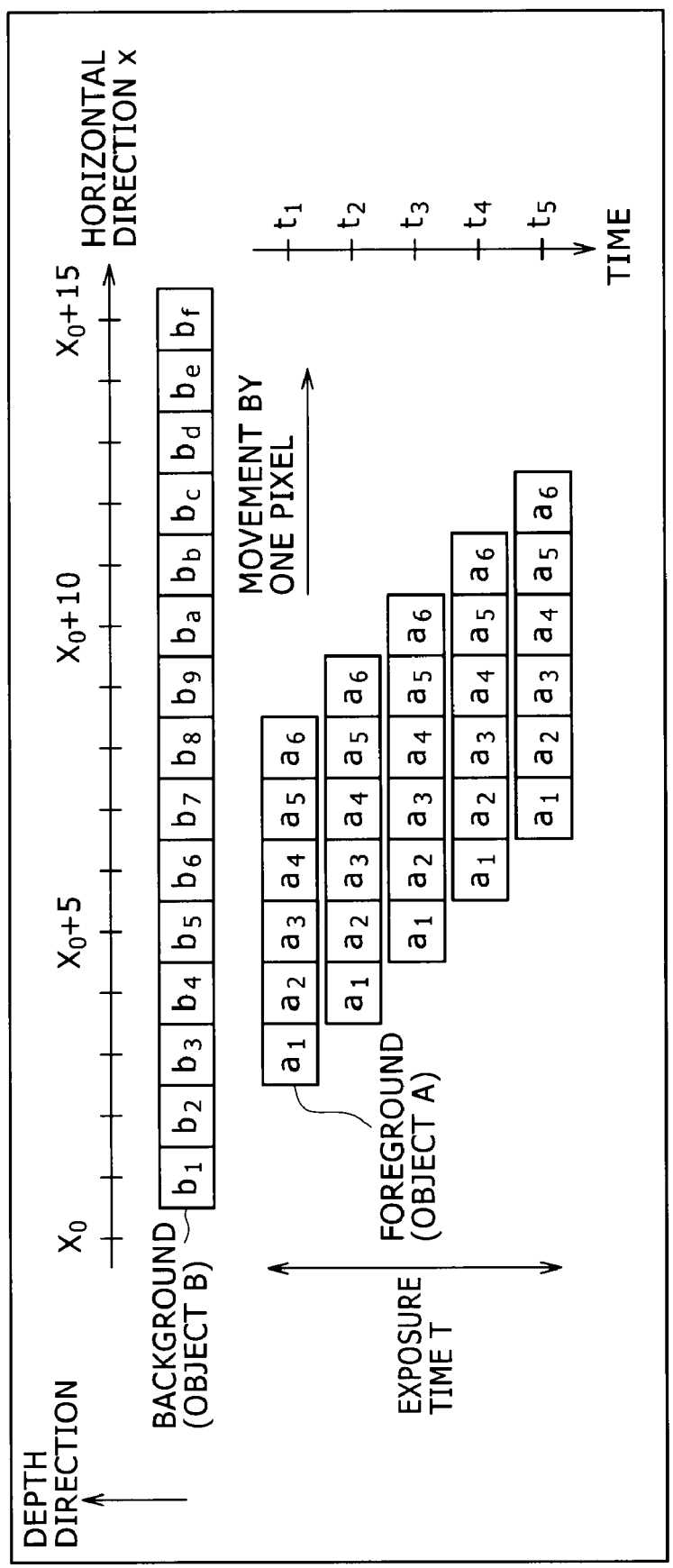
FIG. 31 is a diagram showing a state of object A moving by four pixels in a horizontal direction (x-direction) at a constant speed during an exposure time T.

Specifically, FIG. 31 shows a state of object A moving by four pixels in the horizontal direction (x-direction) at a constant speed during the exposure time T.

Letting $t_1$ be a time of a start of movement made by object A during the exposure time T, letting $t_5$ be a time of an end of the movement, and $t_2$, $t_3$, and $t_4$ be three respective times that divide a time from time $t_1$ to time $t_5$ into four equal parts in increasing order of intervals from time $t_1$ of the start of the movement, object A is present at time $t_k$ (k=1, 2, 3, 4, 5) at a position shifted from an initial position (the position of object a at time $t_1$) in the horizontal direction by (k−1) pixels.

Figure 32:
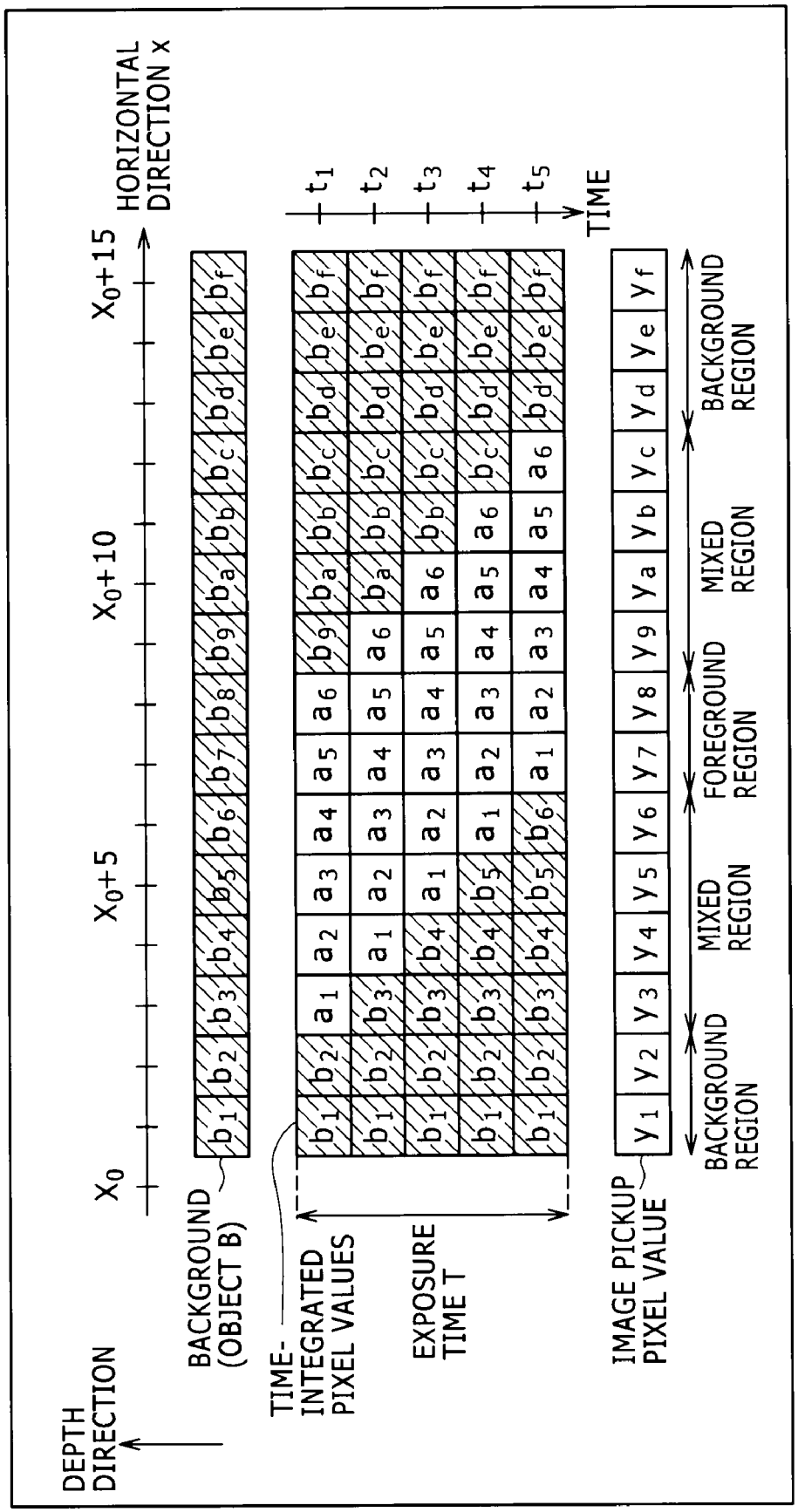
FIG. 32 is a diagram showing a pixel value $y_i$ output by a video camera in an image pickup model.

In this case, pixel values output by the video camera in the image pickup model are as shown in FIG. 32.

Specifically, FIG. 32 shows a pixel value $y_i$ output by the video camera in the image pickup model.

Supposing that the position (in the horizontal direction) of a pixel having a pixel value $b_i$ of the real world image of object B is indicated by $X_0+i$ with a predetermined position $X_0$ as a reference, and that a pixel at position $X_0+i$ is represented as pixel $X_0+i$, only a pixel value $b_1$ of the real world image of object B is seen at position $X_0+1$ at each of times $t_1$ to $t_5$ of the exposure time T, and therefore the pixel value $y_1$ of pixel $X_0+1$ output by the video camera is a pixel value $b_1$.

Similarly, only a pixel value $b_2$ of the real world image of object B is seen at position $X_0+2$ at each of times $t_1$ to $t_5$ of the exposure time T, and therefore the pixel value $y_2$ of pixel $X_0+2$ output by the video camera is a pixel value $b_2$.

At position $X_0+3$, a pixel value $a_1$ of the real world image of object A is seen at time $t_1$ of the exposure time T, and a pixel value $b_3$ of the real world image of object B is seen at subsequent times $t_2$ to $t_5$. Therefore the pixel value $y_3$ of pixel $X_0+3$ output by the video camera is a pixel value $(\frac{1}{5} \times a_1)+(\frac{4}{5} \times b_3)$ obtained by integrating the pixel value $a_1$ for a period of a time of $\frac{1}{5}$ of the exposure time T during which period the pixel value $a_1$ of object A is seen and integrating the pixel value $b_3$ for a period of a time of $\frac{4}{5}$ of the exposure time T during which period the pixel value $b_3$ of object B is seen.

Thereafter the pixel value $y_i$ output by the video camera can be similarly obtained.

Hence, there are three cases where the pixel value $y_i$ output by the video camera coincides with a pixel value $b_i$ of the real world image of object B, where the pixel value $y_i$ output by the video camera is a value obtained by mixing one pixel value $a_j$ or more of the real world image of object A and a pixel value $b_i$ of the real world image of object B according to the movement of object A, and where the pixel value $y_i$ output by the video camera is a value obtained by mixing one pixel value $a_j$ or more of the real world image of object A according to the movement of object A.

A region of the pixel value $y_i$ coinciding with a pixel value $b_i$ of the real world image of object B in the image formed by the pixel value $y_i$ output by the video camera (which image will hereinafter be referred to also as a picked-up image as appropriate) will be referred to as a background region, and a region of the pixel value $y_i$ which is a value obtained by mixing one pixel value $a_j$ or more of the real world image of object A in the image formed by the pixel value $y_i$ output by the video camera will be referred to as a foreground region.

In addition, a region of the pixel value $y_i$ which is a value obtained by mixing one pixel value $a_j$ or more of the real world image of object A and a pixel value $b_i$ of the real world image of object B will be referred to as a mixed region.

Generally, pixel values of the real world image of object A as a foreground are often values close to each other, and pixel values of the real world image of object B as a background are also often values close to each other.

On the other hand, pixel values of the real world image of object A as a foreground and pixel values of the real world image of object B as a background are often not values close to each other (are values that greatly differ from each other).

Thus, a mixed region as a region of the pixel value $y_i$ that is a value obtained by mixing one pixel value $a_j$ or more of the real world image of object A and a pixel value $b_i$ of the real world image of object B is recognized as a region with a motion blur.

In the image pickup model of FIG. 32, directing attention to object A as a foreground, the pixel value $y_i$ of the picked-up image obtained by picking up the image of object A, that is, pixel values $y_3$ to $y_c$ affected by the pixel value $a_j$ of the real world image of object A are values obtained by integrating the pixel value $a_j$ of the real world image, that is, the pixel value $a_j$ of a pixel free from a motion blur while moving the pixel value $a_j$. The pixel values $y_3$ to $y_c$ are expressed by Equation (9).

[Equation 9]

$$y_3 = \frac{1}{5} \cdot a_3 + \frac{4}{5} \cdot b_3$$
$$y_4 = \frac{1}{5} \cdot (a_1 + a_2) + \frac{3}{5} \cdot b_4$$
$$y_5 = \frac{1}{5} \cdot (a_1 + a_2 + a_3) + \frac{2}{5} \cdot b_5$$
$$y_6 = \frac{1}{5} \cdot (a_1 + a_2 + a_3 + a_4) + \frac{1}{5} \cdot b_6$$
$$y_7 = \frac{1}{5} \cdot (a_1 + a_2 + a_3 + a_4 + a_5)$$
$$y_8 = \frac{1}{5} \cdot (a_2 + a_3 + a_4 + a_5 + a_6)$$
$$y_9 = \frac{1}{5} \cdot (a_3 + a_4 + a_5 + a_6) + \frac{1}{5} \cdot b_9$$
$$y_a = \frac{1}{5} \cdot (a_4 + a_5 + a_6) + \frac{2}{5} \cdot b_a$$
$$y_b = \frac{1}{5} \cdot (a_5 + a_6) + \frac{3}{5} \cdot b_b$$
$$y_c = \frac{1}{5} \cdot a_6 + \frac{4}{5} \cdot b_c$$

(9)

Therefore, the pixel value $a_j$ of the real world image of object A, that is, the pixel value $a_j$ free from the motion blur (whose motion blur is reduced) can be obtained by solving Equation (9) by a method of least squares or the like when the pixel value $b_i$ of the real world image of object B is known. Thus an image of object A without the motion blur as a foreground can be separated (created) from the picked-up image.

The foreground blur removal processing portion 55 in FIG. 12 creates third object image data (corresponding to the real world image of object A as a foreground) whose motion blur is reduced on the basis of the above-described image pickup model using image data as input data (corresponding to the picked-up image) and first object image data (corresponding to the real world image of object B as a background) stored in the storage portion 53.

Description will next be made of a method of detecting second audio data as audio data of BGM from audio data as input data in the second audio data detecting section 136 in FIG. 19 and the like.

A technique described in Japanese Patent Laid-Open No. 2005-233984, for example, can be used as a method of detecting audio data of BGM.

Japanese Patent Laid-Open No. 2005-233984 describes a technique of separating voice or BGM by using a filter passing the voice of humans or a filter passing BGM or the like other than the voice of humans.

Figure 33:
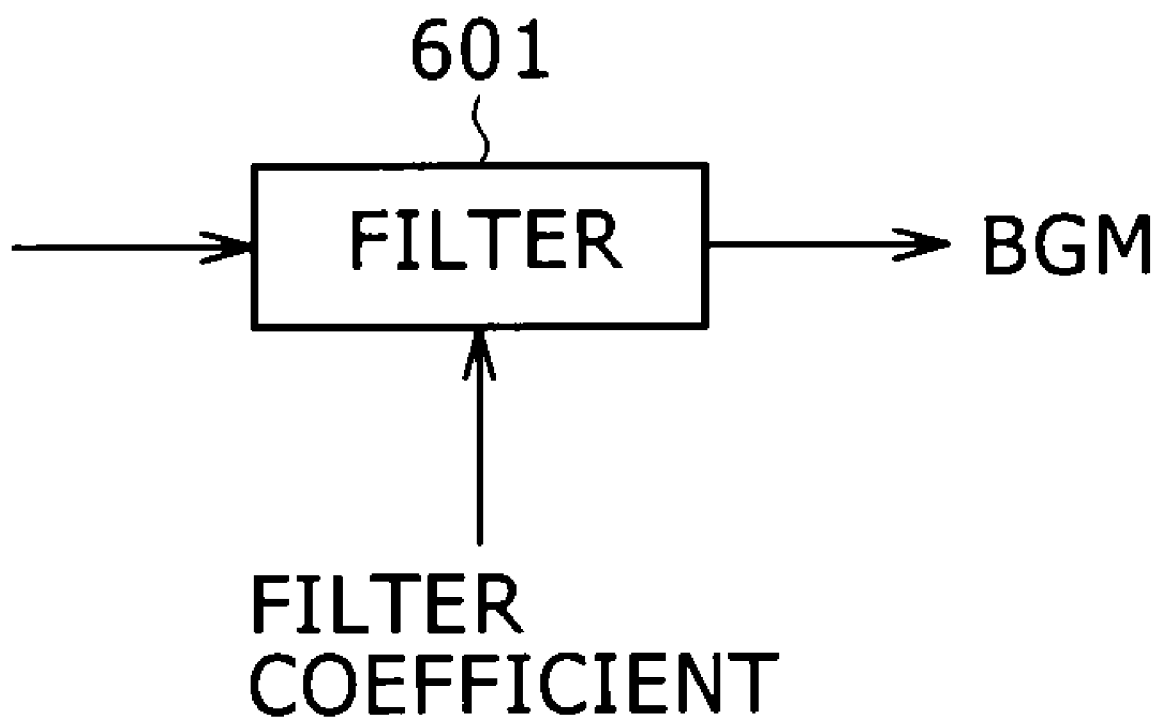
FIG. 33 is a block diagram showing an example of configuration of a detecting device for detecting audio data of BGM.

FIG. 33 shows an example of configuration of a detecting device for detecting audio data of BGM using the technique described in Japanese Patent Laid-Open No. 2005-233984.

In FIG. 33, the detecting device is formed by a filter 601.

A predetermined filter coefficient is set in the filter 601. The filter 601 thereby functions as a filter passing BGM or the like other than the voice of humans.

Description will next be made of a method of removing distortion caused by signal processing from audio data as input data in the signal processing distortion removing portion 141 in FIG. 19 and the like.

The processing that removes distortion caused by signal processing from audio data as input data in the signal processing distortion removing portion 141 in FIG. 19 and the like can be performed by the above-described class classification adaptive processing, for example.

Specifically, for example, the tap coefficient for each class is obtained by learning the tap coefficient with audio data before signal processing in the signal processing section 127 (FIG. 15) set as teacher data and with audio data obtained by subjecting the teacher data to the signal processing in the signal processing section 127 set as student data, and the class classification adaptive processing is performed using the tap coefficient. Thereby distortion caused by the signal processing can be removed from the audio data as input data.

Specifically, the processing that removes distortion caused by signal processing from audio data can be performed using a technique described in Japanese Patent Laid-Open No. Hei 10-011583, for example.

Japanese Patent Laid-Open No. Hei 10-011583 describes class classification adaptive processing that removes distortion caused by signal processing from audio data.

Description will next be made of a method of improving resolution in the temporal direction of audio data as input data in the temporal resolution creating portion 142 in FIG. 19 and the like.

The processing that improves resolution in the temporal direction of audio data as input data in the temporal resolution creating portion 142 in FIG. 19 and the like can be performed by the class classification adaptive processing described above.

Specifically, for example, the tap coefficient for each class is obtained by learning the tap coefficient with audio data of high resolution in the temporal direction set as teacher data and with audio data obtained by lowering the resolution in the temporal direction of the teacher data set as student data, and the class classification adaptive processing is performed using the tap coefficient. Thereby the resolution in the temporal direction of the audio data as input data can be improved.

Specifically, the processing that improves resolution in the temporal direction of audio data as input data can be performed using a technique described in Japanese Patent Laid-Open No. Hei 10-313251, for example.

Japanese Patent Laid-Open No. Hei 10-313251 describes a technique that performs the class classification adaptive processing using a tap coefficient obtained by learning performed with audio data of a high sampling frequency set as teacher data and with audio data obtained by lowering the sampling frequency set as student data.

Description will next be made of a method of removing distortion caused by the sound collection of the sound collecting section 123 (FIG. 15) from audio data as input data in the sound collection distortion removing portion 143 in FIG. 19 and the like.

The processing that removes distortion caused by the sound collection (sound collection distortion) from audio data as input data in the sound collection distortion removing portion 143 in FIG. 19 and the like can be performed by the class classification adaptive processing described above.

Specifically, for example, the tap coefficient for each class is obtained by learning the tap coefficient with audio data free from sound collection distortion set as teacher data and with audio data obtained by causing sound collection distortion to the teacher data set as student data, and the class classification adaptive processing is performed using the tap coefficient. Thereby the sound collection distortion can be removed from the audio data as input data.

Specifically, the processing that removes sound collection distortion from audio data as input data can be performed using a technique described in Japanese Patent Laid-Open No. Hei 10-011583.

Japanese Patent Laid-Open No. Hei 10-011583 describes class classification adaptive processing that removes sound collection distortion from audio data.

Incidentally, the processing performed by the signal processing distortion removing portion 141, the temporal resolution creating portion 142, and the sound collection distortion removing portion 143 in the sound collecting device distortion removing block 132 in FIG. 19 and the like can be performed collectively by class classification adaptive processing.

Specifically, the tap coefficient for each class is obtained by learning the tap coefficient with audio data of high resolution in the temporal direction set as teacher data and with audio data obtained by causing sound collection distortion to the teacher data, further degrading the resolution in the temporal direction of the teacher data, and performing signal processing on the teacher data set as student data, and the class classification adaptive processing is performed using the tap coefficient. Thereby the processing performed by the signal processing distortion removing portion 141, the temporal resolution creating portion 142, and the sound collection distortion removing portion 143 can be performed collectively.

Description will next be made of a method of performing sound source detection processing that detects at least the sound source position of first audio and the sound pressure (power) of the first audio at the sound source position from audio data as input data in order to generate first audio data representing the first audio in the real world which data is not dependent on at least the position of the sound collecting device 121 (FIG. 15), and generates the first audio data having the sound pressure of the first audio at the sound source position of the first audio (first audio data representing the first audio in the real world which data is not dependent on the position of the sound collecting device 121) in the sound source detecting portion 151 in FIG. 19 and the like.

A technique described in Japanese Patent Laid-Open No. 2005-266797, for example, can be used as a method of performing sound source detection processing.

Japanese Patent Laid-Open No. 2005-266797 describes a technique that obtains an emphasized signal emphasizing a target audio by changing amounts of delay of two input audios from a stereo microphone, performs pitch detection, generates a filter coefficient on the basis of a pitch, filters the emphasized signal, and extracts the target audio.

Figure 34:
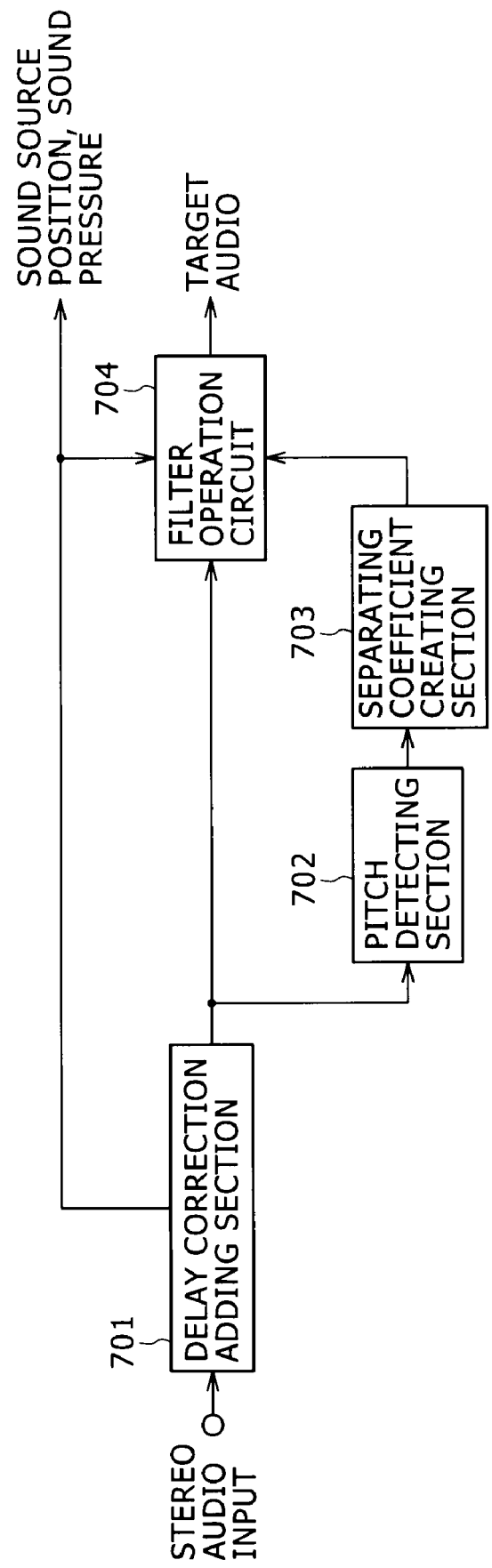
FIG. 34 is a block diagram showing an example of configuration of a detecting device that performs sound source detection processing.

FIG. 34 shows an example of configuration of a detecting device that performs sound source detection processing using the technique described in Japanese Patent Laid-Open No. 2005-266797.

In FIG. 34, the detecting device includes a delay correction adding section 701, a pitch detecting section 702, a separating coefficient creating section 703, and a filter operation circuit 704.

The delay correction adding section 701 is for example supplied with a stereo acoustic signal obtained by sound collection by a stereo microphone.

The delay correction adding section 701 obtains an emphasized signal that emphasizes target audio (corresponding to the first audio) as the voice of a human included in the stereo acoustic signal by adjusting amounts of delay for delaying an L (Left)-channel signal and an R-channel signal as the stereo acoustic signal and adding the L- and R-channel signals after being delayed. The delay correction adding section 701 supplies the emphasized signal to the pitch detecting section 702 and the filter operation circuit 704.

In addition, the delay correction adding section 701 detects and outputs the sound source position of the target audio on the basis of the amounts of delay when the emphasized signal is obtained. Further, the delay correction adding section 701 treats the power of the emphasized signal as power of the target audio at a sound collecting position at which the sound of the target audio is collected, obtains power at the sound source position of the target audio from that power, and outputs the power at the sound source position of the target audio as sound pressure at the sound source position of the target audio.

The sound source position and the sound pressure of the target audio output by the delay correction adding section 701 are output to the outside, and are supplied to the filter operation circuit 704.

The pitch detecting section 702 detects the pitch frequency of the emphasized signal from the delay correction adding section 701. The pitch detecting section 702 supplies the pitch frequency of the emphasized signal as pitch frequency of the target audio to the separating coefficient creating section 703.

On the basis of the pitch frequency from the pitch detecting section 702, the separating coefficient creating section 703 obtains (creates) the filter coefficient of a filter passing audio at the pitch frequency, that is, the target audio. The separating coefficient creating section 703 supplies the filter coefficient to the filter operation circuit 704.

The filter operation circuit 704 functions as a filter with the filter coefficient from the separating coefficient creating section 703. By filtering the emphasized signal from the delay correction adding section 701, the filter operation circuit 704 extracts the target audio (signal component of the target audio) from the emphasized signal.

Further, the filter operation circuit 704 amplifies the target audio extracted from the emphasized signal, thereby obtains the target audio at the sound pressure supplied from the delay correction adding section 701, and outputs the target audio.

Next, referring to FIG. 35, description will be made of principles of the processing in which the delay correction adding section 701 in FIG. 34 obtains the emphasized signal that emphasizes the target audio (corresponding to the first audio) included in the stereo acoustic signal by adjusting amounts of delay for delaying the respective L- and R-channel signals as the stereo acoustic signal and adding the L- and R-channel signals after being delayed.

Figure 35:
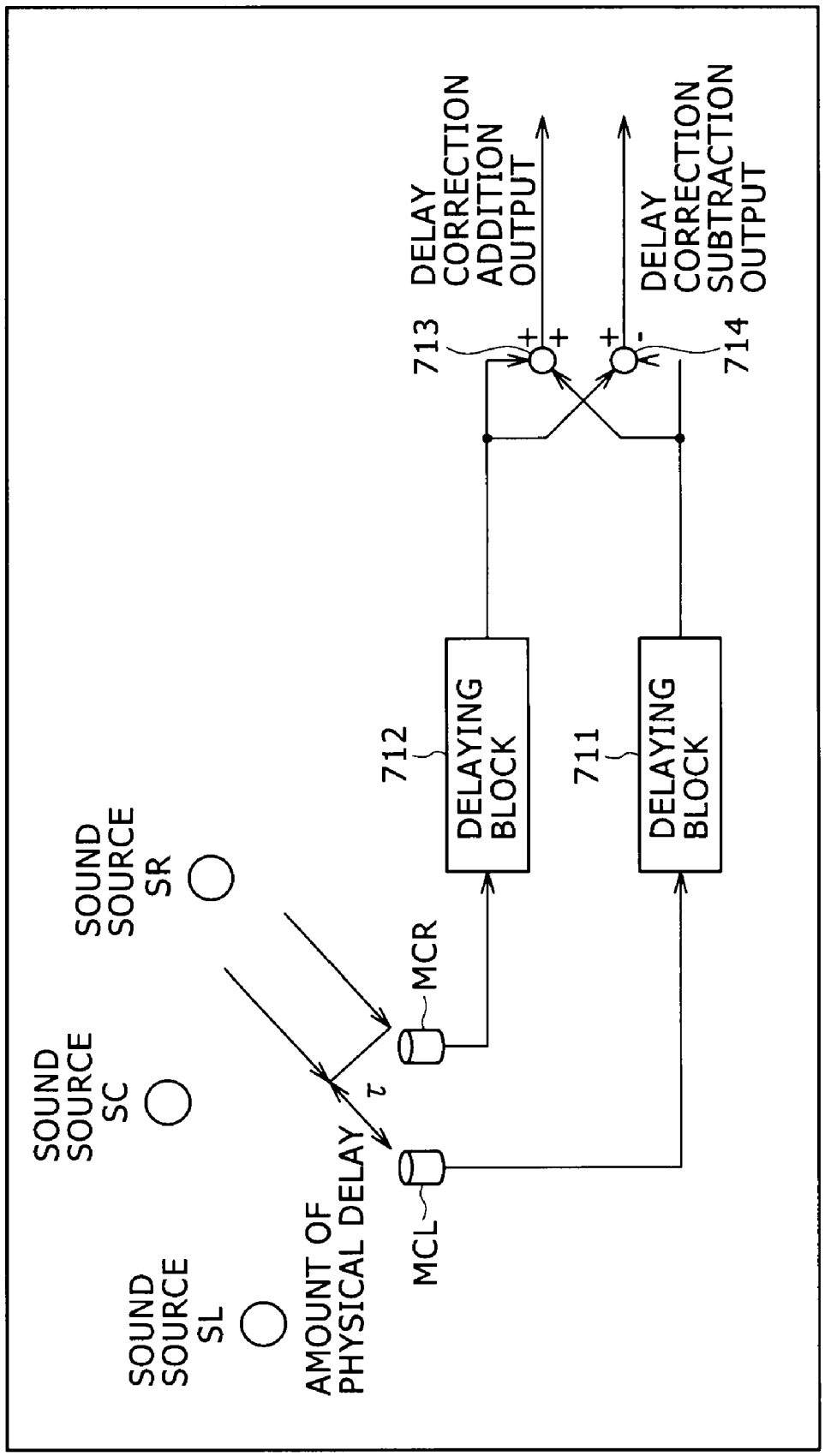
FIG. 35 is a diagram of assistance in explaining principles of processing that obtains an emphasized signal that emphasizes target audio included in a stereo acoustic signal.

In FIG. 35, an L-channel and an R-channel microphones MCL and MCR correspond to the sound collecting device 121 in FIG. 15.

The microphone MCL collects sound emitted from sound sources SL, SC, and SR, and outputs the sound as an L-channel signal. The microphone MCR collects the sound emitted from the sound sources SL, SC, and SR, and outputs the sound as an R-channel signal.

The L-channel signal output by the microphone MCL is supplied to a delaying block 711. The R-channel signal output by the microphone MCR is supplied to a delaying block 712.

The delaying block 711 adjusts an amount of delay for delaying the signal as appropriate, delays the L-channel signal output by the microphone MCL, and supplies the delayed signal obtained as a result to operation sections 713 and 714.

The delaying block 712 also adjusts an amount of delay, delays the R-channel signal output by the microphone MCR, and supplies the delayed signal obtained as a result to the operation sections 713 and 714.

The operation section 713 adds together the L-channel delayed signal from the delaying block 711 and the R-channel delayed signal from the delaying block 712, and outputs the result.

The operation section 714 subtracts one of the L-channel delayed signal from the delaying block 711 and the R-channel delayed signal from the delaying block 712 from the other, and outputs the result.

In FIG. 35, the signal output by the operation section 713 is an emphasized signal in which the signal component of desired target audio is emphasized among signal components included in the acoustic signals obtained by sound collection by the microphones MCL and MCR and the other signal components are attenuated.

Specifically, in FIG. 35, the sound source SL is disposed on a left side, the sound source SC is disposed at a center, and the sound source SR is disposed on a right side as viewed from the side of the microphones MCL and MCR.

Suppose that sound emitted by the sound source SR on the right side, for example, among the sound sources SL, SC, and SR is target audio.

Letting t be a time at which the target audio emitted from the sound source SR reaches the microphone MCR on the near side with respect to the sound source SR, the target audio emitted from the sound source SR reaches the microphone MCL on the far side with respect to the sound source SR with a delay of a time (amount of physical delay) $\tau$ corresponding to a distance between the microphones MCL and MCR or the like from time t.

As a result, when the amount of delay of the delaying block 712 is adjusted to be longer than the amount of delay of the delaying block 711 by time $\tau$, a correlation coefficient between the L-channel delayed signal output by the delaying block 711 and the R-channel delayed signal output by the delaying block 712 is large because the signal components of the target audio included in the L- and R-channel delayed signals, respectively, are in phase with each other.

Figure 36:
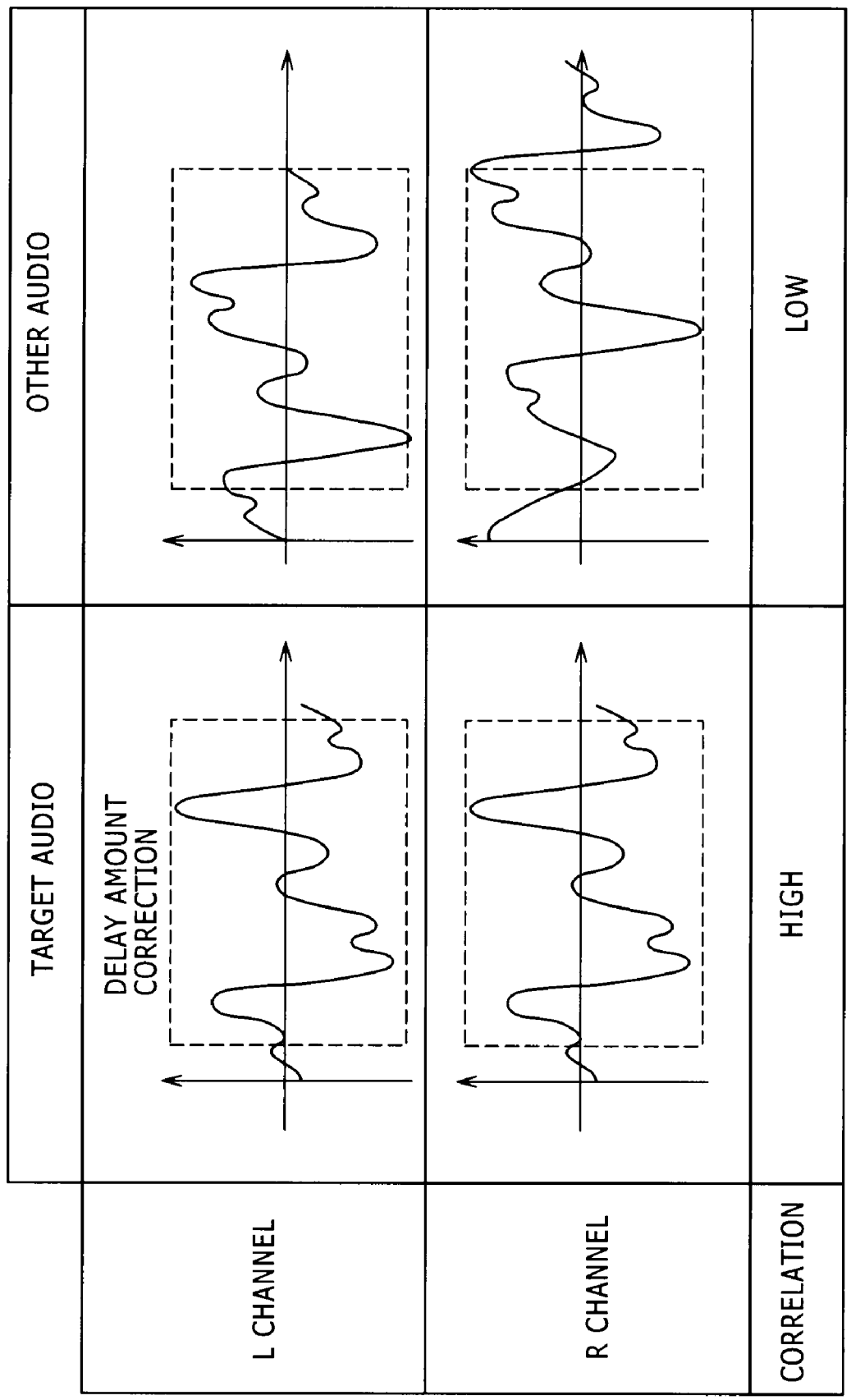
FIG. 36 is a diagram showing an L-channel delayed signal output by a delaying block 711 and an R-channel delayed signal output by a delaying block 712.

Specifically, FIG. 36 shows the L-channel delayed signal output by the delaying block 711 and the R-channel delayed signal output by the delaying block 712 when the amount of delay of the delaying block 712 is adjusted to be longer than the amount of delay of the delaying block 711 by time $\tau$.

When the amount of delay of the delaying block 712 is adjusted to be longer than the amount of delay of the delaying block 711 by time $\tau$, the signal components of the target audio in the L-channel delayed signal output by the delaying block 711 and the R-channel delayed signal output by the delaying block 712, respectively, are in phase with each other.

On the other hand, the signal components of other than the target audio in the L-channel delayed signal output by the delaying block 711 and the R-channel delayed signal output by the delaying block 712, respectively, are out of phase with each other.

As a result, a signal obtained by adjusting the amount of delay of the delaying block 712 so as to be longer than the amount of delay of the delaying block 711 by time $\tau$ and adding together the L-channel delayed signal output by the delaying block 711 and the R-channel delayed signal output by the delaying block 712 in the operation section 713 is an emphasized signal in which the signal component of the desired target audio is emphasized among signal components included in the acoustic signals obtained by sound collection by the microphones MCL and MCR and the other signal components are attenuated.

In this case, the amounts of delay of the delaying blocks 711 and 712 are adjusted such that a correlation coefficient between the L-channel delayed signal output by the delaying block 711 and the R-channel delayed signal output by the delaying block 712 (value obtained by dividing a covariance of the L-channel delayed signal and the R-channel delayed signal by a product of a standard deviation of the L-channel delayed signal and a standard deviation of the R-channel delayed signal) becomes a maximum.

Then, the position of the sound source SR of the target audio as viewed from the microphones MCL and MCR can be obtained from a difference between the respective amounts of delay of the delaying blocks 711 and 712, a distance between the microphones MCL and MCR, and the like.

Incidentally, when the sound source detecting portion 151 in FIG. 19 and the like performs sound source detection processing using the detecting device of FIG. 34, the position of the microphones MCL and MCR corresponding to the sound collecting device 121 (FIG. 15) and the like are necessary. The position of the microphones MCL and MCR and the like are known in advance, or transmitted from the transmitting device 120 (FIG. 15) in a state of being included in input data.

When the sound collecting device 121 (FIG. 15) is a monaural microphone rather than a stereo microphone such as the microphones MCL and MCR or the like, a sound source position is detected by using an image.

Specifically, for example, when image data forming a program together with audio data as input data shows one person speaking to simplify description, the part of the mouth of the person moves. Therefore, when differences between frames of the image data are obtained, the difference values are large at only the part of the mouth of the person.

Therefore, differences between frames of the image data are obtained, and the position of an object (speaking person in this case) appearing in a region of pixels whose differences are a predetermined value or more can be detected as a sound source position.

Incidentally, when the region of pixels whose differences are the predetermined value or more has become very small, or when the differences of the whole of one frame have become very small, it is considered that the person has stopped speaking, and the output of the first audio data of the sound source detecting portion 151 (FIG. 19 and the like) can be stopped (muted).

Next, the series of processes described above can be carried out by hardware and also carried out by software. When the series of processes is to be carried out by software, a program constituting the software is installed onto a general-purpose personal computer or the like.

Figure 37:
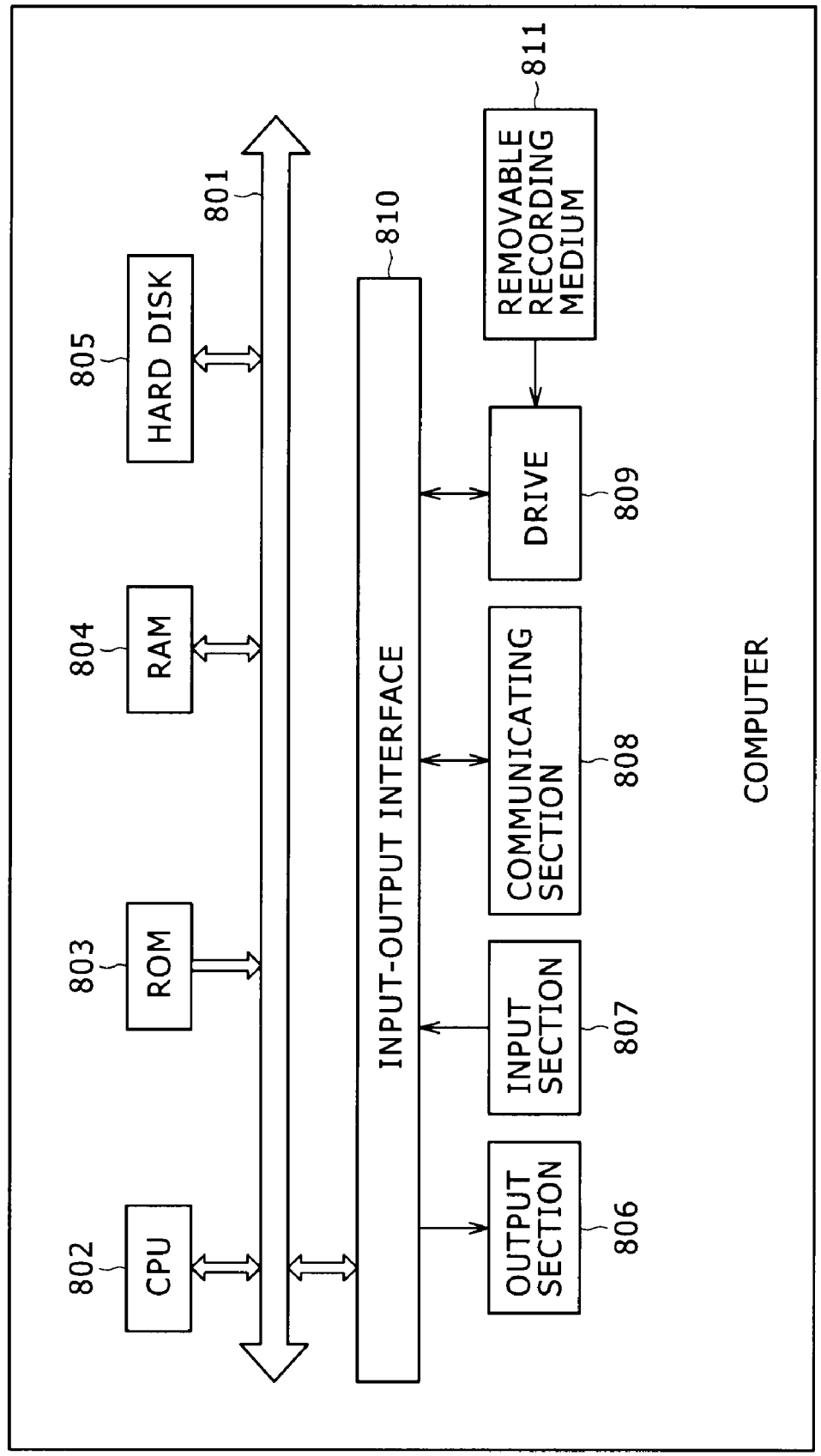
FIG. 37 is a block diagram showing an example of configuration of an embodiment of a computer to which the present invention is applied.

Accordingly, FIG. 37 shows an example of configuration of an embodiment of a computer on which the program for carrying out the above-described series of processes is installed.

The program can be recorded in advance on a hard disk 805 as a recording medium included in the computer or in a ROM 803.

Alternatively, the program can be stored (recorded) temporarily or permanently on a removable recording medium 811 such as a flexible disk, a CD-ROM (Compact Disk Read Only Memory), an MO (Magneto Optical) disk, a DVD (Digital Versatile Disc), a magnetic disk, a semiconductor memory or the like. Such a removable recording medium 811 can be provided as so-called packaged software.

Incidentally, in addition to being installed from the removable recording medium 811 as described above onto the computer, the program can be transferred from a download site to the computer by radio via an artificial satellite for digital satellite broadcasting, or transferred to the computer by wire via a network such as a LAN (Local Area Network), the Internet and the like, and the computer can receive the thus transferred program by a communicating section 808 and install the program onto the built-in hard disk 805.

The computer includes a CPU (Central Processing Unit) 802. The CPU 802 is connected with an input-output interface 810 via a bus 801. When a user inputs a command via the input-output interface 810 by for example operating an input section 807 formed by a keyboard, a mouse, a microphone and the like, the CPU 802 executes a program stored in the ROM (Read Only Memory) 803 according to the command. Alternatively, the CPU 802 loads, into a RAM (Random Access Memory) 804, the program stored on the hard disk 805, the program transferred from the satellite or the network, received by the communicating section 808, and then installed onto the hard disk 805, or the program read from the removable recording medium 811 loaded in a drive 809 and then installed onto the hard disk 805. The CPU 802 then executes the program. The CPU 802 thereby performs the processes according to the above-described flowcharts or the processes performed by the configurations of the block diagrams described above. Then, as required, the CPU 802 for example outputs a result of the processes from an output section 806 formed by an LCD (Liquid Crystal Display), a speaker and the like via the input-output interface 810, transmits the result from the communicating section 808, or records the result onto the hard disk 805.

In the present specification, the process steps describing the program for making the computer perform the various processes do not necessarily need to be performed in time series in the order described as the flowcharts, and include processes performed in parallel or individually (for example parallel processing or processing based on audio).

The program may be processed by one computer, or may be subjected to distributed processing by a plurality of computers. Further, the program may be transferred to a remote computer and executed by the remote computer.

It is to be noted that embodiments of the present invention are not limited to the foregoing embodiments, and that various changes can be made without departing from the spirit of the present invention.

The invention claimed is:

1. A data processing device for processing input data obtained by performing signal processing on sensing data obtained by a sensor device sensing and sampling a first object in a real world, said data processing device comprising:
   a sensor device distortion removing block configured to remove distortion occurring when said sensor device senses said first object and distortion caused by said signal processing, the distortion being included in said input data;
   a sensor device position eliminating block configured to generate first object data representing said first object, the first object data not being dependent on at least a position of said sensor device, from said input data;
   a parameter setting section configured to set a sensing parameter as a parameter used to sense said first object; and a
   manipulating section configured to manipulate said first object data according to the sensing parameter set by said parameter setting section.

2. The data processing device according to claim 1, wherein
   said input data is obtained by superimposing second object data different from said sensing data on said sensing data by editing and performing said signal processing on said sensing data on which the second object data is superimposed,
   said data processing device further includes a second object data detecting section configured to detect said second object data from said input data, said parameter setting section sets said sensing parameter and an editing parameter as a parameter used to perform editing, and said manipulating section manipulates said first object data according to said sensing parameter and performs editing using said second object data according to said editing parameter.

3. The data processing device according to claim 2, wherein said sensor device is an image pickup device that picks up an image of the real world via an optical system, said data processing device is an image processing device configured to process said input data that is image data obtained by superimposing, by editing, second object image data representing a second object on said first object picked-up image data obtained by said image pickup device picking up an image of a first object in the real world via the optical system and sampling the first object in a spatiotemporal direction, and performing signal processing on said first object picked-up image data on which said second object image data is superimposed, said sensor device distortion removing block is an image pickup device distortion removing block configured to remove distortion occurring when said image pickup device picks up the image of said first object and distortion caused by said signal processing, the distortion being included in said input data, said sensor device position eliminating block is an image pickup device operation eliminating block including
an image pickup device operation detecting portion configured to detect relative operation of said image pickup device with respect to said first object from said input data, and an image pickup device operation compensating portion configured to generate first object image data representing the first object before said image pickup device picks up the image of the first object by adding said input data into a storage portion configured to store data while compensating said input data by the operation of said image pickup device, the operation being detected by said image pickup device operation detecting portion, said second object data detecting section is a second object detecting section configured to detect said second object image data from said input data, said parameter setting section sets an image pickup device parameter, which is a parameter used to pick up an image of said first object, as said sensing parameter, and said manipulating section synthesizes said first object image data and said second object image data according to said image pickup parameter and said editing parameter.

4. The data processing device according to claim 3, wherein said image pickup device distortion removing block includes
a signal processing distortion removing portion configured to remove the distortion caused by said signal processing from said input data,
a spatiotemporal resolution improving portion configured to improve resolution in the spatiotemporal direction of said input data, and
an optical distortion removing portion configured to remove distortion caused by said optical system from said input data.

5. The data processing device according to claim 3, further comprising
an image data generating portion configured to generate said second object image data and third object image data representing a third object as a moving body by comparing said input data and said first object image data stored in said storage portion with each other.

6. The data processing device according to claim 5, wherein said image data generating portion generates said third object image data whose motion blur is reduced, assuming that a pixel value of a pixel of said third object is a value obtained by integrating pixel values of respective pixels free from the motion blur in a temporal direction while moving the pixel values of the respective pixels.

7. The data processing device according to claim 5, wherein said parameter setting section generates a size ratio between size of a screen of an output destination of said manipulating section and size of said third object image data, and adjusts said editing parameter for editing the size of said third object image data according to said size ratio when the size of the screen of said output destination is changed.

8. The data processing device according to claim 5, wherein
said parameter setting section sets said editing parameter so as to perform gamma correction processing on only said third object image data generated by said image data generating portion, and
said manipulating section subjects only said third object image data to gamma correction according to said editing parameter.

9. The data processing device according to claim 2, wherein
said sensor device is a sound collecting device having a sound collecting section configured to collect sound of first audio in the real world,
said data processing device is an audio processing device configured to process said input data that is audio data obtained by superimposing, by editing, second audio data on first audio collected sound data obtained by said sound collecting device collecting the sound of the first audio in the real world and sampling the first audio in a temporal direction, and performing signal processing on said first audio collected sound data on which said second audio data is superimposed,
said sensor device distortion removing block is a sound collecting device distortion removing block configured to remove distortion occurring when said sound collecting device collects the sound of said first audio and distortion caused by said signal processing, the distortion being included in said input data,
said sensor device position eliminating block is a sound collecting device operation eliminating block including a sound source detecting portion configured to detect at least a sound source position and sound pressure of said first audio from said input data in order to generate first audio data representing said first audio in the real world, the first audio data not being dependent on at least a position of said sound collecting device,
said second object data detecting section is a second audio data detecting section configured to detect said second audio data from said input data,
said parameter setting section sets a sound collecting parameter, which is a parameter used to collect the sound of said first audio, as said sensing parameter, and
said manipulating section synthesizes said first audio data and said second audio data according to said sound collecting parameter and said editing parameter.

10. The data processing device according to claim 9, wherein said sound collecting device distortion removing block includes
a signal processing distortion removing portion configured to remove the distortion caused by said signal processing from said input data, a temporal resolution improving portion configured to improve resolution in the temporal direction of said input data, and a sound collection distortion removing portion configured to remove distortion caused by said sound collecting section from said input data.

11. The data processing device according to claim 9, further comprising audio data generating means for generating said second audio data and third audio data representing third audio emitted from a different sound source from the first audio by comparing said input data and said first audio data with each other.

12. A data processing method of a data processing device configured to process input data obtained by performing signal processing on sensing data obtained by a sensor device sensing and sampling a first object in a real world, said data processing method comprising the steps of:

removing distortion occurring when said sensor device senses said first object and distortion caused by said signal processing, the distortion being included in said input data;

generating first object data representing said first object, the first object data not being dependent on at least a position of said sensor device, from said input data; and manipulating said first object data according to a sensing parameter set by a parameter setting section configured to set the sensing parameter as a parameter used to sense said first object.

13. A non-transitory storage medium on which a program for making a computer function as a data processing device configured to process input data obtained by performing signal processing on sensing data obtained by a sensor device sensing and sampling a first object in a real world is stored, said data processing device comprising:

a sensor device distortion removing block configured to remove distortion occurring when said sensor device senses said first object and distortion caused by said signal processing, the distortion being included in said input data;

a sensor device position eliminating block configured to generate first object data representing said first object, the first object data not being dependent on at least a position of said sensor device, from said input data;

a parameter setting section configured to set a sensing parameter as a parameter used to sense said first object; and a manipulating section configured to manipulate said first object data according to the sensing parameter set by said parameter setting section.

* * * * *